US008874431B2

(12) United States Patent
Abir

(10) Patent No.: US 8,874,431 B2
(45) Date of Patent: *Oct. 28, 2014

(54) KNOWLEDGE SYSTEM METHOD AND APPARATUS

(75) Inventor: Eli Abir, South Salem, NY (US)

(73) Assignee: Meaningful Machines LLC, New York, NY (US)

(*) Notice: Subject to any disclaimer, the term of this patent is extended or adjusted under 35 U.S.C. 154(b) by 571 days.

This patent is subject to a terminal disclaimer.

(21) Appl. No.: 12/977,887

(22) Filed: Dec. 23, 2010

(65) Prior Publication Data

US 2011/0202334 A1    Aug. 18, 2011

Related U.S. Application Data

(60) Division of application No. 10/659,792, filed on Sep. 11, 2003, now Pat. No. 7,860,706, which is a continuation-in-part of application No. 10/281,997, filed on Oct. 29, 2002, now Pat. No. 7,711,547, which is a continuation-in-part of application No. 10/157,894, filed on May 31, 2002, which is a continuation-in-part of application No. 10/024,473, filed on Dec. 21, 2001, now abandoned, application No. 12/977,887, which is a continuation-in-part of application No. 10/146,441, filed on May 16, 2002, now abandoned, which is a continuation-in-part of application No. 10/116,047, filed on Apr. 5, 2002, now abandoned, which is a continuation-in-part of application No. 10/024,473, application No. 12/977,887, which is a continuation-in-part of application No. 10/194,322, filed on Jul. 15, 2002, now Pat. No. 7,483,282, which is a continuation-in-part of application No. 10/024,473.

(60) Provisional application No. 60/276,107, filed on Mar. 16, 2001, provisional application No. 60/299,472, filed on Jun. 21, 2001.

(51) Int. Cl.
*G06F 17/27* (2006.01)
*G06F 17/20* (2006.01)
*G06F 17/28* (2006.01)
*G06F 17/30* (2006.01)

(52) U.S. Cl.
CPC ........ *G06F 17/3061* (2013.01); *G06F 17/2872* (2013.01); *G06F 17/2809* (2013.01)
USPC .................................................. 704/9; 704/1

(58) Field of Classification Search
USPC ...................................................... 704/1–10
See application file for complete search history.

(56) References Cited

U.S. PATENT DOCUMENTS

| | | |
|---|---|---|
| 4,821,230 A | 4/1989 | Kumano et al. |
| 4,839,853 A | 6/1989 | Deerwester et al. |
| 4,849,898 A | 7/1989 | Adi |
| 5,146,406 A | 9/1992 | Jensen |
| 5,237,503 A | 8/1993 | Bedecarrax et al. |
| 5,278,980 A | 1/1994 | Pedersen et al. |
| 5,311,429 A | 5/1994 | Tominaga |
| 5,365,433 A | 11/1994 | Steinberg et al. |
| 5,369,575 A | 11/1994 | Lamberti et al. |
| 5,377,103 A | 12/1994 | Lamberti et al. |
| 5,406,480 A | 4/1995 | Kanno |
| 5,477,451 A | 12/1995 | Brown et al. |
| 5,541,837 A | 7/1996 | Fushimoto |
| 5,579,224 A | 11/1996 | Hirakawa et al. |
| 5,608,622 A | 3/1997 | Church |
| 5,619,709 A | 4/1997 | Caid et al. |
| 5,630,121 A | 5/1997 | Braden-Harder et al. |
| 5,652,898 A | 7/1997 | Kaji |
| 5,659,765 A | 8/1997 | Nii |
| 5,675,819 A | 10/1997 | Schuetze |
| 5,724,593 A | 3/1998 | Hargrave et al. |
| 5,799,268 A | 8/1998 | Boguraev |
| 5,867,811 A | 2/1999 | O'Donoghue |
| 5,873,055 A | 2/1999 | Okunishi |
| 5,907,821 A | 5/1999 | Kaji et al. |
| 5,913,215 A | 6/1999 | Rubinstein et al. |
| 5,933,822 A | 8/1999 | Braden-Harder et al. |
| 5,987,446 A | 11/1999 | Corey et al. |
| 5,991,710 A | 11/1999 | Papineni et al. |
| 5,995,920 A | 11/1999 | Carbonell et al. |
| 6,070,134 A | 5/2000 | Richardson et al. |
| 6,081,775 A | 6/2000 | Dolan |
| 6,085,162 A | 7/2000 | Cherny |
| 6,163,785 A | 12/2000 | Carbonell et al. |
| 6,236,958 B1 | 5/2001 | Lange et al. |
| 6,253,170 B1 | 6/2001 | Dolan |
| 6,285,978 B1 | 9/2001 | Bernth et al. |
| 6,321,189 B1 | 11/2001 | Masuichi et al. |
| 6,321,191 B1 | 11/2001 | Kurahashi |
| 6,330,530 B1 | 12/2001 | Horiguchi et al. |
| 6,393,389 B1 | 5/2002 | Chanod et al. |
| 6,473,729 B1 | 10/2002 | Gastaldo et al. |
| 6,523,028 B1 * | 2/2003 | DiDomizio et al. .......... 707/748 |
| 6,697,793 B2 * | 2/2004 | McGreevy ............................ 1/1 |
| 6,859,800 B1 * | 2/2005 | Roche et al. ................... 707/718 |
| 6,871,174 B1 | 3/2005 | Dolan et al. |
| 6,901,399 B1 | 5/2005 | Corston et al. |
| 6,925,433 B2 | 8/2005 | Stensmo |
| 7,031,910 B2 | 4/2006 | Eisele |
| 2002/0116176 A1 | 8/2002 | Tsourikov et al. |

OTHER PUBLICATIONS

Grefenstette ("The World Wide Web as a Resource for Example-Based Machine Translation Tasks", Proceedings of Translating and the Computer 21 Conference, London, UK, Nov. 1999).
Koehn et al., "Estimating Word Translation Probabilities from Unrelated Monolingual Corpora Using the EM Algorithm", Proceedings of the Seventeenth National Conference on Artificial Intelligence and Twelfth Conference on Innovative Applications of Artificial Intelligence, pp. 711-715, Aug. 2000.

* cited by examiner

*Primary Examiner* — Samuel G Neway
(74) *Attorney, Agent, or Firm* — Crowell & Moring LLP

(57) ABSTRACT

A method and apparatus for automating the acquisition, reconstruction, and generation of knowledgebases of associated ideas and using such knowledgebases in many application including machine translation of human languages, search and retrieval of unstructured text, or other data, based on concept search, voice recognition, data compression, and artificial intelligence systems.

36 Claims, 3 Drawing Sheets

| CROSS-IDEA DATABASE | | | |
|---|---|---|---|
| 1 | 2 | 3 | 4 |
| System A Segments | System B Segments by Rank of Frequency after subtraction | Direct Frequencies | Frequencies after subtraction |
| Da1 | Db1+Db3+Db4 | 25 | 25 |
| Da1 | Db9+Db10 | 19 | 19 |
| Da1 | Db1 | 35 | 10 |
| Da1 | Db1+Db3 | 30 | 5 |
| Da2 | Db2+Db6 | 20 | 20 |
| Da2 | Db12 | 15 | 15 |
| Da2 | Db2 | 25 | 5 |
| Da3+Da4 | Db5+Db7 | 15 | 15 |
| Da3+Da4 | Db5 | 25 | 10 |

Figure 1

KNOWLEDGE SYSTEM METHOD AND APPARATUS

CROSS-REFERENCE TO RELATED APPLICATIONS

This application is a divisional of U.S. patent application Ser. No. 10/659,792 filed Sep. 11, 2003 now U.S. Pat. No. 7,860,706, which is a continuation-in-part of U.S. patent application Ser. No. 10/281,997, filed Oct. 29, 2002 now U.S. Pat. No. 7,711,547, which is a continuation-in-part of U.S. patent application Ser. No. 10/157,894, filed May. 31, 2002, which is a continuation-in-part of U.S. patent application Ser. No. 10/024,473, filed Dec. 21, 2001 now abandoned and claims the benefit of U.S. Provisional Application No. 60/276,107 filed Mar. 16, 2001, and U.S. Provisional Application No. 60/299,472 filed Jun 21, 2001. This application is also a continuation-in-part of U.S. patent application Ser. No. 10/146,441, filed May. 16, 2002 now abandoned, which is a continuation-in-part of U.S. patent application Ser. No. 10/116,047, filed Apr. 5, 2002 now abandoned, which is a continuation-in-part of U.S. patent application Ser. No. 10/024,473, filed Dec. 21, 2001 now abandoned. This application is also a continuation-in-part of U.S. patent application Ser. No. 10/194,322, filed Jul. 15, 2002 U.S. Pat. No. 7,483,828, which is a continuation-in-part of U.S. patent application Ser. No. 10/024,473 filed Dec. 21, 2001 now abandoned. All applications listed above are hereby incorporated by reference.

FIELD OF THE INVENTION

This invention relates to the field of knowledge systems. More specifically, this invention relates to the application of knowledge systems to machine translation to natural language processing, and to artificial intelligence systems.

BACKGROUND

I. Introduction

For several decades, researchers in various areas of computer science have attempted to develop methods to enable machines to understand the natural language spoken and written by human beings (e.g., English, Chinese, Arabic) in a scalable, automated fashion. While computers can perform specific tasks for which they've been programmed, the state of the art does not provide a method or system for automated general understanding of the meaning of words and phrases in context.

Many applications, including machine translation (or MT) of human languages, voice recognition technology, search, retrieval and text mining systems, and artificial intelligence applications, require automated understanding of natural language in order to be fully effective. The obvious benefits of such applications, if broadly enabled, have motivated universities, governments and corporations to invest many decades of time and collectively billions of dollars of capital looking for a method that would enable computers to process and understand written or spoken natural language. Given the significant effort in these fields without a breakthrough, many in the scientific community question whether true machine understanding of natural language is possible. Even most advocates of the idea that computers will one day be capable of wide-ranging human-type understanding see that time as still decades away.

II. State of the Art of Machine Translation

Most language translation to date is performed by skilled and expensive human translators. Automating the language translation process would have major economic benefits ranging from significant cost reduction of translation to enabling new time-sensitive translation applications like on-the-fly cross-language text or voice communications and multilingual daily news publications.

Machine translation devices and methods for automatically translating documents from one language to another are known in the art. However, these devices and methods often fail to accurately translate sentences from one language to another and therefore require human beings to substantially edit the many errors made by the devices before output translations can be used for most applications. The current state of the art systems accurately resolve 60% to 80% of the words they translate among the Latin languages, but the percentage of publishable quality sentences translated by these systems in a broad domain is typically less than 40%. The accuracy of existing machine translation systems for non-Latin based languages is even lower. The only exceptions are narrowly customized special purpose machine translation systems that do not generalize across application domains. Moreover, most commercially deployed machine translation systems require man-decades of development for each direction of each language pair.

Achieving accurate machine translation is more complicated than providing devices and methods that make word-for-word translations of documents. Because each word's meaning is highly dependent on the context it is found in, simple word-for-word translation of sentences results in wrong word choices, incorrect word order, and incoherent grammatical units.

To overcome these deficiencies, known translation devices have been designed to attempt to make choices of word translations within the context of a sentence based on a combination or set of lexical, morphological, syntactic and semantic rules. These systems, which have been developed for over 40 years and are known in the art as "Rule-Based" machine translation (Rule-Based MT) systems, are flawed because there are so many exceptions to the rules that they cannot provide consistently accurate translation. The most prominent company providing machine translation based primarily on the Rule-Based method is Systran, which began the development of their machine translation engines in the 1960s. Rule sets are laboriously handcrafted and always incomplete, as it is extremely difficult if not impossible for human developers to encompass all the nuances of language in a finite set of rules.

In addition to Rule-Based MT, in the last two decades a new method for machine translation known as "Example-Based" machine translation (EBMT) has been developed. EBMT makes use of sentences (or possibly portions of sentences) stored in two different languages in a cross-language database. When a translation query in the Source Language matches a sentence in the database, the translation of the sentence in the Target Language is produced by the database, providing an accurate translation in the Target Language. If a portion of a translation query in the Source Language matches a portion of a sentence in the database, these devices attempt to accurately determine which portion of the Target sentence (that is mapped to the Source Language sentence) is the translation of the query. "Source" refers to the content in one language or state that is being translated into another language or state; "Target" refers to content in a language or state that the Source is being translated into.

EBMT systems known in the art cannot provide accurate translation of a language broadly because the databases of potentially infinite cross-language sentences will always be predominantly "incomplete." And since EBMT systems do not reliably translate partial matches and sometimes incorrectly combine correctly translated portions, the accuracy of these systems is in the same approximate vicinity as the Rule-Based engines.

Another machine translation approach that is often used independently, as well as in conjunction with EBMT, is Statistical Machine Translation (SMT). SMT systems attempt to automate the translation process using pairs of translated documents in combination with a large corpus of documents in just the Target Language. Compared to Rule-Based MT, both EBMT and SMT significantly reduce the time to develop a translation engine for a pair of languages. The accuracy of SMT systems is comparable to Rule-Based MT and EBMT systems and is, therefore, not adequate for the production of translated documents in a broad domain.

SMT systems use what is known in the art as an "n-gram model" and are based on Shannon's "noisy channel model" for information transfer. These methods assume translation to be imperfect, and by design, SMT methods produce translations based on their probability of being correct based on the training corpora. These methods take a "best guess" at translations for each word based on the two, or at most three, other adjacent words in the Source and Target Languages. These methods gain less marginal benefit with increases in the size of the cross-language and Target Language training corpora, and have continued to make only incremental improvements over the last several years. For example, one of the higher quality SMT systems developed over the past years at the University of Southern California recently published the results of a test of their SMT system. After training on the domain-specific corpus (the Canadian Legislature proceedings), their system translated 40% of the text sentences correctly (AMTA 2002 Proceedings, October 2002).

Some translation devices combine Rule-Based MT, SMT and/or EBMT engines (called Multi-Engine Machine Translation or MEMT). Although these hybrid approaches may yield a higher rate of accuracy than any system alone, the results remain inadequate for use without significant human intervention and editing.

III. State of the Art of Statistical Natural Language Processing for Semantic Acquisition The field of statistical natural language processing (NLP) includes the research and development of automated machine learning from text for various applications. One application of NLP is SMT for machine translation, as discussed above. Although various NLP methods attempt to extract the meaning from natural language, as a leading textbook on the subject makes clear, the state of the art is far from a solution: "The holy grail of lexical acquisition is the acquisition of meaning. There are many tasks (like text understanding and information retrieval) for which Statistical NLP could make a big difference if we could automatically acquire meaning. Unfortunately, how to represent meaning in a way that can be operationally used by an automatic system is a largely unsolved problem." (Manning and Schutze, *Foundations of Statistical Natural Language Processing*, 5$^{th}$ printing, 2002, p 312).

There is a great need for organizations to better manage the knowledge they've captured in unstructured text such as word-processed documents, PDF files, email messages and the like. Although information previously assembled in databases can be searched and retrieved effectively, a practice referred to in the art as data mining, the broad mining of unstructured text (representing 80% or more of the world's data) to look for ideas and concepts is not currently possible using the state of the art systems. While Boolean and other keyword search methods find information using the words contained in the user's query, most ideas and concepts can be expressed in a large number of different ways, many of which will not exactly or even approximately contain a particular keyword or other search term. This means many relevant documents that will be identified when conducting a "concept-based" search (which is not limited to the query words the user provides) will be missed when a keyword search is conducted.

For instance, if the word string "terms and conditions" was submitted in quotes (indicating the exact string) as part of a keyword search, the system will find references to "terms and conditions" but not identify other words and word strings (a word string is two or more adjacent words in a specific order) or other abbreviations or representations expressing the same idea that may be of interest to the user, such as "conditions of use", "restrictions", "tos", "terms of service", and "rules and regulations". The ability for a system to add close semantic equivalents to the search query when looking for relevant information would enhance the quality and efficiency of search in a variety of ways. Moreover, there are no comprehensive phrasal level synonymy or near-synonymy dictionaries. They simply do not exist because there are too many two- and three-word terms to manually create synonym lists for each, let alone all the terms that are longer than three words. Existing methods to automatically generate thesauri using patterns in text have had limited success in the broad semantic acquisition of natural language. The state of the art methods for concept extraction using patterns of words that occur in text include similarity assessment methods such as vector space models using various measures. Some of these methods attempt to find synonymous or related words by identifying individual words as points of context.

Some methods consider words that are different distances from a query and focus on the proximity and frequency of co-occurrence of individual words in relation to the query. These methods include an n-gram based method (Martin, Ney: Algorithms for Bigram and Trigram Word Clustering, Speech Communication 24, pp 19-37, 1998; Brown et al: Class-Based N-gram Models of Natural Language, Computational Linguistics, 18(4), pp. 467-479, 1992; and the Window-based Method (Brown et al)). Other related work in this area includes: Finch & Carter (1992, Bootstrapping Syntactic Categories Using Statistical Methods); Schutze & Pederson (1997, A Co-Occurrence-Based Thesaurus and Two Applications to Information Retrieval), among many others. While the contextual information has provided some results, the breath and accuracy of the results achieved using these methods has been limited and, therefore, they've had limited practical application in commercial products for search and retrieval, content management, and knowledge management.

Most advanced search and text mining applications use manually assembled linguistic rules, semantic knowledge, and ontologies and taxonomies. These methods and systems can be used to provide semantic clues for meta-tagging data by category as well as other purposes. In addition, some systems incorporate various supervised and unsupervised statistical learning and extraction methods including Bayesian methods assessing relevance probabilities to add to the analysis for search and/or categorization. These systems do not effectively mine text because the methods do not yield consistently accurate (i.e., relevant) search results. Additionally, because meta-tagging involves the pre-defining of information into categories to be used as part of enhanced search, the category determination requires that static labels be put on multi-dimensional ideas (that may also evolve or change categories over time). None of these systems are designed to mine information to find other words and phrases of equivalent meaning to query terms.

The ability of a system to identify semantically equivalent alternative representations of a word or word string within a language has many applications. The ability to generate synonymous expressions for any expression, in addition to text mining, is also a very effective component of any corpus-based machine translation system. In addition, the ability to identify expressions of equivalent meaning is machine understanding of natural language, and this ability could provide the foundation for artificial intelligence (AI) applications.

IV. State of the Art of Artificial Intelligence

The most ambitious goal of machine understanding of human language is for use in a system that achieves full-scale human quality intelligence, i.e., a system that is capable of reasoning rationally and exhibiting human-type common sense. This field of computing, referred to as "Strong AI," has as its ultimate goal to enable computers to understand natural language, interact with people or other computers using natural language, learn concepts, make insights, and perform cognitive tasks. While a machine translation system has the task of understanding information only to the level necessary for the purpose of converting the information into another form, Strong AI applications need the capability to not only understand information and its other forms and states, but also to manipulate that information in a way that triggers the system to learn to answer questions and perform other cognitive tasks, such as draw conclusions from premises, discover relations from observations, and set sub-goals to pursue further knowledge gathering in anticipation of expected future needs.

The mathematician Alan Turing devised the Turing Test in 1939 as a conceptual design for testing whether a machine achieved human quality intelligence. Although a machine that passed the Turing Test would not necessarily completely fulfill the promise of all the ambitions of Strong AI, even the most optimistic proponents of Strong AI feel that a computer will not convincingly pass the Turing Test for decades.

AI methods known in the art vary in approach. The vast majority of commercial AI applications address far more narrow tasks than the goals of Strong AI. These applications are sometimes referred to as "Weak AI" and produce at best "idiot-savant"-type systems capable only in the confines of a narrow task such as playing master-level chess. Various methods used to produce these systems include manually encoding knowledge and rules, and systems that can learn how to generalize certain encoded knowledge to perform narrowly defined tasks. Other methods like neural nets have been developed to train systems to learn, again in very narrowly defined domains. In the absence of a true breakthrough that enables broad machine understanding of natural human languages, the focus on narrow problems enables practical applications for specific tasks.

There have been relatively few Strong AI software initiatives. Typically Strong AI systems known in the art manually encode knowledge using a specific computer language designed for that purpose and then employ a system to manipulate that knowledge in the aggregate to attempt to answer questions or perform tasks. The most prominent example of a Strong AI system using a manually created ontology of encoded knowledge is the Cyc system developed at CycCorp by computer scientist Doug Lenat. The Cyc system requires human beings to manually encode a vast amount of common sense knowledge as well as domain-specific knowledge (and understand the different representations of that knowledge), which are "rules" for the system to follow. An example of a hand encoded rule or piece of knowledge for Cyc might be "once people die they stop buying things" or "trees are usually outside." Cyc has been in development since 1984 without producing a system with wide ranging human intelligence. To date, they have hand encoded fewer than 2 million of these very specific rules.

An enabling breakthrough in Strong AI would have far reaching implications. The evolution of technological advancement would increase dramatically as scalable computer processing and memory, armed with human quality intellect, is focused on the issues and problems we all face. A fundamental breakthrough in Strong AI could literally change the world as we know it.

SUMMARY OF INVENTION

I. Introduction

The present invention provides a method and apparatus for automating the acquisition, reconstruction, and generation of knowledgebases of associated ideas and using such knowledgebases in many applications including machine translation of human languages, search and retrieval of unstructured text (or other data) based on concept search (not keywords), voice recognition, data compression, and artificial intelligence systems. In the present invention, knowledgebases of associated ideas are created by studying the relationships between ideas as they recur in an unstructured body of information. The expression of ideas may be, but need not be, similar in number, length, or size; and they may be expressed or represented in any medium (e.g., text, visual images, sounds, infrared waves, smells, symbols).

The present invention also provides a method and apparatus for creating and utilizing knowledgebases to convert ideas from one state into other states, and to otherwise manipulate the knowledgebases for practical applications.

In one embodiment of the present invention, the knowledgebases created are reconstructed in limitless derivations to be used for human language translation applications. Another embodiment of the present invention may be used to create a knowledgebase of associations between ideas to establish their relationship to one another. These associations/relationships of ideas can be used as trigger events for artificial intelligence applications when two or more types of ideas appear together in certain patterns.

The basic aspects of the present invention are knowledgebase acquisition, knowledgebase reconstruction, knowledgebase generation, and the use of knowledgebases to convert ideas and otherwise manipulate the knowledgebases for practical applications. The knowledgebase acquisition aspect of the present invention identifies ideas and their representations in different states. Thus, for applications that manipulate written text, the present invention identifies the meaning of word and word string units, including ideas in different languages that are translations of one another, and ideas that are synonymous expressions within a single language. The knowledge acquisition component of the present invention also identifies non-synonymous words and word strings that are nevertheless related semantically in some way (e.g., opposites, common class members, generally related ideas).

The knowledge reconstruction aspect of the present invention pieces together the units of meaning learned through knowledge acquisition into limitless derivations of more complex ideas. This allows the knowledgebases of associated ideas to be used as building blocks to manipulate broad ranges of ideas in different states, or within one state. Thus the knowledgebases of associated ideas may be used to translate entire documents into a Target Language as well as represent complex ideas in different forms within a single language, thus enabling automated understanding for applications such as concept search, natural language interfaces, voice recognition, and the like.

The knowledge generation aspect of the present invention uses recognized patterns of connected complex ideas to trigger the use of previously learned knowledge (or the learning of new knowledge) to perform a cognitive task. The present invention achieves these and other objectives by identifying multiple ways of expressing each recurring idea and establishing the relationships between different ideas. Thus, in one embodiment of the present invention, the ideas are expressed in human language and the system makes associations by documenting the frequency and proximity relationship of two or more ideas and their co-occurrence in text. As stated before, the ideas are represented by word strings of any size.

II. Word Strings as Units of Meaning

Unlike the existing state of the art of SMT systems, vector space measures for semantic similarity, and other NLP supervised or unsupervised learning, the present invention matches and/or associates patterns of recurring word strings of any size with other recurring word strings of any size. This technique of examining exact word strings including stop words (words such as "it", "an", "a", "of", "as", "in") as single units of meaning in unstructured text applies to all aspects of the present invention. By identifying and focusing on recurring words or word strings of any length as a single unit, the present invention captures the meaning of words in context.

For example, the present invention treats "rock" as potentially representing a variety of meanings depending on context (e.g., a stone or a kind of music). When you look at word strings, further meanings become apparent: "a rock" could represent a stone or a solid individual in tough times; "a rock band" can represent a group of musicians that play rock music. Likewise, the contiguously appearing words "between a rock" take on different meanings depending on the larger word strings they appear in. If they exist in the word string "between a rock band's sets", the meaning is quite different than when they are found in "between a rock and a hard place". Furthermore, the expression "between a rock and a hard place" taken as a whole has a meaning that would not easily be understood by analyzing its parts.

The present invention's treatment of each recurring word string in language as a separate idea stands in stark contrast to existing automatic semantic acquisition methods for machine translation and machine understanding. In addition, the present invention's treatment of each recurring word string in language as a separate idea contrasts with modern linguistic theory, which focuses on the semantic value of individual words in the context of other individual words. The terms "co-location" and "idiom" in linguistic theory refer to the special cases where a word string is taken as a whole because the multi-word expression has taken on a meaning that can not be easily discerned by looking at the component words. In effect, the component words have lost their individual semantic value and only relate to the idea expressed when taken as part of the whole.

For instance, a term like "pitch black" is an example of a co-location and "between a rock and a hard place" is an example of an idiom. In contrast, the present invention treats not just all words, co-locations, and idioms as atomic units of meaning, but rather it treats all word strings as potential atomic units of meaning. The present invention allows words within a word string to maintain their core semantic value, change their core semantic value in subtle ways, or completely diverge from their typical meaning, depending on the exact string of words they are found in.

For example, "baseball" is a kind of game, "a baseball" is a round object, "a baseball team" is a sports franchise, and "a baseball player" is a person. The present invention manipulates these different word strings involving a common word (baseball) individually as independent ideas when manipulating units of meaning in applications requiring machine understanding of natural language. While the present invention does not use linguistic rules for grammar and does not label word strings by their parts of speech, the methods of the present invention allow the context of the word string to be manipulated as a unit and preserve its linguistic qualities.

III. Methods and Systems for Language Translation and Natural Language Understanding for Text Mining, Natural Language Interface and other Applications

A. Overview

The present invention provides several methods and apparatuses for creating and supplementing cross-language association databases (i.e., knowledgebases) of ideas. These databases generally associate data in a first form or state that represents a particular idea or piece of information with data in a second form or state that represents the same idea or piece of information. These databases are then used, for example, to facilitate the efficient translation from one state to another of documents containing these ideas using the knowledge reconstruction method of the present invention referred to as the dual-anchor overlap.

One method for building cross-language word string translation databases uses documents previously translated by human beings (Parallel Text) to recognize co-occurrence of word strings across the translated documents. A second method of the present invention for building cross-language word string translation databases deduces a word string translation between a language pair by using known word string translations from several other language pairs. Another method of the present invention uses a cross-language dictionary along with a large Target Language corpus and certain search techniques to identify word string translations. Another method of the present invention, known as dual-anchor overlap, expands cross-language word string databases by automatically deducing new associations from previously learned associations (this is also the knowledge reconstruction aspect of the present invention).

Another method and system for the knowledge acquisition aspect of the present invention creates knowledgebases of related ideas in a single language or state by examining multiple occurrences of an idea expressed in that one language or state. For example, in the present invention it is possible to create a knowledgebase of associated ideas in English by examining the recurrence of ideas represented by words and word strings in different documents in English. The present invention performs knowledge acquisition on an idea expressed (by a word or word string) in a single language by examining the co-occurrence of surrounding ideas (represented by contiguous words or word strings) and then identifying other words and/or word strings in the same language that have similar patterns, thus enabling the system to identify words and word strings that are semantically equivalent to (or have some other semantic relationship to) the original (query) word or word string. Knowledge acquisition in a single state or language uses one embodiment of the present invention's method for performing Common Frequency Analysis. In general, Common Frequency Analysis is the method of the present invention that associates two or more words and/or word strings with one another and other third words and word strings.

The knowledge reconstruction aspect of the present invention that connects contiguous data segments, represented by word strings in this embodiment, is the dual-anchor overlap technique. This aspect of the invention assembles contiguous word strings by connecting only word strings that have overlapping words (or word strings) with those word strings both to the left and right of it. The system can use the dual-anchor overlap to connect contiguous known building block word strings in combinations not yet encountered by the system to generate new complex ideas or represent known ideas in new forms. The dual-anchor overlap technique of the present invention is used to connect ideas represented by word strings (or other data segments) in order to translate documents across two languages as well as to connect contiguous concepts within a single language.

The knowledge generation aspect of the present invention allows a user to set triggers for next steps based on the co-occurrence of associated third word strings shared by two different word strings found within general proximity of each other (Common Frequency Analysis). This knowledge generation aspect will enable Strong AI applications. The system uses CFA to trigger next-step CFAs in a chain of logic designed by the user to solve a general class of problems. The system will analyze a question or statement by parsing it into all possible sets of known word strings. The system will then analyze the different potential combinations of word strings to identify a known pattern (i.e., two or more words and/or word strings expressed together in a certain order) that will trigger the next step(s) in the analysis.

B. Methods and Systems

In the field of machine translation, the system uses any of the several methods for cross-language knowledge acquisition of word string translations, and combines those translations using the knowledge reconstruction method. This significantly improves upon the quality of existing translation technology and systems and represents advances on the present state of the art.

One method for cross-language knowledge acquisition can occur by use of documents in two or more languages. The documents can be exact translations of each other, i.e., "Parallel Text" documents, or can be text in two languages concerning the same subject matter, i.e., "Comparable Text" documents. This acquisition can occur directly between the Source and the Target Languages (with Parallel or Comparable Text). As used for language translation, the system automatically builds a cross-language database of semantically equivalent ideas (expressed in words or word strings) across two languages.

One embodiment of this method and system of the present invention selects at least a first and a second occurrence of all words and word strings that have a plurality of occurrences in the first language (Source Language) in the available cross-language documents. It then selects a first word range and a second word range in the second language (Target Language) documents, wherein these Target Language ranges approximately correspond to the locations of the first and second occurrences of the selected word or word string in the Source Language documents (and hence provide a high probability of containing the translation of the Source words or word strings). Next, looking at just the ranges in the Target Language, the system compares words and word strings found in the first word range with words and word strings found in the second word range (along with all other Target word ranges that correspond to additional occurrences of each word or word string in the Source Language) and, locating words and word strings common to different word ranges, stores those located common words and word strings in the cross-idea database. The invention then associates, in the cross-idea database, the common words and word strings located in the ranges in the Target Language with the selected word or word string in the Source Language, ranked by their association frequency (number of recurrences), after adjusting the association frequencies as detailed in FIG. 1. By identifying the co-occurrences of words and word strings across languages in Parallel or Comparable Texts, the system will identify more associations as more Parallel or Comparable Text becomes available.

Once associations are made based on frequency of words and word strings in the Target Language ranges, those potential Target Language word string translations can be further verified by finding ranges corresponding to them back in the Source Language documents. The system can then find the most frequent words and word strings within the Source Language ranges to see if the original selected word or word string is among the most frequent Source Language words and word strings resulting from this reverse learning process.

By automatically building translations between frequently recurring word strings (without regard to the size of a word string) in Parallel Text, the present invention captures translations with the necessary built-in context for each word in the string. These accurate translations of word strings with built-in context provide the building blocks that can be used in different appropriate combinations (using the knowledge reconstruction aspect of the present invention) to translate documents. As the system learns word string translations, they will be stored in a data repository for much faster translation when they're needed again for the future translation of documents. The system can operate on documents to learn recurring word strings as they occur sequentially in examined Parallel Text, or recurring word strings can be learned based on specific Parallel documents entered into the system that have been selected because they contain words in the Source Language that need to be translated into the Target Language. The latter operation is a form of "learning by doing" and is an example of learning on-the-fly.

The present invention also provides a cross-language knowledge acquisition method and apparatus that uses databases automatically built by the present invention in different languages together in the aggregate to deduce word string translations between two languages not yet learned directly through Parallel Text. This multilingual leverage technique of the present invention uses the common results that are generated indirectly by translating from the Source Language into known word string translations in intermediate languages, and then from the intermediate languages into the Target Language.

This same multilingual leverage technique for cross-language knowledge acquisition using translations through intermediate third languages and then into the Target Language can also be employed using any state of the art machine translation system between these languages. Even though the accuracy levels of these systems is low when used individually and fewer common results will be reached in the Target Language through intermediate third languages, when several results are identical, the translation will have a high degree of confirmed accuracy. Moreover, these results can be confirmed by requiring contiguous word string translations to have large overlaps (e.g., two, three, or four-word word string overlap on each side) in the Target Language using the dual-anchor overlap process before being approved.

The next method of the present invention for cross-language knowledge acquisition builds associations between word strings of different languages using a monolingual corpus in the Target Language and/or Parallel Text, along with any one or more of the following: machine translation systems known in the art, cross-language dictionaries known in the art, and/or custom-built cross-language dictionaries. These methods of the present invention use a technique called "Flooding" whereby all available translations for each word in a Source Language word string (Target translations may be words or phrases) are generated using custom-built dictionaries or systems known in the art (oftentimes producing multiple translation possibilities for each word, even if some or all of the translation possibilities don't apply in that particular context). Different combinations of these word-for-word (and/or word-for-phrase) translation possibilities are used to search Target Language documents (either a monolingual corpus or Parallel Text) to identify translation candidates for a Source Language word string. The process is called "Flooding" because Target Language documents are "flooded" with these word-for-word (and/or word-for-phrase) combinations. The Flooding method for word string translations requires more calculations than cross-language learning with Parallel Text but, because it does not require Parallel Text to build word string translations, it provides more translation coverage of language.

In addition to the acquisition of knowledgebases, the dual-anchor overlap technique of the present invention reconstructs larger ideas using the entries of the knowledgebase (i.e., pieces together smaller units into coherent larger units). Thus, the present invention also provides a method and apparatus for converting an entire document from one language or state to another language or state using the building block ideas expressed in different word strings across two languages. The present invention is either provided with or builds a database comprised of data segments in a Source Language associated with data segments in a Target Language. The present invention translates text by using the cross-language word string translation database and only approving translations of word strings that have an overlapping word or word string on both sides (unless it is a first or last word string in the translated segment) in both the Source and Target Languages.

In a preferred embodiment, the present invention translates text by accessing the above-referenced database, and identifying the longest word string in the database that is also in the document to be translated (measured by number of words) beginning with the first word of the document. The system then retrieves from the database a word string in the Target Language associated with the located word string from the Source Language. The system then selects a second word string (from the document to be translated) that exists in the database and has an overlapping word or word string with the previously identified word string in the document, and retrieves from the database a word string in the Target Language associated with the second word string in the Source Language. If the word string associations in the Target Language have an overlapping word or word string, the word string associations in the Target Language are combined (eliminating redundancies in the overlap) to form a translation; if not, other Target Language associations to the Source Language word string are retrieved from the database (or learned on-the-fly) and tested for combination through an overlap of words until successful. Obviously, if overlapping word string translations in the Target Language cannot be identified or learned, other (shorter or longer) alternative overlapping word strings in the Source Language can be used and their respective Target Language associations tested for overlap until successful. The next word string in the document in the Source Language is selected by finding the longest word string in the database that has an overlapping word or word string with the previously identified Source Language word string, and the above process continues until the entire Source Language document is translated into a Target Language document. Only word strings with an overlapping word or words with contiguous word strings on both left and right sides in both the Source and Target Languages are approved as a combined set of ideas for translation. The beginning and the end of the chain of overlapping word string translations can be defined by the beginning and end of a sentence, or by any other identifiable unit of text (e.g., phrase, title, paragraph, article, chapter, etc.).

The above described cross-language dual-anchor overlap method and process increases the likelihood of combining each word string translation with an appropriate contiguous word string in terms of context and grammar. The number of overlapping words required to approve a connection of contiguous segments is user-defined. The higher the user-defined minimum number of overlapping words between contiguous segments required to approve the combination of word strings, the more accurate the results. The cross-language dual-anchor overlap technique resolves the issue of "boundary friction" confronted by existing EBMT systems and increases the likelihood of the correct context being used throughout a translation.

Additionally, word string translations that are candidates based on cross-language learning (or other knowledge acquisition methods) but not yet confirmed by user-defined statistical significance, can be approved by requiring more overlapping words between two contiguous word strings as a user-defined requirement. Longer unconfirmed word string translation candidates can also be tested for a cross-language overlap by using a smaller subset word string (i.e., internal word string) that has a known translation to confirm the middle un-overlapped portion of a longer word string. Note that the translation method is not limited to word strings of equal length or word strings in the same position in both the Source and Target Language sentences and is, therefore, very flexible.

The present invention also provides a general method and apparatus referred to as Frequency Association Database creation to create frequency tables of proximity relationships between words and/or word strings in a single language. These proximity relationships are then used to make associations between a word or word string and other words and/or word strings based on common associations within a single language through the present invention's Common Frequency Analysis. The method of the present invention for knowledge acquisition within a single language uses the context (represented by words and word strings) surrounding each recurring idea (which are also represented by words or word strings). Semantic relationships can be identified and utilized to significantly improve search and text mining applications, machine translation and artificial intelligence applications.

The present invention allows the acquisition of knowledgebases within a single state, such as a single language, using the Common Frequency Analysis method of the present invention. In one embodiment using Common Frequency Analysis, the system identifies words and word strings that represent synonymous ideas, as well as other types of relationships between ideas.

For example, by examining texts in the English language, associations can be established for words or word strings that identify semantically equivalent (i.e., synonymous) words and word strings (e.g., "nation's largest" and "biggest in the country"). The present invention also provides a method and apparatus to analyze a word or word string for word and word string associations and to produce words and word strings representing opposite ideas (where they exist), as well as words and word strings representing definitions, examples, and other related ideas including members of a common general class of ideas (e.g., "red" relates to "blue" and "lime green" as members of the class of colors), and other related information (e.g., the query "Mount Everest" may return "highest point in the world").

The present invention identifies these relationships between and among words and/or word strings by identifying the word strings of any size that are contiguous to the word or word string being analyzed, and whether these contiguous word strings are to the left or right of the analyzed word or word string. Words and word strings that share many of the same left and right contiguous word strings have strong semantic relationships with one another. Typically, the words and word strings that share the most number of different right and left context word strings, including longer (more words) right and left context word strings, are most semantically similar or otherwise semantically related.

Knowledge acquired and assembled in a single language database (including knowledge generated on-the-fly) can be used to expand keyword search and text mining methods known in the art. These methods can be enhanced, for example, by searching semantic equivalents of keywords as well as other closely related words and word strings to the entered keywords. The aspect of the present invention that identifies semantically equivalent terms by identifying common left and right context word strings can also be used to break semantic codes. If an otherwise inappropriate or unusual (in that context) word or word string is used as a code to represent a meaning other than its common meaning or meanings, its repeated use in an unusual context will allow the present invention to identify the true semantic meaning that underlies the semantic code.

Appendix A (page 179) presents examples of association results using RCFA for a variety of queries. The first 15 examples show partial results for the queries (i.e., the top 20-25 returns per query), while the final example (for the query "it is important to note") shows all 1000 returns. The results reflect a far more robust automated semantic acquisition method than any in the state of the art. The key to these results are treating word strings flowing into (i.e., to the left of the query, in English) and out of (i.e., to the right of the query, in English) the query idea as single units of context, and using that two-sided word string context to find other semantic units represented by words and word strings that share some of those same left and right side word string contexts.

Using the dual-anchor overlap technique of the present invention, the same ideas represented by different word strings in the same language can also be substituted for one another in a chain of overlapping ideas to produce a plurality of sentences consisting of overlapping semantically equivalent ideas that combine to express the same larger idea. By providing a database of semantically equivalent ideas in a language along with the dual-anchor overlap technique of the present invention (described above for translation across languages), the present invention can reproduce the same larger idea in many different derivations. This dual-anchor overlap, the knowledge reconstruction component of the present invention, will be very useful for voice recognition and other natural language recognition applications and provide expanded search combinations of the same idea expressed in various word string combinations. This ability will also provide very effective methods for text mining tasks such as entity and relation co-reference and tracking, among other tasks.

The aspect of the single language knowledge acquisition methods of the present invention that generates semantic equivalents can also be used as a productive component in machine translation applications. A Source Language word string that cannot be translated because of a lack of information or for any other reason can be used to generate alternative Source Language word strings to be translated in its place. Additionally, semantic equivalents of word strings in the Source Language and/or semantic equivalents of a Target Language word string translation candidate can be used to help confirm correct translations.

The present invention also provides a Common Frequency Analysis method and apparatus that uses relationships between recurring words and/or word strings in any number of ways in smart applications to answer questions by identifying associations to third words and/or word string that two or more words or word strings have in common, based on their proximity to one another in text. Databases created for smart applications can be built from documents in a single language (or alternatively using cross-language text). The presence of two or more words and/or word strings that are contiguous or overlapping (or possess some other close proximity relationship) in a question, request, or statement can trigger different types of Common Frequency Analysis of the present invention designed by the user or learned by the system.

The triggered Common Frequency Analyses will identify words and word strings not present in the question, request, or statement that share a proximity relationship in other available text with two or more words and/or word strings presented to the system in the question, request, or statement. These third word or word string associations common to both presented words and/or word strings may be used to identify the next steps in the chain of Common Frequency Analyses to understand questions or commands, and provide answers or perform tasks.

The present invention provides a method for Strong AI tasks by providing a basis for dynamic, automatic knowledgebase creation by levels and categories of semantic association of any ideas expressed as words or word strings in context. Provided adequate training text is available, this ability provides a knowledgebase for all situations that can be leveraged by smart application triggers.

In a sense, the user trains the present invention how to think about a class of situations represented by general patterns of ideas by building next step "triggers" for the system to use when certain known patterns of words and/or word strings are identified based on the semantic classes they are apart of (as identified by the present invention's Common Frequency Analysis for semantic equivalents and equivalence classes). By recognizing general classes of ideas through their particular identifying pattern of words and word strings (and/or known semantic equivalents), and by identifying the presence of a group of those ideas that fit a larger generalized pattern, the system can trigger strategies (once trained by the user to do so), executing logical next steps (knowledgebase lookups or next Common Frequency Analyses) when those general patterns are identified. Once the user creates enough "general strategy triggers," the system will learn to identify appropriate triggers automatically for many other situations. These initial triggers set by the user can include triggers designed to teach the system to automatically set triggers for different purposes.

Another object of the present invention is to associate sound wave frequencies produced by human speech and other sources to their corresponding ideas in each different language to be used in voice recognition and other applications that rely on interpretation of audible sounds.

Another object of the present invention is to associate generalized patterns of pixel arrays and other methods for visual data representation with the corresponding ideas represented by different languages to be used in visual recognition for information gathering and artificial intelligence applications.

Another aspect of the present invention is to represent semantically identical ideas using a single symbol or token like a number or a point on the electromagnetic spectrum which can be used as a data compression method.

IV. Prior Art

Prior art systems do not accomplish what is described by the present invention. For example:

U.S. Pat. No. 5,724,593 to Hargrave discloses a translation memory tool to assist human translators, where texts and corresponding translations are loaded into a memory. The texts in the Source Language are parsed into n-grams. The Source Language n-grams are analyzed to determine frequency of occurrence within texts of the Source Language and entropy weightings are assigned. N-grams having excessively high or low entropy weightings are eliminated as being insufficiently useful for translation purposes. The remaining n-grams and corresponding translations are used in a reverse index for machine-assisted translation by finding "fuzzy matches" for input translations that exist in the translation memory for the human translators review.

Hargrave does not perform word string association analysis using Parallel Text where recurring word strings of any size in the Source Language documents are associated with recurring words and words strings of any size in the Target Language documents based on their frequency of appearance (after subtraction of larger word strings from sub-strings) in the same approximate location of one another within the Parallel Text. Hargrave does not use translation of words and word strings indirectly through other third languages.

Hargrave does not "Flood" Target Language text with Source Language word translations that make up Source Language word strings along with Source Language context words and word strings. Hargrave does not perform word and word string association analysis between words and word strings of a single language using word strings of any size to the left and right of the query. Hargrave does not require that a document input to be translated be parsed into overlapping word strings in the Source Language and require that Target Language translations of Source Language parsed word strings also have overlapping words or word strings with its neighboring translations to its left and/or right to approve a translation.

U.S. Pat. No. 6,085,162 to Cherny discloses a three-dimensional topical database for translating between languages, where each layer of the database represents a user-selectable topic relevant to the translation. The database is built by parsing texts representing at least two different language sources into words. In separate branches of a processing sequence, the parsed words from the two sources are assigned to different classes based in part on information such as their grammatical function, grammatical form and denotation. The input words in each branch are then translated using a dual-language dictionary to produce one or more translations, or associations, for each word. The word associations from each branch are processed together to produce forward and backward frequency of association using, for example, a neural network. The database used for translation is made up of layers, each representing a topic, each layer containing the frequency of association and assigned classes for all words within the topic.

Cherny does not perform word string association analysis using Parallel Text where recurring word strings of any size in the Source Language documents are associated with recurring words and words strings of any size in the Target Language documents based on their frequency of appearance (after subtraction of larger word strings from sub-strings) in the same approximate location of one another within the Parallel Text. Cherny does not use translation of words and word strings indirectly through other third languages. Cherny does not "Flood" Target Language text with Source Language word translations that make up Source Language word strings along with Source Language context words and word strings. Cherny does not perform word and word string association analysis between words and word strings of a single language using word strings of any size to the left and right of the query. Cherny does not require that a document input to be translated be parsed into overlapping word strings and require that Target Language translations of Source Language parsed word strings also have overlapping words or word strings with its neighboring translations to its left and/or right to approve a translation.

U.S. Pat. No. 5,867,811 to O'Donoghue teaches the use of word pair frequencies to improve the quality of aligned corpora generated by other methods known in the art by modifying the aligned corpora to remove the most improbable corpora alignments. Aligned corpora are two or more bodies of text divided into aligned portions, such that each portion in a first language corpus is mapped onto a corresponding portion in a second language corpus. Each portion may comprise a single sentence or phrase, but can also comprise one word or perhaps a whole paragraph. Automated systems to produce aligned corpora known in the art are not always reliable. The invention employs a statistical database containing frequency tables for the occurrence of pairs of corresponding individual words across two languages to detect probable errors in aligned text portions. The invention also uses a statistical method to provide an alignment score for "chunks of words" by accumulating the individual word pair scores for all the word pairs in each pair of chunks.

O'Donoghue does not perform word string association analysis using Parallel Text where recurring word strings of any size in the Source Language documents are associated with recurring words and words strings of any size in the Target Language documents based on their frequency of appearance (after subtraction of larger word strings from sub-strings) in the same approximate location of one another within the Parallel Text. O'Donoghue does not "Flood" Target Language text with Source Language word translations that make up Source Language word strings along with Source Language context words and word strings. O'Donoghue does not use translation of words and word strings indirectly through other third languages. O'Donoghue does not perform word and word string association analysis between words and word strings of a single language using word strings of any size to the left and right of the query. O'Donoghue does not require that a document input to be translated be parsed into overlapping word strings and require that Target Language translations of Source Language parsed word strings also have overlapping words or word strings with its neighboring translations to its left and/or right to approve a translation.

U.S. Pat. No. 5,579,224 to Hirakawa teaches a system for creating a dictionary. A first language document and a second language document are loaded into memory. A word or character string is extracted from the first language document and corresponding words are selected from the second language document based on morphological and syntactic analysis of words in the second language document. Selected candidate words from the second language document are compared to the extracted word from the first language document by comparing words near the extracted word in the first document to words near the candidate selected words in the second language document. The candidate words are scored based on context and proximity.

Hirakawa does not perform word string association analysis using Parallel Text where recurring word strings of any size in the Source Language documents are associated with recurring words and words strings of any size in the Target Language documents based on their frequency of appearance (after subtraction of larger word strings from sub-strings) in the same approximate location of one another within the Parallel Text. Hirakawa does not "Flood" Target Language text with Source Language word translations that make up Source Language word strings along with Source Language context words and word strings. Hirakawa does not use translation of words and word strings indirectly through other third languages. Hirakawa does not perform word and word string association analysis between words and word strings of a single language using word strings of any size to the left and right of the query. Hirakawa does not require that a document input to be translated be parsed into overlapping word strings and require that Target Language translations of Source Language parsed word strings also have overlapping words or word strings with its neighboring translations to its left and/or right to approve a translation.

U.S. Pat. No. 5,991,710 to Papineni discloses a system for translating from a Source Language to a Target Language by statistically scoring Target candidate word sets in the Target Language and identifying candidate Target word sets with the highest score. The system uses a statistical model to choose the most probable translation among the Target Language candidates and is designed for applications where the domain is substantially restricted to a finite number of potential translations that will fit the input query.

Panineni does not perform word string association analysis using Parallel Text where recurring word strings of any size in the Source Language documents are associated with recurring words and words strings of any size in the Target Language documents based on their frequency of appearance (after subtraction of larger word strings from sub-strings) in the same approximate location of one another within the Parallel Text. Panineni does not "Flood" Target Language text with Source Language word translations that make up Source Language word strings along with Source Language context words and word strings. Panineni does not use translation indirectly of words and word strings through other third languages. Panineni does not perform word and word string association analysis between words and word strings of a single language using word strings of any size to the left and right of the query. Panineni does not require that a document input to be translated be parsed into overlapping word strings and require that Target Language translations of Source Language parsed word strings also have overlapping words or word strings with its neighboring translations to its left and/or right to approve a translation.

U.S. Pat. No. 6,092,034 to McCarley discloses a statistical translation system and method for fast sense disambiguation and translation using fertility models and sense models using the individual words of the Source Language. The fertility model is a language model for describing the probability of a fertility of a Source Language word, given the Source Language word and the context of the Source Language word using methods known in the art such as the maximum-entropy tri-gram model. The sense model is a language model for describing the probability of a Target Language word being the correct translation of a Source Language word, given the Source Language word and the context of the Source Language word using the tri-gram model and other methods known in the art.

McCarley does not perform word string association analysis using Parallel Text where recurring word strings of any size in the Source Language documents are associated with recurring words and words strings of any size in the Target Language documents based on their frequency of appearance (after subtraction of larger word strings from sub-strings) in the same approximate location of one another within the Parallel Text. McCarley does not "Flood" Target Language text with Source Language word translations that make up Source Language word strings along with Source Language context words and word strings. McCarley does not use translation of words and word strings indirectly through other third languages. McCarley does not perform word and word string association analysis between words and word strings of a single language using word strings of any size to the left and right of the query. McCarley does not require that a document input to be translated be parsed into overlapping word strings and require that Target Language translations of Source Language parsed word strings also have overlapping words or word strings with its neighboring translations to its left and/or right to approve a translation.

U.S. Pat. No. 6,393,389 to Chanod discloses a method for translating text by parsing the Source text into sub-segments. The sub-segments are then translated to a Target Language using any of a number of conventional means known in the art. Any sub-segment that has multiple translation choices, either because it was translated using a plurality of means or the method used to translate it provided multiple choices, has those choices ranked by a user-defined method. An attempt at conveying the meaning of the Source input in the Target Language is then made by presenting to the user a word string created by combining the highest ranking candidate for each segment consecutively. In alternative embodiments, the user may swap out segments for lower ranking segments or multiple choices for a segment can be displayed.

Chanod does not perform word string association analysis using Parallel Text where recurring word strings of any size in the Source Language documents are associated with recurring words and words strings of any size in the Target Language documents based on their frequency of appearance (after subtraction of larger word strings from sub-strings) in the same approximate location of one another within the Parallel Text. Chanod does not "Flood" Target Language text with Source Language word translations that make up Source Language word strings along with Source Language context words and word strings. Chanod does not use translation of words and word strings indirectly through other third languages. Chanod does not perform word and word string association analysis between words and word strings of a single language using word strings of any size to the left and right of the query. Chanod does not require that a document input to be translated be parsed into overlapping word strings and require that Target Language translations of Source Language parsed word strings also have overlapping words or word strings with its neighboring translations to its left and/or right to approve a translation.

U.S. Pat. No. 6,138,085 to Richardson discloses a system for determining, for a semantic relation that does not occur in a lexical knowledgebase, whether this semantic relationship should be inferred despite its absence from the lexical knowledge base. Richardson only seeks to define relationships between single words. The relationship between two presented words is placed into one of a limited number of manually defined categories (e.g., Synonym, Location, User, etc.) by finding one or more pathways between the words. The pathways are comprised of other words which are already connected in the database by manually tagged or deduced relationships.

Richardson does not perform word string association analysis using Parallel Text where recurring word strings of any size in the Source Language documents are associated with recurring words and words strings of any size in the Target Language documents based on their frequency of appearance (after subtraction of larger word strings from sub-strings) in the same approximate location of one another within the Parallel Text. Richardson does not "Flood" Target Language text with Source Language word translations that make up Source Language word strings along with Source Language context words and word strings. Richardson does not use translation of words and word strings indirectly through other third languages. Richardson does not perform word and word string association analysis between words and word strings of a single language using word strings of any size to the left and right of the query. Richardson does not require that a document input to be translated be parsed into overlapping word strings and require that Target Language translations of Source Language parsed word strings also have overlapping words or word strings with its neighboring translations to its left and/or right to approve a translation.

BRIEF DESCRIPTION OF THE DRAWINGS

FIG. 1 shows an embodiment of a frequency association database according to the present invention.

DETAILED DESCRIPTION OF THE INVENTION

I. Introduction

As indicated above, one aspect of the present invention is to provide several different methods and apparatuses for creating and supplementing knowledgebases (knowledge acquisition) and for manipulating content from a first state into a second state using the knowledgebases (knowledge reconstruction). "Documents" as discussed herein are collections of information and ideas that are represented by symbols and characters fixed in some medium. For example, the documents can be electronic documents stored on magnetic or optical media, or paper documents such as books. The symbols and characters contained in documents represent ideas and information expressed using one or more system of expression intended to be understood by users of the documents. The present invention manipulates documents in a first state, i.e., containing information expressed in one system of expression, to produce documents in a second state, i.e., containing substantially the same information expressed using a second system of expression. Thus, the present invention can manipulate or translate documents between systems of expression (for example, written and spoken languages such as English, Hebrew, and Cantonese, into other languages) in their respective encoding. In another aspect, the present invention can recognize different alternative representations of an idea or group of ideas within a single state or language, and automatically retrieve relevant associations, learned in the past or on-the-fly, when different groups of ideas are presented together (knowledge generation).

For all aspects of the present invention, a word string, as described above, is defined as a group (two or more) of adjacent words in exact order; a word, as referred to in this document, can appear independently or as part of a word string, and can include conventional words as would be found in a dictionary, conventional characters (e.g., Chinese characters) as would be found in a dictionary, or any other characters or symbols with recognizable semantic value in a language or culture, including abbreviations (e.g., "inc.", or "dept."), symbols (e.g., "☺", or "MSFT"), acronyms (e.g., "ASAP", or "NCAA"), etc. and, depending on user-defined parameters, can include or not include punctuation and any other mark used in the expression of language. When the present invention is applied more broadly beyond text to forms of input in alternative mediums (e.g., visual images), a word will refer to the smallest unit of independent idea represented in the alternative medium and word string will refer to a string of units of meaning represented in the medium and taken as a whole unit of meaning.

Figure 2:
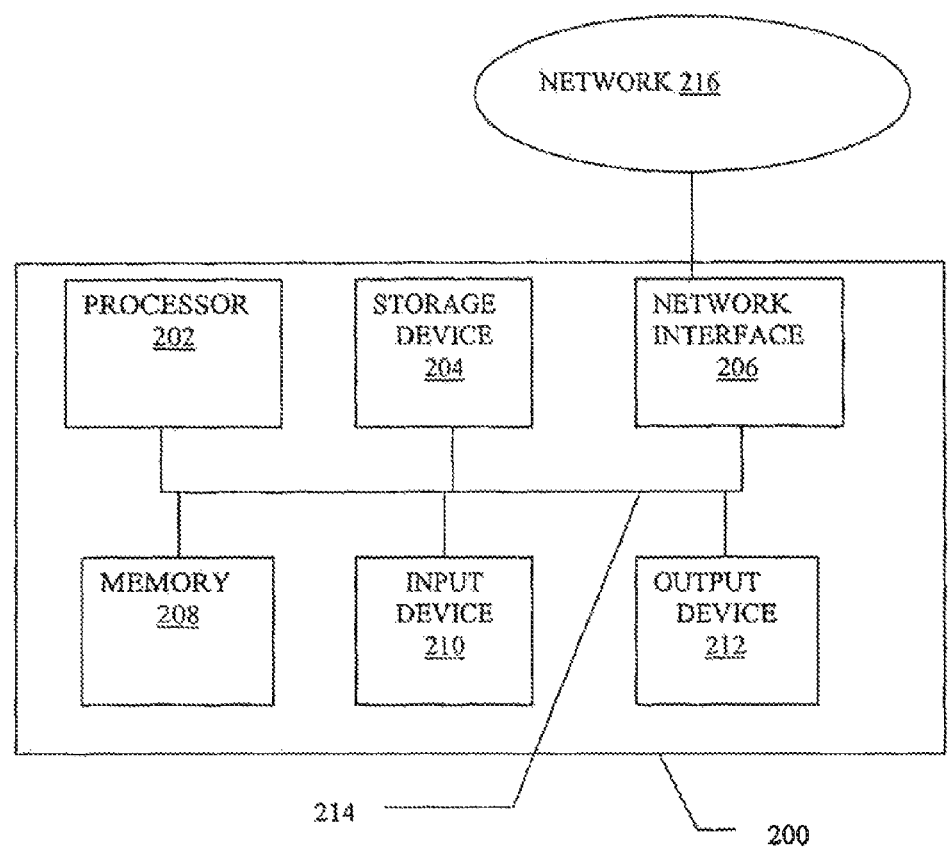
FIG. 2 shows an embodiment of the computer system of the present invention for implementing the methods of the present invention.

A system or apparatus for implementing the knowledge-base creation and content conversion or content manipulation method of the present invention can be a computer system 200, shown in FIG. 2. The computer system 200 includes a processor 202 coupled via a bus 214 to a memory 208, an input device 210, and an output device 212. The computer system 200 can also include a storage device 204 and a network interface 206. The processor 202 accesses data and programs stored in the memory 208. By executing the programs in memory 208, the processor can control the computer system 200, and can carry out steps to manipulate data and to control devices including, for example, the input device 210, the output device 212, the storage device 204, the network interface 206, and the memory 208. Programs stored in memory 208 can include steps to perform the methods of the present invention such as content conversion, associating words and word strings, and database creation and supplementing methods.

The storage device 204 records and stores information for later retrieval by the memory 208 or processor 202, and can include storage devices known in the art such as, for example, non-volatile memory devices, magnetic disc drives, tape drives, and optical storage devices. Storage device 204 can store programs and data, including databases that can be transferred to the memory 208 for use by the processor 202. Complete databases or portions of databases can be transferred to memory 208 for access and manipulation by the processor 202. The network interface 206 provides an interface between the computer system 200 and a network 216 such as the Internet, and transforms signals from the computer system 200 into a format that can be transmitted over the network 216, and vice versa. The input device 210 can include, for example, a keyboard and a scanner for inputting data into memory 208 and into the storage device 204. Input data can include text of documents to be stored in a Document Database for analysis and content conversion. The output device 212 includes devices for presenting information to a computer system user and can include, for example, a monitor screen and a printer.

Following is a detailed description of the present invention, including the various database creation methods and apparatuses (knowledge acquisition), and the conversion method and apparatus (i.e., knowledge reconstruction).

Section II describes the different methods for creating cross-state databases. Section III describes the knowledge reconstruction method and apparatus which uses the databases to convert documents between states (e.g., translation). Section IV describes methods and systems called Frequency Association Database (FAD) creation and Common Frequency Analysis (CFA) that provide the basis to create a knowledgebase of related ideas within a single state. Section V describes the methods of identifying semantic associations and relationships between words and words strings and other words and word strings (Knowledge Acquisition Lists) using one embodiment of the CFA of Section IV. Section VI describes several methods and systems for using single state knowledge acquisition in combination with other methods of the present invention to aid in language translation. Section VII describes how words and word strings of semantically equivalent ideas (identified as part of the knowledgebase built using the methods described in Section V) can be reconstructed in chains to produce alternate forms of the same complex idea within a single state or language. Section VIII describes methods for other applications utilizing the methods and systems of the present invention. Section IX uses the methods and systems described in Sections IV and V for smart applications.

II. Cross-State Knowledgebase Acquisition Method and Apparatus

The present invention provides several primary methods for cross-state knowledge acquisition, in one embodiment represented by the translation of words and word strings between two languages. In the first aspect of the present invention, a knowledgebase is acquired by analyzing documents to identify similar ideas expressed in different states or languages. One method of the present invention for acquiring a knowledgebase is to examine and compare different documents that express the same idea (either identically or as close to identical as possible). Building associations between two states using this method involves examining the same ideas in text or other material represented in two states or languages.

A second method of the present invention, called multilingual leverage, also builds associations for an idea represented in two states by using known translations that have been built using either the methods of the present invention or existing translation systems. This method is referred to as multiple state association, or multilingual leverage.

A third method of the present invention, referred to as Target Language Flooding, builds associations between word strings in different languages using a monolingual corpus in the Target Language and/or Parallel Text, along with any one or more of the following: machine translation systems known in the art, cross-language dictionaries known in the art, and/or custom-built cross-language dictionaries. The system generates alternative candidate translations for individual words in a Source Language word string (Target translations of Source words may be words or phrases) and searches Target Language documents for word strings containing different combinations of the different individual word translations in close proximity to one another.

A. Acquisition Using Parallel Text in Two States

One of the present invention's methods for creating a cross-idea knowledgebase between two languages or states includes examining and operating on previously translated or otherwise related documents in two languages. The method and apparatus of the present invention is utilized such that a database is created with associations across the two states—accurate conversions, or more specifically, associations between ideas expressed in one state and ideas expressed in another. For every recurring word or word string in the first language, corresponding ranges in the second language documents are analyzed for recurring words and word strings (after the subtraction adjustment as illustrated in FIG. 1) across the second language ranges. The translations and other relevant associations between the two states become stronger, i.e., more frequent, as more documents are examined and operated on by the present invention, such that by operation on a large enough "sample" of documents the most common associations become apparent and the method and apparatus can be utilized for conversion of new first language word strings into second language word strings.

Another embodiment of the present invention utilizes a computing device such as a personal computer system of the type readily available in the prior art. Although the computing device is typically a common personal computer (either stand-alone or in a networked environment), other computing devices such as PDAs, wireless devices, servers, mainframes, and the like are similarly contemplated. However, the method and apparatus of the present invention does not need to use such a computing device and can readily be accomplished by other means, including manual creation of the cross-associations. The method by which successive documents are examined to enlarge the "sample" of documents and create the cross-association knowledge is varied—the documents can be set up for analysis and manipulation manually, by automatic feeding (such as automatic paper loaders as known in the prior art), by using search techniques such as web crawlers on the Internet to automatically seek out the related documents, other web search tools, or by any other method that makes text available in a digital format.

Note that the present invention can produce an associated database by examining Comparable Text in addition to (or even instead of) Parallel Text. Furthermore, the method looks at all available documents collectively when searching for a recurring word or word string within a language.

According to this embodiment of the present invention, cross-language documents are examined for the purpose of building the knowledgebase, a cross-language Frequency Association Database of translations of word strings between and among languages. These word strings serve as the building blocks used to solve longer translation queries. For illustrative purposes, assume that the following documents contain the same content (or, in a general sense, ideas) in two different languages. Document A is in Language A, Document B is in Language B.

The first step in the present invention is to calculate a word range to be used in determining the approximate location of possible associations for any given word or word string. Since a cross-language word-for-word analysis alone will not yield productive results (i.e., word 1 in Document A will often not exist as the literal translation of word 1 in Document B), and the sentence structure of one language may have an equivalent idea in a different location (or order) in the sentence than another language, the database creation technique of the present invention associates each word or word string in the first language with all of the words and word strings found in a selected range in the second language document. This is also important because one language often expresses ideas in longer or shorter word strings than another language. The range is determined by examining the two documents, and is used to compare the words and word strings in the second document against each word or word string in the first document. That is, the words and word strings in the range in the second document are examined for possible associations they may have with each recurring word and word string in the first document. By testing against a range, the database creation technique establishes a number of second language words and word strings that may equate and translate to the first language words and word strings.

There are two attributes that must be determined in order to establish the range in the second language document in which to look for associations for any given word or word string in the first language document. The first attribute is the size of the range (to be used in the second document), measured by the number of words in the range (e.g., 50 words). The second attribute is the location of the range in the second document, measured by the placement of the midpoint of the range. Both attributes are user-defined, but examples of preferred embodiments are offered below. In defining the size and location of the range, the goal is to insure a high probability that the second language word or word string translation of the segment in the first language being analyzed will be included inside the range.

Various techniques can be used to determine the size or value of the range including common statistical techniques such as the derivation of a bell curve based on the number of words in a document. With a statistical technique such as a bell curve, the range at the beginning and end of the document will be smaller than the range in the middle of the document. A bell-shaped frequency for the range allows reasonable chance of extrapolation of the translation whether it is derived according to the absolute number of words in a document or according to a certain percentage of words in a document. Other methods to calculate the range exist, such as a "step" technique where the range exists at one level for the first percentage of words, a second higher level for the middle percentage of words, and a third level equal to the first level for the last percentage of words. Again, all range attributes can be user-defined or established according to other possible parameters with the goal of capturing useful associations for the word or word string being analyzed in the first language.

The user may define the range, or the system may dynamically test and adjust to determine a final range by starting with a narrowly defined range (e.g., ten words) and iteratively expanding the range until a threshold is reached or the desired information in the Target Language is found.

The location of the range within the second language document may depend on a comparison between the numbers of words in the two documents. What qualifies as a document for range location purposes is user-defined and is exemplified by paragraphs, aligned sentences, news articles, book chapters, and any other discretely identifiable units of content, made up of multiple data segments. If the word count of the two documents is roughly equal, the location of the range (i.e., the range midpoint) in the second language will roughly coincide with the location of the word or word string being analyzed in the first language. If the number of the words in the two documents is not equal, then a ratio may be used to correctly position the location of the range. For example, if Document A has 50 words and Document B has 100 words; the ratio between the two documents is 1:2. The midpoint of Document A is word position 25. If word 25 in Document A is being analyzed, however, using word position 25 as the placement of the range midpoint in Document B is not effective, since this position (word position 25) is not the midpoint of Document B. Instead, the range midpoint in Document B for analysis of word 25 in Document A may be determined by (1) the ratio of words between the two documents (making the range midpoint in Document B word 50), (2) by manual placement in the midpoint of Document B, or (3) by many other techniques.

The user-defined size of the range may be very large to ensure a high likelihood of locating the translation of the first language word or word string in the second language document. For example, it might be necessary to define the range as the 25 words to the left of the range midpoint and 25 words to the right of the range midpoint (for a total range of 51 words). The 51-word range in this example would be from word 25 to 75. The parsing and analysis of all combinations of words and word strings in the 51-word range would require many calculations.

A more efficient method to establish the range is to establish the 51-word range as described above, and then search it for certain known translations of words and word strings that closely precede the word or word string being analyzed in the Source (first) document as well as known translations of words and word strings closely following the word or word string being analyzed in the Source document. Identifying a user-defined number of word and word string translations in the ranges that precede and follow the first language word or word string being analyzed will narrow the beginning and end of the range to conduct the cross-language association algorithm for recurring words and word strings within the second language ranges. By "framing" a smaller range using known translations of words and word strings just preceding and following the word or word string being analyzed, the size of the final range is reduced and therefore so are the number of parsed words and word strings for which statistics must be calculated.

For example, assume the system is analyzing the English word string "the most popular" to learn the associations to Language X words and word strings using Parallel Text between English and Language X. Further assume that one sentence in the English documents is "The car is the most popular mode of transportation in America." Rather than analyze all word strings within 25 words of the range midpoint of the corresponding second language document based on the ratio of words, one embodiment involves an examination within that initial 51-word range in Language X for a known translation of an English word string that precedes "the most popular" in the English document, such as the Language X word string translation of "The car." In this process, the present invention would also locate a word string that follows the analyzed word string in the English document, such as "in America" and locate its known Language X translation in the initial range. By identifying these known translations in Language X of word strings in English, the range used to parse all recurring words and word strings will encompass fewer potential combinations while still likely capturing the translation. Also, if the Source Language word string being analyzed contains a distinct (user-defined) word or token known to the system, the range midpoint can be efficiently set by placing it at the location of the translation of the token word in the Target Language text in the same approximate location of the document.

By looking at the position of a word or word string in the document and noting all the words and word strings that fall within the range of a Parallel language document as described above, the cross-language Frequency Association Database creation technique of the present invention returns a set of words and/or word strings in the second language document that may translate to each word or word string in the first language document being analyzed. As the database creation technique of the present invention is utilized, the set of words and/or word strings that qualify as possible translations will be narrowed as association frequencies develop. Thus, after examining a pair of documents, the present invention will create association frequencies for words and/or word strings in one language with words and/or word strings in a second language. After a number of document pairs are examined according to the present invention, the cross-language association database creation technique will return higher and higher association frequencies for some words and/or word strings. After a large enough sample, the highest association frequencies result in possible translations; of course, the ultimate point where the association frequency is deemed to be an accurate translation is user-defined and subject to other interpretive translation techniques (such as those described in Provisional Application No. 60/276,107, entitled "Method and Apparatus for Content Manipulation" filed on Mar. 16, 2001 and incorporated herein by reference).

As indicated above, the invention tests not only words but also word strings. As mentioned, word strings can include all punctuation and other marks as they occur, depending on user-defined parameters. If enough cross-language text exists to include punctuation as part of a word string, it is typically desirable to do so. After a single word in a first language is analyzed, the database creation technique of the present invention analyzes a two-word word string, then three-word word string, and so on in an incremental manner. This technique makes possible the translation of words or word strings in one language that translate into shorter or longer word strings (or a word) in another language, as often occurs. If a word or word string only occurs once in all available documents in the first language, the process immediately proceeds to analyze the next word or word string, where the analysis cycle occurs again. The analysis stops when all words and word strings that have multiple occurrences in the first language in all available Parallel and Comparable Text have been analyzed.

After the range is established, all documents should be aggregated and treated as one single document for purposes of looking for recurring words and word strings. For a word or word string not to repeat, it would have to occur only once in all available Parallel and Comparable Text. In addition, as another embodiment it is possible to examine the range corresponding to every word and word string regardless of whether or not it occurs more than once in all available Comparable and Parallel Text.

As another embodiment, rather than pre-building the database, it can be built by resolving, on-the-fly, specific words and word strings that are entered as part of a query. When words and word strings are entered for translation, the present invention can look for multiple occurrences of the words and word strings in cross-language documents stored in memory that have not yet been analyzed, by locating cross-language text on the Internet using web crawlers, web search tools, and other devices, and, finally, by asking the user to supply a missing association based on the analysis of the query and the lack of sufficiently available cross-language material. This building of the knowledgebase on-the-fly represents "learning by doing" as the system builds words and word strings at the time they are needed for an application, and also stores them in the database for future reference.

The present invention thus operates in such a manner so as to analyze word strings, and can operate in such a manner so as to account for context of word choice as well as grammatical idiosyncrasies such as phrasing, style, or abbreviations.

Occurrences of a subset word or word string will be returned as an association on its own and as part of a larger word string. In one embodiment of the present invention, after tabulating the frequency of recurring words and word strings in cross-language text, the system accounts for these occurrences of a subset word or word string that also appears as part of a larger word string. The present invention accounts for these patterns by subtracting from the frequency count the number of times a word or word string is returned as part of a larger word string, as illustrated in FIG. 1. For example, proper names are sometimes presented complete (as in "John Doe"), abbreviated by first or surname ("John" or "Doe"), or abbreviated by another manner ("Mr. Doe"). The present invention will most likely return more individual word returns than word string returns (i.e., more returns for the first or surnames rather than the full name word string "John Doe"), because the words that make up a word string will necessarily be counted individually as well as part of the phrase. Therefore, a mechanism to change the ranking should be utilized. For example, in any document the name "John Doe" might occur one hundred times, while "John" by itself or as part of "John Doe" might occur one hundred-twenty times, and "Doe" by itself or as part of "John Doe" might occur one hundred-ten times. The present invention's association method without adjustment will rank "John" higher than "Doe," and both of those words higher than the word string "John Doe"—all when attempting to analyze the word string "John Doe." By subtracting the number of occurrences of the larger word string from the occurrences of the subset (or individual returns) the proper ordering may be accomplished (although, of course, other methods may be utilized to obtain a similar result). Thus, subtracting one hundred (the number of occurrences for "John Doe"), from one hundred twenty (the number of occurrences for the word "John"), the adjusted return for "John" is twenty. Applying this analysis yields post-adjustment frequencies of one hundred for the word string "John Doe," twenty for the word "John," and ten for the word "Doe," thus creating the proper associations. The system subtracts the number of occurrences of the larger word string association from the frequency of all subset associations when ranking associations of a second language to the first language. These concepts are reflected in FIG. 1.

In this embodiment, to adjust for words and word strings that are subsets of larger words and word strings that recur in the second language ranges, the frequency for each word or word string is reduced by the adjusted frequency of all word strings (of which it is a subset). Other user-defined methods can be used so that when a word string appears in a range, its word and word string component parts are adjusted for final frequency counts.

For example, a word string in hypothetical Language X means "very good year". This word string is being analyzed to build a translation association using Parallel Text from Language X into English, and the word string "very good year" appears 80 times in the English language ranges, then the word strings "very good" and "good year" and the individual words "very", "good" and "year" will all be counted by the system at least 80 times in the ranges because they are part of the three-word word string. One embodiment of the system can make an adjustment to the frequency counts to prevent skewing the counts when they are part of a larger recurring string. Below is an example of how the frequency scores might be adjusted based on the following partial list of hypothetical frequency counts for words and word strings in the ranges in the English language documents across from the Language X word string being analyzed:

| Word or word string | Freq Count | Adj. Freq. Count |
| --- | --- | --- |
| Very good year | 80 | 80 |
| Good year | 130 | 50 |
| Good | 158 | 23 |
| Year | 140 | 10 |
| Very good | 85 | 5 |
| Very | 87 | 2 |

The results are a product of each frequency count being adjusted by subtracting the adjusted counts of all word strings it is a sub-string of. The adjusted count for the word "good" (23) was reached by subtracting the adjusted count for "very good year" (80), "good year" (50) and "very good" (5), the longer word strings it was a part of that recurred in the range.

By calculating co-occurrences of recurring word strings of any size located in approximately the same relative areas across Parallel Text, the method of the present invention provides a cross-idea database that can be used for document content manipulation and conversion. FIG. 1 depicts an embodiment of a cross-idea Frequency Association Database created by the present invention using Parallel Text. This embodiment of a cross-idea database comprises a listing of associated data segments in columns 1 and 2. The data segments are symbols or groupings of characters that represent a particular idea in a system of expression.

For example, where a system of expression in a document is a human language that uses words, a segment can be a word or a string of words. Thus, System A Segments in column 1 are data segments (in the present embodiment, words or characters with semantic value) that represent various ideas and combination of ideas Da1, Da2, Da3 and Da4 in a hypothetical system of Expression A. System B Segments in column 2 are data segments Db1, Db2, Db3, Db4, Db5, Db6, Db7, Db9, Db10 and Db12, that represent various ideas (words or characters with semantic value) and some of the combinations of those ideas in a hypothetical system of Expression B that are ordered by association frequency with data segments in system of Expression A. Column 3 shows the Direct Frequency, which is the number of times the segment or segments in Language B were associated with the listed segment (or segments) in Language A. Column 4 shows the Frequencies after Subtraction, which represents the number of times a data segment (or segments) in Language B has been associated with a segment (or segments) in Language A after subtracting the number of times that segment (or segments) has been associated as part of a larger segment.

As shown in FIG. 1, it is possible that a single segment, for example Da1, is most appropriately associated with multiple segments, Db1 together with Db3 and Db4. The higher the frequencies after subtraction between data segments, the higher the probability that a System A Segment is equivalent to a System B Segment. In addition to measuring adjusted frequencies using the metric "total number of occurrences," the adjusted frequencies can also be measured, for example, by calculating the percentage of time that particular System A Segments correspond to a particular System B Segment. When the database is used to translate a document, the highest ranked associated segment will be retrieved from the database first in the process. Often, however, the dual-anchor overlap method used to combine segments for translation will dictate that a different, lower ranked association be used because the higher ranked association proves incompatible with the left or right context.

For example, if the database were queried for an association for Da1, it would return Db1+Db3+Db4. If the dual-anchor overlap process that accurately combines data segments for translation determines Db1+Db3+Db4 cannot be used, the database would then return the next choice, Db9+Db10, to test for accurate combination through overlap with the contiguous associated segment or segments, for translation.

Additionally, the database can be instructed to ignore common words when counting association frequencies for words—for example in English, words such as "it", "an", "a", "of", "as", "in", and the like (known in the art as "stop words") can be removed from consideration. This allows the association database creation technique of the present invention to prevent common words from potentially skewing the analysis without excessive subtraction calculations (reducing noise and unnecessary computation). It should be noted that if these or any other common words or subset words or word strings of larger word strings were not "subtracted" out of the association database, they would ultimately not be approved as a translation, unless appropriate, because the dual-anchor overlap process (described in more detail herein) would not accept it.

It should be noted that stop words are typically included in the analysis of a word string they are a part of. For example, while the system may be instructed to ignore the occurrences of words like "a" and "is" when found in the ranges when establishing frequencies for an individual word, the system will typically not ignore the words "a" and "is" as part of a recurring word string such as "she is a good student".

Other calculations to adjust the association frequencies could be made to insure the accurate reflection of the number of common occurrences of words and word strings. For example, an adjustment to avoid double counting may be appropriate when the ranges of analyzed words overlap, as described below. Adjustments are desirable in these cases to build more accurate association frequencies.

An example of an embodiment of the method and apparatus for creating and supplementing a cross-idea Frequency Association Database according to the present invention will now be described using the two documents presented in Table 1 below:

TABLE 1

| Document A (Language A) | Document B (Language B) |
|---|---|
| X Y Z X W V Y Z X Z | AA BB CC AA EE FF GG CC |

While this example focuses on recurring words and word strings in only a few characters of Parallel Text, this is for illustrative purposes only. In the present invention recurring words and word strings will be analyzed using all available Parallel and Comparable Text in the aggregate. As indicated above, if multiple texts are combined, the range may first be established by examining each pair of documents, then recurring words and word strings in the ranges may be counted across all documents in the aggregate.

Using the Parallel documents listed above (Document A is in the first language (or Source Language); and Document B is in the second language (or Target Language)), the following steps occur for the database creation technique.

Step 1. First, the size and location of the range is determined. As indicated, the size and location may be user-defined or may be approximated by a variety of methods including but not limited to comparing word counts in Source and Target documents, finding known lexical anchors, finding sentence boundaries that correspond, or any other method. In this illustration, the word count of the two documents is used and is approximately equal (ten words in Document A, eight words in Document B), therefore we will locate the range midpoint to coincide with the location of the word or word string in Document A. (Note: As the ratio of word counts between the documents is 80%, the location of the range alternatively could have been established by applying a fraction of ⅘ths). In this example, variable range sizes will be used to approximate a bell curve: the range will be (+/−) 1 at the beginning and end of the document, and (+/−) 2 in the middle. However, as indicated, the size and location of the range (or the method used to determine the range) is entirely user-defined and will likely be much larger than the range here (chosen simply to illustrate the concepts) in order to increase the probability that the translation of the Source Language word or word string will be in the Target Language range in the Parallel Text.

Step 2. Next, the first word in Document A is examined and tested against Document A to determine the number of occurrences of that word in the document. In this example, the first word in Document A is X: X occurs three times in Document A, at positions 1, 4, and 9. The position numbers of a word or word string are simply the locations of that word or word string in the document relative to other words. Thus, the position numbers correspond to the number of words in a document, ignoring punctuation. For example, if a document has ten words in it, and the word "king" appears twice, the position numbers of the word "king" are merely the places (out of ten words) where the word appears.

Because word X occurs more than once in the document, the process proceeds to the next step. If word X only occurred once, then that word would be skipped and the process continued to the next word where the creation process is continued.

Step 3. Possible Target Language translations for Source Language word X at position 1 are returned: applying the range to Document B yields words at positions 1 and 2 (1+/−1) in Document B: AA and BB (located at positions 1 and 2 in Document B). All possible combinations are returned as potential translations or relevant associations for X: AA, BB, and AA BB (as a word string combination). Thus, X1 (the first occurrence of word X) returns AA, BB, and AA BB as associations.

Step 4. The next position of word X is analyzed. This word (X2) occurs at position 4. Since position 4 is near the center of the document, the range (as determined above) will be two words on either side of position 4. Possible associations are returned by looking at word 4 in Document B and applying the range (+/−) 2—hence, two words before word 4 and two words after word 4 are returned. Thus, words at positions 2, 3, 4, 5, and 6 are returned. These positions correspond to words BB, CC, AA, EE, and FF in Document B. All forward contiguous permutations of these words (and their combined word strings) are considered. Thus, X2 returns BB, CC, AA, EE, FF, BB CC, BB CC AA, BB CC AA EE, BB CC AA EE FF, CC AA, CC AA EE, CC AA EE FF, AA EE, AA EE FF, and EE FF as possible associations.

Step 5. The returns of the first occurrence of X (X1), which is in position 1, are compared to the returns of the second occurrence of X (X2), which is in position 4, and matches are determined. Note that returns which include the same word or word string occurring in the overlap of the two ranges should be reduced to a single occurrence. For example, in this example the word at position 2 is BB; this is returned both for the first occurrence of X (when operated on by the range) and the second occurrence of X (when operated on by the range). Because this same word position is returned for both X1 and X2, the word is counted as one occurrence. If, however, the same word is returned in an overlapping range, but from two different word positions, then the word is counted twice and the association frequency is recorded. In this case the returns for word X is AA, since that word (AA) occurs in both association returns for X1 and X2. Note that the other word that occurs in both association returns is BB; however, as described above, since that word is the same position (and hence the same word) reached by the operation of the range on the first and second occurrences of X, the word can be disregarded (i.e., treated as if it had only appeared in one of the ranges).

Step 6. The next position of word X (position 9) (X3) is analyzed. Applying a range of (+/−) 1 (near the end of the document) returns associations at positions 8, 9 and 10 of Document B. Since Document B has only 8 positions, the results are truncated and only word position 8 is returned as possible values for X: CC. (Note: alternatively, user-defined parameters could have called for a minimum of two characters as part of the analysis that would have returned position 8 and the next closest position (which is GG in position 7)).

Comparing X3's returns to X1's returns reveals no matches and thus no associations.

Step 7. The next position of word X would be analyzed; however, there are no more occurrences of word X in Document A. At this point an association frequency of one (1) is established for word X in Language A, to word AA in Language B.

Step 8. Because no more occurrences of word X occur, the process is incremented by a word and a word string is tested. In this case the word string examined is "X Y", the first two words in Document A. The same techniques described in steps 2-7 are applied to this phrase.

Step 9. By looking at Document A, there exists only one occurrence of the word string X Y. At this point the incrementing process stops and no database creation occurs. Because an end-point has been reached, the next word is examined (this process occurs whenever no matches occur for a word string); in this case the word in position 2 of Document A is "Y".

Step 10. Applying the process of steps 2-7 for the word "Y" yields the following:

Two occurrences of word Y (positions 2 and 7) exist, so the database creation process continues (again, if Y only occurred once in Document A, then Y would not be examined);

The size of the range at position 2 is (+/−) 1 word;

Application of the range to Document B (position 2, the location of the first occurrence of word Y) returns results at positions 1, 2, and 3 in Document B;

The corresponding foreign language words in those returned positions are: AA, BB, and CC;

Examining only forward-permutations yields the following possibilities for Y1: AA, BB, CC, AA BB, AA BB CC, and BB CC;

The next position of Y is analyzed (position 7);

The size of the range at position 7 is (+/−) 2 words;

Application of that range to Document B (position 7) returns results at positions 5, 6, 7, and 8: EE, FF, GG, and CC;

All permutations yield the following possibilities for Y2: EE, FF, GG, CC, EE FF, EE FF GG, EE FF GG CC, FF GG, FF GG CC, and GG CC;

Matching results from Y1 returns CC as the only match;

Combining matches for Y1 and Y2 yields CC as an association frequency for Y.

Step 11. End of range incrementation: Because the only possible match for word Y (word CC) occurs at the end of the range for the first occurrence of Y (CC occurred at position 3 in Document B), the range is incremented by 1 at the first occurrence to return positions 1, 2, 3, and 4: AA, BB, CC, and AA; or the following forward permutations: AA, BB, CC, AA BB, AA BB CC, AA BB CC AA, BB CC, BB CC AA, and CC AA. Applying this result still yields CC as the only potential translation for Y. The range is incremented because the returned match was at the end of the range for the first occurrence (the base occurrence for word "Y"); whenever this pattern occurs, an end of range incrementation will occur as a sub-step (or alternative step) to ensure the idea is not truncated.

Step 12. Since no more occurrences of "Y" exist in Document A, the analysis increments one word in Document A and the word string "Y Z" is examined (the next word after word Y). Incrementing to the next string (Y Z) and repeating the process yields the following:

Word string Y Z occurs twice in Document A: position 2 and 7. Possibilities for Y Z at the first occurrence (Y Z1) are AA, BB, CC, AA BB, AA BB CC, BB CC; (alternatively the range parameters can be defined to include the expansion of the size of the range as word strings being analyzed in Language A get longer.)

Possibilities for Y Z at the second occurrence (Y Z2) are EE, FF, GG, CC, EE FF, EE FF GG, EE FF GG CC, FF GG, FF GG CC, and GG CC;

Matches yield CC as a possible association for word string Y Z;

Extending the range (the end of range incrementation) yields the following for Y Z: AA, BB, CC, AA, AA BB, AA BB CC, AA BB CC AA, BB CC, BB CC AA, and CC AA.

Applying the results still yields CC as an association frequency for word string Y Z.

Step 13. Since no more occurrences of "Y Z" exist in Document A, the analysis increments one word in Document A and the word string "Y Z X" is examined (by adding the next word after word Z (position 3) in Document A). Incrementing to the next word string (Y Z X) and repeating the process (Y Z X occurs twice in Document A) yields the following:

The range for the first occurrence of Y Z X includes positions 1, 2, 3, 4, and 5;

Permutations are AA, BB, CC, AA, EE, AA BB, AA BB CC, AA BB CC AA, AA BB CC AA EE, BB CC, BB CC AA, BB CC AA EE, CC AA, CC AA EE, and AA EE;

The range for the second occurrence of Y Z X includes positions 5, 6, 7, and 8;

Permutations are EE, FF, GG, CC, EE FF, EE FF GG, EE FF GG CC, FF GG, FF GG CC, and GG CC.

Comparing the two yields CC as an association frequency for word string Y Z X; again, the return of EE as a possible association is disregarded because it occurs in both instances as the same word (i.e., at the same position).

Step 14. Incrementing to the next word string (Y Z X W) finds only one occurrence; therefore the word string database creation is completed and the next word is examined: Z (position 3 in Document A).

Step 15. Applying the steps described above for Z, which occurs 3 times in Document A, yields the following:

Returns for Z1 are: AA, BB, CC, AA, EE, AA BB, AA BB CC, AA BB CC AA, AA BB CC AA EE, BB CC, BB CC AA, BB CC AA EE, CC AA, CC AA EE, and AA EE;

Returns for Z2 are: FF, GG, CC, FF GG, FF GG CC, and GG CC;

Comparing Z1 and Z2 yields CC as an association frequency for Z;

Z3 (position 10) has no returns in the range as defined. However, if we add to the parameters that there must be a least one return for each Language A word or word string, the return for Z3 will be CC.

Comparing the returns for Z3 with Z1 yields CC as an association frequency for word Z. However, this association is not counted because CC in word position 8 was already accounted in Z2's association above. When an overlapping range would cause the process to double count an occurrence, the system can reduce the association frequency to more accurately reflect for the number of true occurrences.

Step 16. Incrementing to the next word string yields the word string Z X, which occurs twice in Document A. Applying the steps described above for Z X yields the following:

Returns for Z X1 are: AA, BB, CC, AA, EE, FF, AA BB, AA BB CC, AA BB CC AA, AA BB CC AA EE, AA BB CC AA EE FF, BB CC, BB CC AA, BB CC AA EE, BB CC AA EE FF, CC AA, CC AA EE, CC AA EE FF, AA EE, AA EE FF, and EE FF. Returns for Z X2 are: FF, GG, CC, FF GG, FF GG CC, and GG CC;

Comparing the returns yields the association between word string Z X and CC.

Step 17. Incrementing, the next phrase is Z X W. This occurs only once, so the next word (X) in Document A is examined.

Step 18. Word X has already been examined in the first position. However, the second position of word X, relative to the other document, has not been examined for possible returns for word X. Thus word X (in the second position) is now operated on as in the first occurrence of word X, going forward in the document:

Returns for X at position 4 yield: BB, CC, AA, EE, FF, BB CC, BB CC AA, BB CC AA EE, BB CC AA EE FF, CC AA, CC AA EE, CC AA EE FF, AA EE, AA EE FF, and EE FF.

Returns for X at position 9 yield: CC.

Comparison of the results of position 9 to results for position 4 yields CC as a possible match for word X and it is given an association frequency.

Step 19. Incrementing to the next word string (since, looking forward in the document, no more occurrences of X occur for comparison to the second occurrence of X) yields the word string X W. However, this word string does not occur more than once in Document A so the process turns to examine the next word (W). Word "W" only occurs once in Document A, so incrementation occurs—not to the next word string, since word "W" only occurred once, but to the next word in Document A—"V". Word "V" only occurs once in Document A, so the next word (Y) is examined. Word "Y" does not occur in any other positions higher than position 7 in Document A, so the next word (Z) is examined. Word "Z" occurs again after position 8, at position 10.

Step 20. Applying the process described above for the second occurrence of word Z yields the following:

Returns for Z at position 8 yields: GG, CC, and GG CC;

Returns for Z at position 10 yields: CC;

Comparing results of position 10 to position 8 yields no associations for word Z.

Again, word CC is returned as a possible association; however, since CC represents the same word position reached by analyzing Z at position 8 and Z at position 10, the association is disregarded (i.e., treated as if it had only appeared in one of the ranges).

Step 21. Incrementing by one word yields the word string Z X; this word string does not occur in any more (forward) positions in Document A, so the process begins anew at the next word in Document A—"X". Word X does not occur in any more (forward) positions of Document A, so the process begins anew. However, the end of Document A has been reached and the analysis stops.

Step 22. The final association frequency is tabulated combining all the results from above and subtracting out duplications and, if they had occurred, subset strings of larger strings (as reflected in FIG. 1), as previously explained.

Obviously, there is insufficient data to return conclusive results for words and word strings in Document A. As more document pairs are examined containing words and word strings with those associations examined above, the association frequencies will increase such that word and word string translations between Languages A and B will build strong associations. The above range calculations illustrate the concept although typically the user-defined range will be substantially larger than three words to ensure the translation is usually included.

To further strengthen the associations that are built using Parallel Text and the process just described, the process can be run in the reverse direction. The system can use the Target Language word string translation candidates that appeared most frequently in the Target Language ranges using the process just described, and build associations for those Target Language words and word strings in the Source Language using the available Parallel Text. If the Source Language word or word string that originally generated the Target Language translation candidate ranks high enough (based on user-defined frequency or percentage) on the Target Language candidates list, the Target Language translation candidate for that Source Language term can be approved as a valid translation for the Source Language term (word or word string). This is referred to as the "bi-directional locking mechanism" of the present invention. Ultimately, Parallel Text in each language pair can be used to build out association databases going in both directions.

In an alternative embodiment for cross-language association using Parallel Text, a range in the Target Language is chosen for each recurring word or word string being analyzed in the Source Language, corresponding ranges in the Target Language are determined in accordance with the above-described method. Then all recurring words and word strings within those ranges are added together to obtain their frequency counts. The frequency of words and word strings in the ranges are reduced by the frequency count of larger word strings to avoid counting smaller parts of larger word strings as described above and illustrated in FIG. 1. This will give less weight to the most frequent word strings than the embodiment described above that associates words and word strings for each range individually to all other ranges. The embodiment described here, therefore, typically will require more documents to build reliable translations.

For example, assume that the Language X word string "ll mm pp" is being analyzed to find an association in Parallel documents in Language Y. If the word string "ll mm pp" is found four times in the Language X documents, four ranges of Language Y words and word strings are established in Language Y documents, one corresponding to each Language X word string "ll mm pp" found in the Parallel documents. If one correct translation in Language Y is "KK BB ZZ" and it is found in all four ranges, the above embodiment would produce a frequency count of four. The previous embodiment (analyzing each range independently against all other ranges) would produce a frequency count for "KK BB ZZ" of six. Once ranges are established, there are a variety of user-defined methods for tabulating frequencies of recurring words and word strings which, depending on the tabulation method, will provide higher or lower relative weights to individual results; the methods described above illustrate two preferred embodiments of tabulation methods.

The languages can be any type of conversion and are not necessarily limited to spoken/written languages. For example, the conversion can encompass computer languages, specific data codes such as ASCII, and the like. The database is dynamic, i.e., the database grows as content is input into the translation system, with successive iterations of the translation system using content entered at a previous time.

As demonstrated, this embodiment is representative of one technique of the present invention used to create associations. The techniques of the present invention need not be limited to language translation. In a broad sense, the techniques will apply to any two expressions of the same idea that may be associated, for at its essence foreign language translation merely exists as a paired association of the same idea represented by different words or word strings. Thus, the present invention may be applied to associating data, sound, music, video, computer programming languages, or any wide-ranging representations that exists for an idea, including ideas that are embodied by any sensory (sound, sight, smell, etc.) experiences. All that is required is that the present invention analyzes two embodiments of the same idea associated by co-occurrence of time (or in the case of documents, location of co-occurrence).

For words or word strings that cannot be translated using the cross-language documents, another embodiment of the present invention (described later) can generate words and word strings that are semantically equivalent to words or word strings in the Target or Source Language to provide additional ways to identify alternative word or word string translations. This method also allows the interchanging of certain class members of broad categories that share common contexts and sometimes can have potentially infinite members, such as names and numbers.

In addition, if available cross-language documents do not furnish statistically significant results for translation, user-defined parameters can combine the other methods of cross-language word string association of the present invention instead of, or in combination with, the method using Parallel Text. As a last resort, users can examine the candidates for translations and other associations that do not meet user-defined thresholds for approval, and approve and rank appropriate choices manually.

B. Acquisition Using Multiple-State Texts

Another embodiment of the present invention provides a method for building associations between equivalent or similar ideas in two languages or states by using associations between each of those two states and other third states. As documents in more language pairs are examined, the method and apparatus of the present invention will begin filling in "deduced associations" between language pairs based on those languages having a common association with other third languages, but not directly with one another. This type of indirect translation through multiple states is known as "multilingual leverage."

Deduced associations through the multilingual leverage technique can be produced between text in a pair of languages when the Source word string being translated has a known translation into one or several third languages, and the different third language translations have known translations into the Target Language. For example, if there is insufficient cross-language text to translate directly a Language A phrase "aa dd pz" into a Language B phrase, deducing an association can include comparing this Language A phrase with the phrase's translations in Languages C, D, E, and F, as shown in Table 2. Then, the translations of "aa dd pz" in Languages C, D, E, and F can be translated into Language B, as shown in Table 3. Deducing the association between Language A phrase "aa dd pz" and a phrase in Language B further includes comparing the Language B phrases that have been translated from the Language C, D, E, and F translations of "aa dd pz." Some of the Language B phrases that have been translated from the Language C, D, E, and F translations of "aa dd pz" may be identical and, in this preferred embodiment of the present invention, these will represent the correct Language B translation of the Language A phrase "aa dd pz." As shown in Table 3, Language C, D, and F translations to Language B produce identical Language B phrases, to provide the correct Language B translation, "UyTByM." Thus, a deduced association can be created between the Language A phrase and its correct Language B translation. Language E translation into Language B produces the non-identical Language B phrase ZnVPiO. This may indicate that Language A phrase "aa dd pz" or Language E phrase "153" has more than one meaning or that Language B phrases UyTByM and ZnVPiO are semantically equivalent (or similar) and will be approved at a time when confirmed by an indirect translation through another language into the phrase "ZnVPiO" or that translation result is produced using some other method.

TABLE 2

| Language A | Language C | Language D | Language E | Language F |
|---|---|---|---|---|
| aa dd pz | A1 d | Zyp | 153 | lAAAA))$ |

TABLE 3

| Language | Translation from Language A for "aa dd pz" | Translation to Language B |
|---|---|---|
| Language C | A1 d | UyTByM |
| Language D | Zyp | UyTByM |
| Language E | 153 | ZnVPiO |
| Language F | lAAAA))$ | UyTByM |

In another embodiment, use of the multilingual leverage method and apparatus of the present invention described above can improve the accuracy of existing translation systems known in the art. Existing translation systems (e.g., Rule-Based MT, SMT) will take a query and produce a result from Language A to Language B; this result may be compared to the results of the translation (using systems and apparatus of the prior art) of the query from Language A to other languages (e.g., languages C, D, E, and F) and, subsequently from those languages to Language B (using systems and apparatus of the prior art).

In order to confirm a translation, one embodiment of multilingual leverage using existing machine translation systems can require each Target Language word string (that is translated indirectly through a number of third languages) to appear in a number of user-defined common results in the Target as described above. Requiring that a user-defined number of indirect Target Language translations of a word string (using intermediate third language state of the art translation systems) match exactly to one another in the Target Language before being confirmed will increase the accuracy of each translated word string. While the accuracy of translation systems known in the art is not high, a number of common results in the Target Language from different intermediate third languages can exist if enough third language translation systems are used. Moreover, by connecting these indirect Target Language translations with a relatively high user-defined overlap required in the dual-anchor overlap aspect of the present invention (described in detail later), the accuracy of results of this embodiment can be further tested and enhanced.

Another embodiment of the multilingual leverage technique can use translations from Source Language to intermediate third languages and from those third languages into Target Language using a combination of the present invention's cross-language learning and word string translations in the database along with translation systems known in the art. The same basic principle is used to confirm a Target Language translation; a user-defined number of common indirect Target Language translation results from different third languages.

The number of common Target Language results required and number of intermediary languages used for multilingual leverage is user-defined. The more indirect translations through other languages used to verify translations of a word string or any other data segment, the more certain that the present invention will produce an accurate translation. As a final check for confirmation, based on user-defined criteria, Target Language translation results can be translated back to the Source Language using one or more third languages using the same technique as described above. If the translation back into the Source is either the original Source Language word string to be translated, or determined to be a semantic equivalent of the original Source Language word string (using Common Frequency Analysis of the present invention, which is described later), the translation into the Target Language is approved.

C. Acquisition Using Target Document Flooding

Another aspect of the present invention builds associations between word strings of different languages using a monolingual corpus in the Target Language and/or Parallel Text, along with any one or more of the following: machine translation systems known in the art, cross-language dictionaries known in the art, and/or custom-built cross-language dictionaries. These methods, which use the "Flooding" technique of the present invention, generate potential Target translations of the individual words of each word string parsed from a Source query using custom-built systems or systems known in the art, as mentioned above, (even though some of the potential word translations are likely to be wrong), and then searches Target Language documents for different combinations of the potential word translations (Target translations of Source words may be words or phrases) to produce a list of translation candidates for the Target word string.

In another embodiment using the Flooding technique, Source Language co-locations and idioms made up of two or more words are included in the dictionary. In this embodiment, each Source Language query word string is first tested to identify any known idiomatic or co-location word strings that make up part or all of the query word string. If an idiom or co-location is identified in the query, the translation of the idiom or co-location is retrieved from the dictionary and used as part of the Flooding process to search the Target corpus instead of using the translations of the individual words that make up the idiom or co-location. Obviously, any other Source Language word string can be added to the dictionary as well and translated into the Target Language for use in the Flooding process instead of translating those words individually.

1. Parallel Text Flooding

In one embodiment, Parallel Text is used along with a translation system known in the art (or a cross-language dictionary). To build Target Language associations for word strings in the Source Language, locate each word string's occurrence in the Source Language documents and establish corresponding ranges in the Parallel Text Target Language documents. The Target Language ranges are established in the same manner as they are when building cross-language associations using Parallel Text as described previously. A translation (or translations, if multiple systems are used) for the Source Language query word string is generated using a machine translation system known in the art, dictionary known in the art, or custom-built dictionary. The ranges in the Target Language documents are then searched using the translations (even though some of the translations are likely to be wrong), to identify words and word strings that are translation candidates. If any one of the identified word or word string translation candidates is found in a user-defined number or percentage of the ranges Flooded, that association may be approved as a translation. If a cross-language dictionary is used instead of a machine translation engine known in the art, each word of a Source Language word string is translated using all possible known translations of each word (Target translations of Source words can be words or phrases, as mentioned above), and different combinations of the word translations are identified within the ranges in the Target Language of the Parallel Text using the method described in the next section for Target Language Flooding. In addition, the Source Language query word string can be searched for idioms or co-locations (using the Source Language entries of a cross-language dictionary of idioms and co-locations); if the Source Language query word string contains an idiom and/or co-location, the translation can be used to Flood the Target corpus along with the word-for-word (and/or word-for-phrase) translation possibilities, as described herein.

2. Target Language Flooding

Using another method and embodiment of the Flooding technique, word strings can be translated from the Source Language to the Target Language by translating each word of the word string using a cross-language dictionary (or translation system known in the art) and searching for groups of those translated words in all available Target Language word strings using a Target Language corpus. This method does not rely on Parallel Text and requires only a large Target Language corpus (e.g., a document database, the world wide web). The need for only a corpus comprised of Target Language documents without translation counterpart documents in another language expands the opportunities for the present invention to identify word string associations across languages. As with all methods of the present invention that identify word string translations, word strings to be translated may be parsed from a Source document into word strings of user-defined size (i.e., number of words in the string) with a user-defined minimum number of overlapping words (as described later) to generate word strings for translation analysis on-the-fly, or word strings can be examined for addition to a translation knowledgebase.

Using the Target Language Flooding method, first, each word of a word string (the Source Language query word string) is translated to the Target Language on a word-for-word (and/or word-for-phrase) basis using a cross-language dictionary (or other translation system known in the art). The dictionary will often offer multiple options or candidates, and all Target Language translation candidates provided by the dictionary for each word of a word string being analyzed are identified. The dictionary may also contain translations for a Source Language word that translates into a Target Language word string (i.e., phrase). In this case, the word string will be translated as a single unit for searching the Target Language corpus. The dictionary may also be populated with translations of common Source Language idioms and co-locations. The Source Language query word string can be searched for idioms or co-locations, and if the Source Language query word string contains an idiom and/or co-location, their translations can also be used to Flood the Target corpus, as described herein. Flooding the Target corpus using idiom and/or co-location translation candidates can be done either before or along with the Flooding process described herein that uses translation candidates generated on a word-for-word (and/or word-for-phrase) basis. In addition, if the invention is being used for a Source Language where certain combinations of words can be combined in some way to form one word, the system can be adjusted to parse those kinds of words into the two or more individual components to be translated into two or more individual Target Language words.

For example in Hebrew, instead of having an independent word for "and," a Hebrew letter (the Hebrew letter "vuv") that means "and" is attached to the front of the word it refers to. In this case the invention could parse words starting with "vuv" from the rest of the word and generate a translation for "and," and a translation for the rest of the Hebrew word that "vuv" referred to. Additionally, if words are translated into the Target Language individually using a translation system known in the art, these systems typically produce two or more Target Language words for those word combination examples in the Source Language. Rules for different languages involving word combinations, word conjugations and other root word variations for tense, singular, plural, and the like, can be codified to expand the dictionary words used and accurately represent the semantic units to be searched in the Target Language corpus.

Next, after individual Target Language word translations are generated for each word (or idiom or co-location) in the Source Language query word string, the system searches a Target Language corpus for word strings of a user-defined maximum length containing a user-defined minimum number (or percentage) of translation candidates generated for each word of a Source Language query word string (in addition to any other user-defined search criteria). No more than one of the candidate translations generated for each Source Language word is counted in the Target Language word string toward satisfying the user-defined search requirements. A Target Language word string of user-defined maximum length will qualify if it contains any combination, found in any order, of the user-defined minimum number of candidates generated by the different Source Language words.

Qualifying word string returns form what is referred to as the "Query String Flooding List." Additionally, user-defined requirements can set the parameters for the Query String Flooding List based on the proximity of Source Language words and their Target Language counterparts. For example, user-defined parameters can require a Target Language translation of a Source Language word to be found within a user-defined number of words of a Target Language translation of an adjoining Source Language word. Candidates can be retrieved based on other user-defined search parameters, including the relationship between the distance between individual words in a Source Language word string and the distance between their respective translations in the Target Language word string translation candidates. Moreover, any user-defined parameters can incorporate these and/or other factors in the ranking of Target Language translation candidates. These settings for qualification and ranking will vary depending upon language pair based on the relationship between the two languages' structures.

To illustrate the Flooding technique using only a Target Language corpus, consider a four-word word string in Language X to be translated:

"aa bb cc dd"

The system would translate each word in the string to the Target Language, Language Y. Assume the cross-language dictionary had the following Language Y definitions for each word in the above Language X word string:

| Language X Word | Language Y Translations |
| --- | --- |
| aa | AA1, AA2, AA3, AA4, AA5, AA6 |
| bb | BB1, BB2, BB3 |
| cc | CC1, CC2, CC3, CC4 |
| dd | DD1, DD2, DD3, DD4, DD5 |

The system would then search a corpus of Target Language documents to locate a user-defined minimum number of the translations of the words (but only one candidate for any specific Source word counts toward the minimum) in a user-defined range. In this example, assume the parameters are set such that a minimum of three of the translated words (counting only one translation for any Source Language word) must be found within a string of six or fewer total words, regardless of the word position or order in which they are found. A partial list of some possible qualifying word strings found in a hypothetical Target Language corpus for this example might be:

Query String Flooding List (partial)
1. DD1 AA2 CC2 BB3
2. AM BB1 CC3 EE1
3. BB2 FF1 KK1 AA2 LL3 DD5
4. DD4 PP1 UU1 AA6 CC4 BB2
5. CC1 KK1 RR2 BB3 DD4
6. BB1 CC3 EE1 DD4

The returns for the Query String Flooding List can be further expanded by identifying any two results on the list that combine through overlap of a word string to form a larger word string result. These word string combinations can be added to the Query String Flooding List as possible word string translations. For example, in the above list of returns, the second return "AA1 BB1 CC3 EE1" and the sixth return "BB1 CC3 EE1 DD4" can combine through overlapping word strings to form "AA1 BB1 CC3 EE1 DD4" which can be added to the Query String Flooding List.

Returns on the Query String Flooding List are ranked based on user-defined criteria which typically include at least (1) largest number (or percentage) of Source word translations in the Target Language string (counting only one Target Language translation for each Source Language word) and (2) the smallest Target Language word strings (fewest words) that meet the first user-defined criteria for minimum number of Source Language word translations. For example, based on these two criteria (and weighting the first more than the second), the above returns could be ranked as follows:

1. DD1 AA2 CC2 BB3
2. AM BB1 CC3 EE1 DD4
3. DD4 PP1 UU1 AA6 CC4 BB2
4. AM BB1 CC3 EE1
5. BB1 CC3 EE1 DD4
6. CC1 KK1 RR2 BB3 DD4
7. BB2 FF1 KK1 AA2 LL3 DD5

The above rankings reflect a user-defined greater weighting of the first criteria (number of translated words in a word string) more than the second criteria (smallest word strings meeting first criteria). The first ranked result has all four translated words in a four-word word string. The second ranked result is the word string that was created (and added to the Query String Flooding List) by overlapping other returns, and contains all four translated words in a five-word word string. The third ranked result has all four translations in a six-word word string. Results ranked four and five are tied because both word strings contain three of the four translated words in a four-word word string. The sixth ranked result has three translated words in a five-word word string and the last ranked result has three translated words in a six-word word string.

Additionally, user-defined criteria based on the distance between Source Language words and their Target Language counterparts can be established. For example, if user-defined criteria required that translations for contiguous Source Language words be within three words of each other or less to qualify for the Query String Flooding List, the third (DD4 PP1 UU1 AA6 CC4 BB2) and sixth (CC1 KK1 RR2 BB3 DD4) ranked members would be eliminated. Note that a smaller word string that is a subset of the third ranked result would qualify for the Query String Flooding List (i.e., words four through six of the word string—DD4 PP1 UU1 AA6 CC4 BB2). Also note that when a Source Language word (or co-location or idiom) translates into a Target Language word string, the Target Language word string is always treated as a single unit (i.e., words in the word string must remain contiguous and in the same order) for the purpose of Flooding the Target Language corpus (except for occasional cases based on the particular characteristics of a language where all the words in the Target translation will not be contiguous).

Another embodiment of the invention for ranking Query String Flooding List returns can use a point system and add points for each word in the Target Language word string that is a translation of a Source Language word from the Source Language query word string, and deduct points for each word in a qualifying Target Language word string that is not a translation of one of the words in the Source Language query word string. Moreover, a word can count for more or less points based on its general frequency in language. For instance, non-stop words can be weighted more than stop words.

For example, user-defined settings may score each Target Language word string on the Query String Flooding List (1) by adding or subtracting 5 points for each stop word that appears in the Target Language word string based on whether or not it is a translation of a Source Language word from the Source Language query word string, and (2) adding or subtracting 20 points for a non-stop word (i.e., a word that isn't a frequently recurring word like "it", "and", or "the") that appears in the Target Language word string return based on whether or not it is a translation of a Source Language word from the Source Language query word string.

To illustrate this scoring using the previous example, assume "aa" and "cc" are stop words, and "bb" and "dd" are not stop words. In this example under the above user-defined scoring parameters, the word string "AA1 BB1 CC3 EE1" would have a score of 25 if EE1 is a stop word (5+20+5-5=25), and it would have a score of 10 if EE1 were not a stop word (5+20+5-20=10). Any other scoring scheme based on the number of words translated from the Source Language query word string and found on a word string on the Query String Flooding List can be used.

Returns produced at this point in the process will include correct, partially correct, and incorrect Target Language translation word strings. As described later, the present invention translates a Source document by parsing the document into overlapping word strings and combining Target Language word string translations that overlap. The requirement of large overlapping word strings (i.e., many words) between translation word strings will eliminate returns on a Query String Flooding List that are not correct translations of a word string because they do not have a user-defined sized overlap with other word string translations (as described later).

Returns on the Query String Flooding List, or any returns (using any method) that have not reached user-defined criteria to be confirmed as accurate translations, can be used in large overlapping chains, as described later, but only if the word strings that are the first and last word strings of a translation unit have been confirmed previously as accurate word string translations. Alternatively, the word string to the extreme left of a translation must be accurate on its left side and the word string to the extreme right of the larger translation must be accurate on its right side. Large overlapping (described later) unconfirmed translations sandwiched between two translations that are known to be accurate word string translations, or are at least confirmed on their far edges, can provide the basis of an accurate translation.

The Query String Flooding List can be refined by eliminating returns that are not correct translations without testing for overlapping word strings by performing the same Query String Flooding analysis as described above on larger word strings that include the original query word string plus additional words on each side. This embodiment will require a Source Language corpus that contains the Source Language query word string along with surrounding context words and or word strings, but this Source Language corpus need not be Parallel Text documents to the Target Language corpus. Using this method to continue the example above, the system would search Source Language text for a user-defined number of Source word strings containing the word string "aa bb cc dd" plus a user-defined number of words on either side. User-defined criteria can require that these longer Source word strings be parsed into a user-defined number of additional segments of user-defined size containing "aa bb cc dd" and then used to Flood Target Language documents as described above.

If for example the user requests five word strings each with three words on each side of the original string, the five Source word strings returned using a Source Language corpus might be:

1. "zz xx yy aa bb cc dd ll mm nn"
2. "kk rr ll aa bb cc dd aa kk oo"
3. "kg lh wk aa bb cc dd ql io rr"
4. "ck nk ak aa bb cc dd bk sk jk"
5. "dm ea jc aa bb cc dd tg ms jf"

This process would then parse the above strings into a user-defined number of word strings of user-defined size (in this example, a minimum of 5 words) to create Source Language word strings to be used to Flood the Target Language corpus based on user-defined criteria described below. If all possible parsings of the strings containing the original query are required by the user for analysis, the following parsed word combinations will be generated for the first word string identified above:

"zz xx yy aa bb cc dd ll mm nn"
"zz xx yy aa bb cc dd ll mm"
"zz xx yy aa bb cc dd ll "
"zz xx yy aa bb cc dd"
"xx yy aa bb cc dd ll mm nn"
"xx yy aa bb cc dd ll mm"
"xx yy aa bb cc dd ll "
"xx yy aa bb cc dd"
  "yy aa bb cc dd ll mm nn"
  "yy aa bb cc dd ll mm"
  "yy aa bb cc dd ll"
  "yy aa bb cc dd"
    "aa bb cc dd ll mm nn"
    "aa bb cc dd ll mm"
    "aa bb cc dd ll"

Potential Target Language translations for each of these word strings would be produced using the Flooding process described above. Each word string is analyzed by translating each word individually using a dictionary or an existing machine translation system and searching Target Language documents for Target Language word strings containing translations of the individual words, based on user-defined requirements for minimum number of word translations within a maximum number of words (and/or other requirements). The lists of Target returns generated are referred to as the "Query+Context Flooding Lists." The system would then generate Query+Context Flooding Lists for each remaining parsed word string derived from each of the original Source word strings (i.e., the Source word string query plus left and right context words—in this example, the remaining four ten-word word strings (2 through 5) identified above). Alternatively, a greater number of word strings with a context word or user-defined sized context word string to the right and left of the query word string can be generated by searching the Source Language corpus, and each string can be used in its entirety to create a Query+Context Flooding List without further parsing into smaller word strings.

Next, the system uses each of the results from the Query String Flooding List and searches for each as a sub-string of a larger word string on all of the Query+Context Flooding Lists generated from all Source Language word strings made up of the original query plus left and/or right context word strings. The system counts the total number of times a return from the Query String Flooding List appears as a sub-string of a longer word string result (or independently) on the Query+Context Flooding Lists.

These counts are then adjusted by subtracting the number of times a smaller word string (on the Query String Flooding List) appears as part of a larger word string (on the Query String Flooding List). For example, assume both word strings "DD1 AA2 CC2" and "DD1 AA2 CC2 BB3" are on the Query String Flooding List. If word string "DD1 AA2 CC2" appears 120 times as a sub-string of the word strings on the Query+Context Flooding Lists, and "DD1 AA2 CC2 BB3" has a count of 100, the frequency count for "DD1 AA2 CC2" would be adjusted by subtracting the number of times it appeared as part of the larger string "DD1 AA2 CC2 BB3", i.e., 120 minus 100 equals 20. This subtraction adjustment is conceptually similar to the subtraction adjustment made when using the method to build cross-language associations using Parallel Text that subtracts occurrences of smaller word strings that are part of a larger recurring word string, as illustrated in FIG. 1.

The word strings on the Query String Flooding List are then re-ranked based on the total number of times each result was found as sub-string of a larger word string (or independently) on the Query+Context Flooding Lists (after the subtraction adjustment described in the previous paragraph). Alternatively, user-defined parameters may require that the rankings be based partly on certain other factors including the number of words in the context word strings the result is found in as a sub-string and the balance between the number of times the sub-string is part of a left context word or word string and the number of times the sub-string is part of a right context word or word string.

At this stage in the process, if user-defined parameters require that only the left side or "edge" word string of a larger translation query is confirmed as accurate because it is the first word string in a chain of large overlapping word strings, then only left context words or word strings will be used for Query+Context Flooding Lists. If it is the right side word string in a long chain of overlapping word strings, then only right side context words and word strings will be produced along with the query for Query+Context Flooding Lists.

As an alternative embodiment, Query+Context Flooding Lists can be generated without generating a Query String Flooding List. Instead, each word string on a Query+Context Flooding List is treated as a Target Language range as used in cross-state learning using Parallel Text, and each is analyzed for recurring word strings in the same way. The counts of recurring word strings are tabulated and adjustments to the counts of shorter strings are made by subtracting the number of times they appeared as part of longer strings. If this method is employed, Query+Context Flooding Lists should be generated using different context words or word strings (rather than parsing the same strings in different sizes) for best results. Alternatively, parsing of context strings can be used, but translation of context words in context word strings would be ignored by the system for counting recurring word strings among the members of the Query+Context Flooding Lists.

There are other methods for improving Query String Flooding Lists. One of these methods involves generating close semantic equivalents for the query using the Common Frequency Analysis aspect of the present invention described later. Once additional Source Language word strings that represent ideas semantically similar to the query are generated, a cross-language dictionary can be used to perform the previously described Flooding technique on each option. This technique expands the number of Source Language translation options and is particularly useful when the original query word string involves an idiomatic expression (that is not in the cross-language dictionary) where the individual words may lose their semantic character completely.

The same process can be performed on each of the highest ranking results on the Query String Flooding List. A user-defined number of Target Language word strings on the Query String Flooding List (e.g., the top five) can be used to build a user-defined number of semantically similar Target Language word strings (e.g., five for each) using the aspect of the present invention that identifies semantically similar word strings, described later. These groups of synonymous word strings can be used to find common strings across multiple lists for confirmation of the word string translations that satisfy user-defined minimums for number or percentage of common word strings on any return's semantic equivalent list (described later). Additionally, these groups of synonymous word strings can be translated word-for-word back to the Source Language to see which group has the highest number of translations in common with the group of word strings synonymous to the Source Language query (as well as the query itself). The group of synonymous Target Language sentences that have the highest number of words translated back to Source Language that match the Source Language word strings or its synonyms, is the correct group of Target Language translations.

An additional method for refining the Query String Flooding List involves the use of the multilingual leverage technique in conjunction with the Flooding technique. In this embodiment, the Source Language query word string can be translated word-for-word (and/or word-for-phrase), using all possible translations for each word, into one or more third languages and each third language corpus of text is Flooded by searching for sentences and other word strings containing a user-defined minimum number of translated words within a maximum user-defined number of total words, as described above. Qualifying third language word strings are then translated word-for-word (and/or word-for-phrase) into the Target Language to be used to search for Target Language word strings that meet user-defined Flooding criteria described above. Alternatively, the translated words in the third language can be directly translated into the Target Language to be used to search for qualifying Target Language word strings, without searching the third language corpus for third language word strings as described in the previous step. Word strings found in the Target Language that qualify for the Query String Flooding List using more than one intermediate third language lends further confirmation of translations. Synonymous word strings in Source Language, Target Language, and intermediate third languages can be generated and used with a cross-language dictionary to further confirm translations as described above.

The multilingual leverage aspect of the present invention will also be useful to build and expand word level dictionaries for use in the present invention Target Language Flooding embodiments, as well as for any other purpose. If several dictionaries known in the art or custom-built are incomplete either because a Source Language word does not have an entry or has an entry but does not have a complete list of potential Target Language translations, the present invention can supplement the dictionary by using known translations of Source Language words into one or more third languages. The system can then take all the third language words and identify known Target Language translations. The most frequent Target Language translations produced using intermediate third languages are approved as translations. User-defined criteria determine how many common results qualify as a translation. Alternatively, a human editor can evaluate the list produced and eliminate incorrect translations if desired. Moreover, dictionaries can also be built using the methods and system for cross-language frequency association by examining single words in the Source Language. Target Language translation entries can also be expanding by the use of the method of the present invention that identifies semantically similar words and word strings within a single state or language using Common Frequency Analysis (described later).

D. Acquisition Using Multi-Method Differential

If any method used to identify cross-state associations produces a word string translation candidate that does not yet meet user-defined criteria for near statistical certainty as a correct translation, the partial results of two or more methods can be used together to confirm the association as a correct translation, or failing that, to move on to the next candidate translation. This will be desirable in cases where the text available for analysis does not have enough relevant word strings to approach statistical certainty. It will also be useful to employ partial results from different methods to confirm word string translations as a way to build associations using fewer calculations (which will save processing power and time). Additionally, as indicated above, the method of the present invention that identifies semantically equivalent word strings can be used to assist any of the methods for translation of word strings of the present invention or of any other system to identify or confirm word string translations.

It should also be noted that the present invention is able to keep track of results of user-defined parameters for determining approved results for translations (as well as semantic equivalents described later and any other output of methods of the present invention). This evaluation of the results will allow the system to use the results to automatically determine efficient defined parameters. These requirements will often include a combination of methods to provide combined near statistical certainty that a return is accurate.

III. Cross-State Knowledge Reconstruction Method and Apparatus

Another aspect of the present invention is directed to providing a method and apparatus for creating a second document comprised of data in a second state, form, or language, from a first document comprised of data in a first state, form, or language, with the end result that the first and second documents represent substantially the same ideas or information, and wherein the method and apparatus includes using a cross-idea association database. Database entries may be "pre-built" or may be built on an "as needed" basis (on-the-fly) using any method of the present invention.

One embodiment of the translation method utilizes a dual-anchor overlap technique to obtain an accurate translation of ideas from one state to another. An alternative embodiment would allow the approval of contiguous segments in the Target Language without a Target Language overlap from direct translations of overlapping Source Language word strings if indirect translations through a third language and then into the Target Language overlapped in the third language and their translations overlapped in the Target Language as well. The present invention, using the dual-anchor overlap technique, enables the building block word strings in a second language, form or state to be connected together organically and become accurate translations in their correct context in the exact manner those words and phrases would have been written or spoken by a native speaker of the second language. This technique resolves the issue of boundary friction encountered by existing EBMT systems.

In an embodiment of the present invention, the methods for word string association database creation and the overlap technique are combined to provide accurate language translation of documents of any length. By parsing any Source Language input into a series of word strings each with a user-defined number of overlapping words with both of the parsed word strings before and after it, and testing translations of those word strings in a Target Language for overlapping words or word strings, the present method and system can translate documents by piecing together building block ideas in a chain. When more overlapping words are required by user-defined settings, it results in a more accurate combination of word string translations in a Target Language.

Moreover, the results of word string translations assembled either manually or through any automatic method including any of the methods of the present invention used to build word and word string associations across language (e.g., using Parallel Text, multilingual leverage, Target Language Flooding, etc.) can be tested for accuracy by requiring greater word string overlap (i.e., more overlapping words) with the neighboring word strings on both sides of the word string translation when it is taken as part of a larger translation query (as long as they are anchored by known word string translations on both sides). The dual-anchor overlap technique will not permit otherwise semantically correct translations that do not fit the specific context of a larger translation query; furthermore, the dual-anchor overlap will eliminate semantically incorrect translations. Therefore, the dual-anchor overlap technique can be used to confirm or eliminate a candidate word string translation identified by any cross-language association method of the present invention when that method alone has not reached a point of user-defined confirmation for a word string translation. For example, if a Source document is parsed only in segments of word strings with full overlap of all words of each word string, and the far left and far right word string translations are known to be accurate, no Target Language translation candidate will be accepted that is incorrect for either semantic or grammatical reasons.

Moreover, once word string translation candidates are approved through large overlaps anchored by known word string translations, these newly confirmed word string units can be added to the database as known accurate translations. Additionally, word strings in the overlap across two languages of two known word string translations can be approved as an independent word string translation.

A. Document Translation through Use of an Association Database and Dual-Anchor Overlap Technique As another preferred embodiment, the present invention can translate a document in a first language into a document in a second language by using a cross-language database as described above. Entries may exist for a word string translation or can be built on-the-fly using any of the above methods to build word string translations across languages.

One embodiment of this aspect of the present invention starts by locating the longest word strings that begin each sentence of the document to be translated (Source document) along with all of their potential translations that meet user-defined criteria using any of the above methods for identifying potential Target Language word string translations. Next, the method identifies a second word string for each of the sentences of the document to be translated (Source document), with a user-defined number of overlapping words with the previously identified word string, along with their potential translations (the user defines the length of the overlap (i.e., number of words) that is required). If a Target word string translation of the second identified word string of a sentence (in the Source Language) has a user-defined minimum overlap with one of the first word string translations of the sentence, the combination of translations are approved as a combined translation unit. If overlapping translations cannot be produced, different parsings of Source Language word strings (i.e., different start and/or end positions) with user-defined minimum overlaps are identified and their respective Target Language translations are tested for combination through an overlap of a word or user-defined sized word string. Next, a third word string in the Source Language that has a user-defined minimum number of overlapping words with the second identified word string in the Source Language is identified along with its Target Language translations. If any of the translations of the third identified word string have overlapping words with the translation of the second identified word string, the combination is approved as a translation. The next Source Language word string that has a user-defined minimum number of overlapping words with the previously identified Source Language word string is identified and the process is repeated until: (1) each overlapping word string (with at least the minimum user-defined size overlap) from the Source Language document has been identified along with potential Target Language translations; (2) every word string in both the Source Language and Target Language has both a right and left overlapping word string of at least the user-defined minimum size (overlap can also be one word, if defined by the user), except the initial string which overlaps only on the right, and the final string which overlaps only on the left; and (3) the longest strings satisfying properties 1 and 2 above are the ones selected for the final output translation. Alternatively, shorter Target Language word strings (i.e., strings of fewer words) that have larger overlaps can be chosen over longer strings with less overlap, based on user-defined criteria. The tradeoff between overlap ratio and string length is a programmable parameter subject to manual or automated optimization.

Since word string translations across languages have the appropriate built-in context for each word in a word string, and since the dual-anchor overlap technique provides accurate combinations of word string translations, documents can be translated with levels of accuracy far superior to any existing translation method. The present invention builds word string building block ideas using association database creation techniques, and combines them into any number of larger combined ideas through the cross-language dual-anchor overlap technique.

The cut-off point of a chain to be translated as a translation query unit string using the dual-anchor overlap technique is user-defined (user definition of a translation query unit string in the above embodiment is a sentence). For instance, instead of a sentence, the concept can be broadened to require overlapping translations of word strings across both Source and Target Language for all contiguous word strings of a shorter unit (e.g., between punctuation marks) or a longer unit (e.g., a paragraph, including punctuation). Because both the beginning and the end of an overlapped unit will only have one side confirmed by overlap, user-defined criteria when building word string translations may be more stringent when accepting a first or last word string as a translation. Moreover, the aspect of the invention that identifies semantically equivalent word strings can be employed to confirm the translations of any word string (by providing additional checks of translations of Source and/or Target Language synonyms).

For example, consider a database of Hebrew-English word and word string translations (built using any of the methods of the present invention or assembled manually) with the components of the following sentence entered in English and intended to be translated into Hebrew: "In addition to my need to be loved by all the girls in town, I always wanted to be known as the best player to ever play on the New York State basketball team".

Through the process described above, the manipulation method might determine that the phrase "In addition to my need to be loved by all the girls" is the largest word string in the Source document beginning with the first word of the Source document and existing in the database. It is associated in the database to a number of word strings including the Hebrew word string "benosaf ltzorech sheli lihiot ahuv al yeday kol habahurot". The process will then determine the following translations using the method described above—i.e., the largest English word string from the same text (and existing in the database) with one word (or alternatively, a minimum user-defined size word string) that overlaps with the previously identified English word string, and the two Hebrew translations for those overlapping English word strings which have overlapping segments as well. For example:

"loved by all the girls in town" translates to "ahuv al yeday kol habahurot buir"; "the girls in town, I always wanted to be known" translates to "Habahurot buir, tamid ratzity lihiot yahua";

"I always wanted to be known as the best player" translates to "tamid ratzity lihiot yahua bettor hasahkan hachi tov"; and "the best player to ever play on the New York State basketball team" translates to "hasahkan hachi tov sh hay paam sihek bekvutzat hakadursal shel medinat new york".

With these returns in the database, the manipulation will operate in a manner to compare overlapping words and word strings and eliminate redundancies. Utilizing the technique of the present invention, the system will take the English segments "In addition to my need to be loved by all the girls" and "loved by all the girls in town" and will return the Hebrew segments "benosaf ltzorech sheli lihiot ahuv al yeday kol habahurot" and "ahuv al yeday kol habahurot buir" and determine the overlap.

In English, the phrases are:
"In addition to my need to be loved by all the girls" and "loved by all the girls in town". Removing the overlap yields: "In addition to my need to be loved by all the girls in town".

In Hebrew, the phrases are:
"benosaf ltzorech sheli lihiot ahuv al yeday kol habahurot" and "ahuv al yeday kol habahurot buir". Removing the overlap yields: "benosaf ltzorech sheli lihiot ahuv al yeday kol habahurot buir".

The present invention then operates on the next parsed segment to continue the process. In this example, the manipulation process works on the phrase "the girls in town, I always wanted to be known". The Hebrew corresponding word set is "habahurot buir, tamid ratzity lihiot yahua". Removing the overlap operates, in English, as follows: "In addition to my need to be loved by all the girls in town" and "the girls in town, I always wanted to be known" becomes "In addition to my need to be loved by all the girls in town, I always wanted to be known".

In Hebrew, the overlap process operates as follows:
"benosaf ltzorech sheli lihiot ahuv al yeday kol habahurot buir" and "habahurot buir, tamid ratzity lihiot yahua" yields "benosaf ltzorech sheli lihiot ahuv al yeday kol habahurot buir, tamid ratzity lihiot yahua".

The present invention continues this type of operation with the remaining words and word strings in the document to be translated. Thus, in an example of the preferred embodiment, the next English word strings are "In addition to my need to be loved by all the girls in town, I always wanted to be known" and "I always wanted to be known as the best player". Hebrew translations returned by the database for these phrases are: "benosaf ltzorech sheli lihiot ahuv al yeday kol habahurot buir, tamid ratzity lihiot yahua" and "tamid ratzity lihiot yahua bettor hasahkan hachi tov". Removing the English overlap yields: "In addition to my need to be loved by all the girls in town, I always wanted to be known as the best player". Removing the Hebrew overlap yields:

"benosaf ltzorech sheli lihiot ahuv al yeday kol habahurot buir, tamid ratzity lihiot yahua bettor hasahkan hachi tov".

Continuing the process: the next word strings are "In addition to my need to be loved by all the girls in town, I always wanted to be known as the best player" and "the best player to ever play on the New York State basketball team". The corresponding Hebrew phrases are "benosaf ltzorech sheli lihiot ahuv al yeday kol habahurot buir, tamid ratzity lihiot yahua bettor hasahkan hachi tov" and "hasahkan hachi tov sh hay paam sihek bekvutzat hakadursal shel medinat new york". Removing the English overlap yields: "In addition to my need to be loved by all the girls in town, I always wanted to be known as the best player to ever play on the New York State basketball team". Removing the Hebrew overlap yields:

"benosaf ltzorech sheli lihiot ahuv al yeday kol habahurot buir, tamid ratzity lihiot yahua bettor hasahkan hachi tov sh hay paam sihek bekvutzat hakadursal shel medinat new york", which is the translation of the text desired to be translated.

Upon the completion of this process, the present invention operates to return and output the translated final text.

It should be noted that the returns were the ultimate result of the database returning overlapping associations in accordance with the process described above. The system, through the process, will ultimately not accept a return in the second (Target) language that does not have a naturally fitting connection, i.e., right and left overlaps with the contiguous language segments, with the exception of first and last segments, as described above. Had any Hebrew language return not had an exact overlap with a contiguous Hebrew word string association, it would have been rejected and replaced with the highest ranking Hebrew word string association for that English word string that overlaps with the contiguous Hebrew word strings, or alternative overlapping English word strings (shorter or longer) can be retrieved from the database with their Hebrew translations and tested for exact overlaps in Hebrew.

Attached is Appendix B, (page 253), which is a print-out from the present invention showing an example of translation using the dual-anchor overlap method in combination with Acquisition Using Parallel Text in Two States.

Attached is Appendix C, (page 297), which is a print-out from the present invention showing an example of translation using the dual-anchor overlap method with a combination of Acquisition Using Parallel Text in Two States and Acquisition Using Multiple-States.

Attached is Appendix D, (page 308), which is a print-out from the present invention showing an example of translation using the dual-anchor overlap method in combination with Target Language Flooding.

Various user-defined parameters can be established for overlap criteria. For example, the required number of words that overlap may be greater when one or more of the words in the overlap are stop words (e.g., "the", "it", "in") because these common words make unreliable connection points for the combination of word strings. The longer the overlapping string of words between a translation candidate and the two translations it overlaps with, the less certain the word string translation needs to be. If the translation is incorrect, it will not have large overlaps with both of its neighboring translations.

Therefore, user-defined minimum overlap requirements may be dynamic and require fewer or more overlapping words between parsed word string translations based on whether the translations are known to be correct or are just determined to be candidates based on the different methods of the present invention for building word string associations. Moreover, the minimum number of words required in the overlap for approval of a translation may ignore overlapping stop words for satisfying this requirement.

For example, assume the user-defined requirements called for two or more overlapping non-stop words to approve the combination of two word string translations, and the overlapping parsed word strings "and I know it is good", "it is good to run two miles" are presented to the system as part of a longer string of words to be translated. This parsing would not be accepted by the system because the overlapping word string "it is good" does not have two non-stop words and therefore does not fulfill the user-defined overlap requirement. The word strings will need a larger number of words between the segments to satisfy the requirement and then test the respective Target Language translations for overlap (e.g., "and I know it is good" and "know it is good to run").

If word string translation candidates identified by any method of the present invention, any other automatic translation method, or created manually, are not certain to be accurate, the dual-anchor overlap technique can require that all word strings (except first and last word strings) must have every word of the string be overlapped by either the left or right contiguous word string translations. For example, one possible parsing for "complete overlap" for a word string to be translated could be as follows:

Source Language (English) Translation Query: "The best time of the year is the summer because you can sit in the sun and then jump in the pool".

One Possible Complete Overlap Parsing:
"the best time of the year"
  "time of the year is the summer because you"
    "year is the summer because you can sit in the sun"
      "because you can sit in the sun and then"
        "sun and then jump in"
          "jump in the pool"

An even more comprehensive scheme would be to only move one word forward with each consecutive word string overlap when parsing a Source Language translation query into overlapping word strings. For example:
"the best time of
  "best time of year"
    "time of year is"
      "of year is the"
        "year is the summer"

The process started above could be continued until each word of the translation query was parsed with maximum overlap.

Because the word strings are overlapped completely on both left and right sides (except for first and last word strings which only have some additional confirmation through one-sided overlap) the translation candidates for them will not be accepted if incorrect (or correct but for a different surrounding context). The first word string on the left should be independently confirmed by one of the association methods of the present invention (or manually) as an accurate translation (at least on the un-overlapped left side of the word string) and the last word string at the end of the sentence should be independently confirmed as an accurate translation (at least on the un-overlapped right side). In the above example, either both word strings "the best time of the" and "jump in the pool" should be confirmed independently as accurate translations or at least their left and right sides, respectively. These confirmed translations give accurate end points to anchor the chain of overlapping word string translation candidates.

The same overlap technique applies for connection of word strings to form larger word strings with integrity for applications using a single state or language as described later.

B. Knowledge Acquisition Using Dual-Anchor Overlap

Moreover, each time two confirmed translations with overlapping word strings are combined, two additional database entries for cross-language translation of word strings can be approved and added to the database based on the results of the overlap. First, the total combined overlapping translation can be approved as one overall unit for future use. Second, the unit of overlapping words in both Source Language and Target Language constitutes a word string translation by the present invention and can be added to the database for future use.

For example, assume a cross-language database with the following Language X word strings and corresponding known Language Y translations:

| Language X Word String | Language Y Translations |
| --- | --- |
| 1. "EE KK GG XX" | 1a. "ll bb ee" |
| | 1b. "ee kk gg xx" |
| 2. "GG XX BB YY" | 2a. "gg ll bb yy" |
| | 2b. "gg xx bb yy" |
| | 2c. "gg xx mm ll" |

Based on the above database entries, the following additional database entries can be approved and entered as valid translations:

| | |
|---|---|
| 3. "EE KK GG XX BB YY" | 3a. "ee kk gg xx bb yy" |
| | 3b. "ee kk gg xx mm ll" |
| 4. "GG XX" | 4a. "gg xx" |

Entry number 3 is the combined word string translations after eliminating overlapping words in Source Language and Target Language. Number 4 is the overlapping word strings in both Source Language and Target Language, which confirms the smaller word string in the overlap as an independent word string translation.

Translation candidates that are not confirmed as accurate translations on a Query String Flooding List using the Target Language Flooding technique (or using any other method) can be tested for large overlapping word strings in both Source Language and Target Language. If overlapping word string translation candidates are linked together through large overlaps and are overlapped with known word string translations at the beginning and end of a larger translation unit, the translation candidates as well as the word strings in each of the respective overlaps across the two languages can be approved as translations. The above technique of identifying translations in overlapping word strings can be used to expand any cross-language database by leveraging the existing translations that overlap across two languages, generated automatically or manually assembled for use by EBMT systems, Translation Memory systems or for any other purpose.

C. Other Related Applications

The above embodiment combining the use of a cross-language association database and the cross-language dual-anchor overlap translation technique has clear applicability to improve the quality of existing technologies that attempt to equate information from one state to another, such as voice recognition software and optical character recognition (OCR) scanning devices that are known in the art, to correlate information across multiple sources, and to translate among different jargons or dialects within one language. These technologies (as well as others) can use the present invention to test the results (output) of their systems using the translation methods of the present invention to see if the results can be translated. When a translation that overlaps with its neighbors cannot be found, the user can be alerted and queried or the system can be programmed to look for close alternatives in the database to the un-overlapped portion of the translation. Various criteria for finding alternative word strings that overlap with its neighbors include those based on context using the embodiment of the association database that produces semantic equivalents within a language (described later). All returns to the user, of course, would be converted back into the original language.

In addition to aiding existing technologies that perform these applications, the methods of the present invention, including the cross-state learning and dual-anchor overlap technique, can also be applied directly to build these applications. For OCR, visual representations of letters and words would be used to build associations between the visual representation of words and word strings and the computer encoding such as UTF-8 and other computer languages and protocols. Text that teaches the use of computer languages can be set up to align the text description of a command with the computer language code that describes those commands as training text to build associations between human languages and computer languages. Written descriptions of code and computer code can also be used as a Parallel Text corpus for association building using the methods of the present invention. For voice recognition, the sound waves and written text would be analyzed to make the associations between the common ideas represented in two different states (using word strings of a written text along with the audio sound waves associated with the text as "Parallel Text" to train the system) as described later.

IV. Single State Frequency Association Database Creation and Common Frequency Analysis Method and Apparatus A. Introduction Another embodiment of the present invention provides (1) a method and apparatus for creating a Frequency Association Database ("FAD") of ideas represented by words and word strings within a single language (e.g., Japanese or English) and (2) a method and system for using the FAD to identify common relationships between and among two or more words and/or word strings. This second method and system, referred to as Common Frequency Analysis (CFA), can be used to generate lists of related ideas for use in various applications.

In this embodiment, the FAD, once created, stores information about the proximity relationship in text between and among two or more recurring word string patterns. These proximity relationships, once established and stored through the first process, provide the basis for the second process, CFA, which is the analysis and identification of third word or word string associations shared in common by two or more words and/or word strings. This CFA process provides the basis of various knowledge acquisition and knowledge generation applications.

Figure 3:
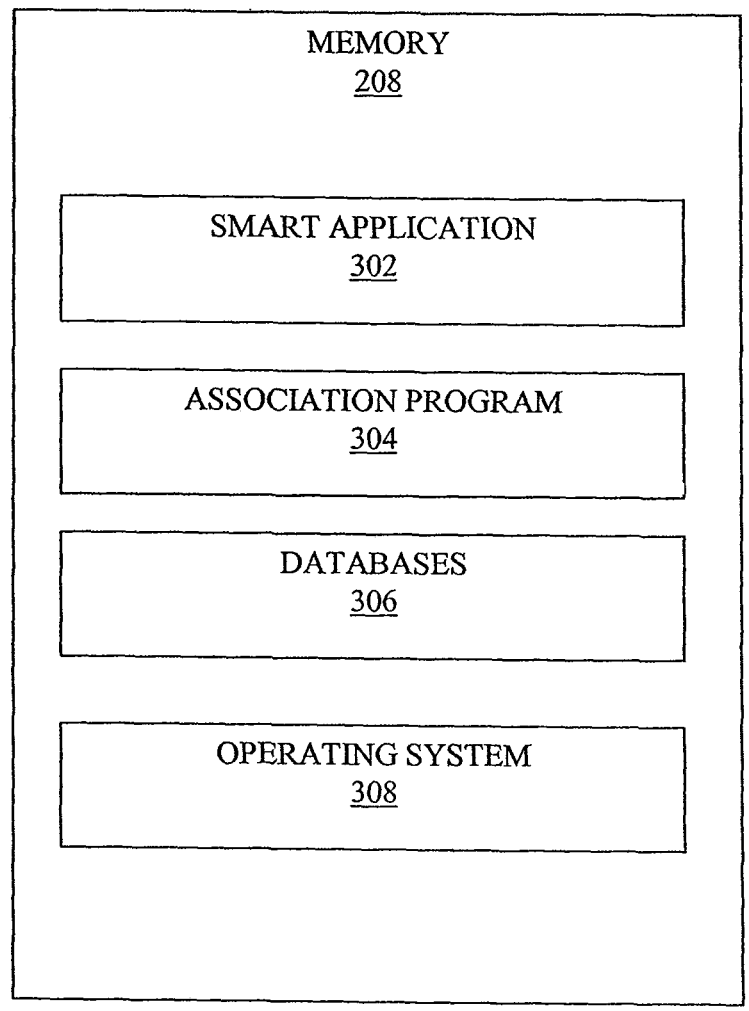
FIG. 3 shows a memory device of the computer system of the present invention containing programs for implementing the methods of the present invention.

A frequency association program can embody some of the methods of the present invention and can be used to build the databases of the present invention and to analyze the information stored in the databases to determine associations between words and/or word strings. FIGS. 2 and 3 depict memory 208 of the computer system 200 in which are stored a smart application 302, an association program 304, databases 306 and an operating system 308, for access by processor 202. The association program 304 can be an independent program or can form an integral part of a smart application 302. The association program 304 can analyze the databases 306 to determine word associations either in response to a query from a smart application 302, or in response to a query directly submitted by the user via the input device. The database 306 can include, for example, FAD and document databases.

The FAD system and method operates by parsing the text of all documents that are input into the system and storing information regarding which of the parsed segments of text are associated with one another based on the frequency of occurrence and position of a particular segment with respect to other segments of the document. As always, segments of parsed text can include words and word strings, or characters and strings of characters for languages that use characters that possess independent semantic value (e.g., a Chinese character). Prior to being operated on by the FAD system, the documents can be stored in a Document Database to facilitate access, parsing, and analysis of the documents.

Words and word strings that frequently appear in close proximity to each other within a document are identified by the present invention through FAD analysis of words and word strings within user-defined ranges of one another. These associated words and word strings can be used by the second process, CFA, to identify ideas or concepts (in the present embodiment represented by these words or word strings) that have strong relationships to one another based on common relationships to other third ideas and concepts (also represented here by words and word strings).

The CFA process operates on these associated word strings stored in the FAD to create a knowledgebase comprised of lists of related ideas. In one embodiment of the present invention, these lists of related ideas (represented in this embodiment by words and word strings) are referred to interchangeably as Knowledge Acquisition Lists or Semantic Equivalent Lists. Using this embodiment of CFA, the system generates a list for a query word or word string by identifying word strings in certain patterns around or near the query referred to as "Left or Right Signatures," or when combined, "Cradles," that are shared by third words and/or word strings. The results generated for a particular word or word string query identify closely related ideas which include semantic equivalents of the word or word string, as well as opposite ideas, examples of the idea, and other related ideas represented by words and word strings. These Signatures, Cradles, and Knowledge Acquisition Lists, once built, form a knowledgebase in each language that can be used in machine translation applications, search and text mining applications, data compression, and many other applications including artificial intelligence or smart applications that allow a user to ask the system to learn, and/or provide answers to questions, or perform actions.

Using the FAD of the present invention to provide the input for CFA, the system can determine common third word and/or word string associations between or among two or more words or word strings. When conducting FAD, the user can define the ranges to be examined in the documents as any number of words and/or word strings of user-defined size in proximity to each occurrence of each selected word or word string.

Once these word and word string relationships are built and stored in the FAD, the system based on instructions from smart application 302 (see FIG. 3) will then perform one or more CFAs that search for words and/or word strings that are common to the ranges of the two or more words and/or word strings selected by smart application 302. When the system conducts a CFA, the frequency of occurrence of words or word strings within the ranges of each selected word or word string can be retrieved if previously stored in an FAD (or any information not previously analyzed and stored in the FAD can be analyzed on-the-fly using text in the Document Database or any other available text including text on the Internet).

Creating an FAD in a single state is similar to creating a cross-language FAD used using Parallel Text to identify word string translations, as described previously. In that case, the range was established in the Target Language documents and recurring words and word strings were counted to establish frequency of occurrence in the range. When creating an FAD in a single language or state, the principle is the same but the frequency and proximity of word strings is used to establish the patterns of context for words and word strings in the single language or state, and not translations of words and word strings across languages.

An alternative to building out an FAD that documents every recurring word or word string proximity relationship is to identify the locations and frequency of occurrence of words and word strings recurring in the Document Database and storing them in a simpler Recurrence Database to establish a word string frequency index, an example of which is shown in Table 4. Using a Recurrence Database as a word string frequency index instead of an FAD, the association program 304 can identify all the same word string patterns and establish the highest ranked third word and word string relationships shared by the two or more words and/or word strings selected by the smart application 302 (see FIG. 3), based on user-defined weighting or other criteria.

B. Frequency Association Database (FAD) Creation

1. In General

Disclosed is a method for building an FAD that can be applied to documents in a single language for purposes of building a database of related words and word strings based on their frequency and proximity to one another in the text. FADs provide the building blocks to be used for CFA of the present invention. The method includes:

a. Assembling a corpus of text in a single language (can be stored in a Document Database)

b. Searching for all multiple occurrences of any word or word string in the assembled corpus.

c. Establishing a user-defined number of words and/or word strings of user-defined length on either (or both) side(s) of the word or word string being analyzed. This will serve as the range. In addition to being defined as a certain number of words, the range may be defined broadly (e.g., all words in the specific text in which the word or word string occurs) or narrowly (e.g., a specific size word string (i.e., number of words) in an exact proximity to the analyzed word or word string), as the user may determine for the specific application.

d. Searching the corpus and determining the frequency with which each and every word and word string appears in the ranges around the selected word or word string being analyzed and, if desired, their proximity to the selected word or word string.

If the range is defined as including, for example, up to 30 words on either side, the system will record the frequency of occurrence of every word and word string within 30 words of each of these words or word strings. If the range is defined as three-word word strings to the right of a query word or word string, and four-word word strings to the left of the query, only the three-word word strings to the right and the four-word word strings to the left of the query will be registered for recurrence of this pattern. The system can note the proximity of each word or word string to the word or word string being analyzed.

As described above, for certain applications the system can be instructed to recognize and disregard common words such as "I", "a", "to", etc. However, those common words may be considered based on the goal of the specific application for the system. Thus, the FAD can be built based on frequencies of words and word strings appearing exactly a user-defined number of words away, to either the left or the right, from the word or word string being analyzed. In such cases the range could be defined narrowly by the user for an application as one word or one word string of a specific size in an exact proximity to the word or word string being analyzed.

For instance, the system can analyze the documents available to determine that they include the phrase "go to the game" 10,000 times and it may find "go to the game" within a 20 word range of the word "Jets" 87 times. In addition, the system may determine that "go to the game" appeared exactly seven words in front (in English to the left, in a language that reads right to left, like Hebrew, to the right) of the word "Jets" eight times (counting from the first word "go" of the word string).

Any combination of recurring patterns of words and word strings based on the number of words between them can also be recorded. For instance, the database can record the number of sentences in the database in which the word "Jets" appears three words before "go to the game" and when "tickets" appears nine words after "go to the game." That pattern may occur three times and the frequency of that word pattern in the text may be used by an application that will deduce the meaning of an idea to either help provide an answer to a question asked by the user, or help carry out a request made by the user.

It is known in the art that "search" of words or word strings based on user-defined proximity exists for search applications that use the results of the user-defined search parameters to present documents to the user that contain those search terms based on proximity requirements. Search methods do not however use an application to automatically search these parameters (based on, for instance, frequency in text) and do not store this information to be used by the system to automatically acquire or learn knowledge based on further automatic steps of an application.

These FADs of the present invention indicating exact recurring word string patterns in text based on their proximity to each other measured by the number of words between them can be generated individually using a series of narrowly defined ranges. Typically, however, the most frequently useful word and word string patterns are those contiguous to or generally in close proximity to (on the left and right of) the word or word string being examined.

2. FAD Utilizing an Index of Recurring Word Strings

A large number of calculations would be required if the above method were used to build a database of every proximity and frequency relationships between all recurring word patterns in the available text as described above. Many relationships being built as a result of this comprehensive process might never be used for an application. The following technique involves indexing recurring word strings to avoid upfront processing that may never be used to establish exact relationships.

In addition, the following indexing process can be used as an alternate process to the method described above for automatically determining frequency and proximity associations, and to perform general range frequency analysis and an analysis of exact patterns based on specific word or word string locations within a range as described above. This embodiment of the invention is a method for building the Recurrence Database, which only includes the location of each recurring word and word string in the Document Database and not its proximity to other entries. This method is as follows: first, search for all words and word strings for recurrences in the available text; second, record in the database the "locations" for each word and word string with multiple occurrences by noting its position within each document in which it occurs, for example, by identifying the word number of the first word in the string, along with the document number in the Document Database. Alternatively, just the document number of the document in the Document Database in which the word or word string is located can be stored. In this case, the position of the word or word string can be searched and determined on-the-fly when responding to a specific query.

Table 4 is an example of entries in the Recurrence Database.

TABLE 4

| Word or Word String | Frequency and Location |
| --- | --- |
| "kids love a warm hug" | 20 times (word 58/doc1678; word 45/doc 560; word 187/doc 45,231; word 689/doc 123; . . . ) |
| "kids love ice cream" | 873 times (word 765/doc 129; word 231/doc 764,907; word 652/doc 4,501; . . . ); |
| "kids love a warm hug before going to bed" | 12 times (word 58/doc 1678; word 45/doc 560; word 187/doc 45,231; . . . ) |
| "kids love ice cream before going to bed" | 10 times (word 765/doc 129; word 231/doc 764,907; . . . ) |
| "kids love staying up late before going to bed" | 17 times (word 23/doc 561; word 431/doc 76,431; . . . ) |
| "before going to bed" | 684 times (word 188/doc 28; word 50/doc 560; word 769/doc 129; word 436/doc 76,431; . . . ) |

As indicated, each occurrence of a word or word string found more than once in the Document Database will be added to the frequency count and its location noted by designating the word number position in a document as well as the number assigned to identify the document in which it occurs, or by using any other identifier of the word or word string's location in the Document Database.

If the Recurrence Database is fully and completely generated (including word number positions as well as document numbers) for all documents in the Document Database, the location information allows the system to calculate any general frequency relationships, or any specific word string pattern frequency relationships as described above. Until the Recurrence Database is fully built, the system will perform the FAD on two or more ranges in the documents in the Document Database on-the-fly after identifying the locations from the Recurrence Database or performing a general search of a word string in the Document Database on-the-fly using any search technique known in the art. Any word or word string recurrence not yet in the Recurrence Database can be added at the time the system responds to a query involving it by analyzing documents in the Document Database directly to supplement analysis of the Recurrence Database. After the information obtained by direct analysis of the documents in the Document Database has been used for the specific task for which it was generated, the information can then be stored in the Recurrence Database for any future use. Whether the system builds an FAD analysis using the Recurrence Database, or whether those relationships are created on-the-fly by searching documents with the query as a keyword, the system will identify relationships between any recurring ideas represented by words or word strings.

C. Common Frequency Analysis—Knowledgebase Acquisition and Generation by Association Method and Apparatus Common Frequency Analysis (CFA) is a technique of the present invention that generates lists of ideas (represented here by words and word strings) that have common relationships with the two or more ideas (words and/or word strings) being analyzed. Several different embodiments of CFA can be used to generate different types of Knowledge Acquisition Lists of related ideas. These lists can be used in a number of applications, including smart applications, which conduct additional analysis using other embodiments of CFA to retrieve or learn new information to aid in answering a question or perform a task.

Referring now to FIG. 3, in a CFA process, smart application 302 can query the Frequency Association Database or the Recurrence Database, via the association program 304, with two or more words and/or word strings to identify what third words and/or word strings are frequently associated within user-defined ranges with some or all of the presented words and/or word strings. In another embodiment of the CFA aspect of the present invention, the system, when furnished with a word or word string query (from, for example, the user or smart application 302) identifies two or more words and/or word strings using two or more FADZ entries for the query to make associations between the two or more identified words and/or word strings. This type of CFA is used to identify word string Signatures and Cradles as part of the process for Knowledge Acquisition List generation to identify semantic equivalents and other relationships between words and/or word strings (as described later).

There are two different methods of performing CFA (1) Independent Common Frequency Analysis (ICFA), and (2) Related Common Frequency Analysis (RCFA). Additionally, after employing either of the two processes, the system can do further statistical analysis by employing them in an additional generation or generations, or by combining the results and/or segments of any CFA for further CFAs.

1. Independent Common Frequency Analysis (ICFA)

When the smart application 302 presents the association program 304 (see FIG. 3) with two or more words and/or word strings for CFA, the system can identify all words and word strings frequently related to the presented words and/or word strings by referring to an FAD of the present invention. The system can then identify those words and/or word strings that are frequently associated to some or all of the two or more presented words and/or word strings based on user-defined criteria.

The system can rank the common associations it identifies for the presented words and/or word strings in a variety of user-defined ways. For example, the system can rank the associations by adding (or multiplying or any other user-defined weighting) the frequencies for the common word or word string associations to each of the presented words and/or word strings. As another example of a user-defined parameter, a minimum frequency (as measured by position on the list, raw number of occurrences or any other measure) on all tables of presented words and/or word strings may be required.

For example, using entries in the Recurrence Database above, if the task was looking for ideas common to the word strings "kids love" and "before going to bed", the system would calculate the frequency with which third concepts like "ice cream" are within a user-defined range in all available documents with the first concept "kids love" as one analysis, and the frequency with which "ice cream" and the second concept "before going to bed" appear together as the second analysis. The frequency of each of the independent relationships can then be used by an application that will give relative value to each. This will be based on how high (user-defined as either absolutely or relatively) the frequency of "ice cream" ranks on both the "kids love" frequency table and the "before going to bed" frequency table (based on user-defined ranges).

Based on user-defined values, this method, after analyzing "ice cream" might then identify "a warm hug" by locating it on the "kids love" frequency table (based on the user-defined range or proximity requirements of the application) for relative frequency and then locate "a warm hug" on the "before going to bed" frequency table. All other frequent associations (which may be user-defined) on both frequency tables will be compared, for example "staying up late", and scored based on user-defined values of combined relative frequencies from both tables. The highest-ranking word string, based on user-defined weighting of each frequency association, will be produced by the system.

The result of this analysis may be that the system will be able to deduce that, while "kids love" "ice cream" more than "kids love" "warm hugs," "kids love" "warm hugs" more than "kids love" "ice cream" "before going to bed".

2. Related Common Frequency Analysis (RCFA)

In addition to finding common word and word string associations that each queried word or word string has independently, another embodiment may look to identify frequent appearances of words and or word strings that are found in user-defined ranges in only those documents containing two or more of the words and/or word strings being analyzed. A Related Common Frequency Analysis is different than an Independent Common Frequency Analysis in that related words and/or word strings being analyzed for RCFA appear together in a user-defined range of a document as opposed to appearing independently for analysis. The embodiment of an RCFA according to the present invention employs the following steps:

First, locate all documents from the available corpus that contain two or more of the presented words and/or word strings. For example, if documents are stored in a Document Database, they could be located by returning specific document numbers representing documents that contain two or more of the presented words and/or word strings. The document numbers are those numbers designated by an indexing scheme known in the art or described in the present application.

Then, identify and compare each word and word string in a user-defined range in proximity to the presented words and/or word strings, and record the frequency for any words and word strings in the ranges. Once again, the user-defined range can be narrow and include only recurring words or word strings in a specific proximity (such as contiguous) to the presented words or word strings.

As an example, assume the system is presented with the two word strings "kids love" and "before going to bed" for analysis under RCFA. Further assume that a Recurrence Database contains the following entries:

| | |
|---|---|
| "kids love a warm hug" | 20 times |
| "kids love ice cream" | 873 times |
| "kids love a warm hug before going to bed" | 12 times |
| "kids love ice cream before going to bed" | 10 times |
| "kids love staying up late before going to bed" | 17 times |
| "before going to bed" | 684 times |

When conducting an RCFA using two words and/or word strings for analysis, a Recurrence Database will direct the system to the documents in the Document Database that have both segments (e.g., "kids love" and "before going to bed") as they will have the same document number associated with them. Usually, the system will locate only those documents where the word strings are within a user-defined number of words of each other or in any other user-defined qualifying proximity to one another.

Once the system has identified all documents in the Document Database that contain "kids love" within the designated proximity to "before going to bed", the system builds a frequency chart of all recurring words and word strings within a user-defined range around the two presented word strings. In the example based on the limited amount of text in the database (and assuming the user-defined range requires words and word strings to be adjacent to the words or word strings being analyzed), "ice cream" occurs 10 times in the range of the two presented phrases and thus has a frequency of 10, "staying up late" occurs 17 times in the range of the two presented phrases and thus has a 17 frequency, and "a warm hug" occurs 12 times in the range of the two presented phrases and thus has a 12 frequency.

If the range relative to the two RCFA word strings is expanded the existing Recurrence Database may well have other word strings that will add to the above frequency counts depending on the user-defined range of word strings. For instance, there may be recurring words and word strings in the same text near "kids love" and "before going to bed" but not directly adjacent to them (e.g., "kids love ice cream and other sweets before going to bed"). This also means that if the phrase, "ice cream and other sweets" repeats, it will also be an independent answer to the query as well. The aspect of the present invention that identifies semantic equivalent terms may also group the returns "ice cream" and "ice cream and other sweets" as a single semantic category (e.g., sweets) in an application (based on user-defined criteria). In addition, the order of the ideas may be different but the meaning be the same (e.g., "before going to bed, kids love ice cream") which will be desirable to add to the analysis. The aspect of the invention that identifies semantically similar concepts (in combination with the dual-anchor overlap technique) will enable different concept order with the same meaning to be identified as semantically equivalent.

Furthermore, known or determined semantic equivalents can be used in place of the searched words and word strings (using RCFA or ICFA) to find recurring words and word strings around the equivalent's ranges as alternative embodiments of the invention. For instance, the system can also search "kids like", "kids really love", "kids enjoy", "children enjoy", or "children love" in place of "kids love". The same technique can be used to replace "before going to bed" with known equivalents to the system like "before bed", "before going to sleep", or "before bedtime".

Both the word order issue and the semantic alternative issue just described are addressed by the present invention's ability to detect word string patterns. As described later, the common frequency techniques of the present invention will yield a large number of semantically equivalent words and/or word strings that can be used to expand the analysis with many more relevant semantic search terms. Additionally, as explained later, the present invention can also recognize ideas that are ordered differently but are identical in meaning (e.g., "the boy and the spotted dog" and "the dog with the spots and the boy" would be recognized as equivalent semantic larger units by identifying patterns of common classes of word strings that appear in patterns of common larger general groups together. Both the method to determine semantically equivalent ideas and the method to recognize semantically equivalent larger ideas whose component building block ideas are arranged in different orders are additional aspects of the present invention's knowledge acquisition ability to understand natural language.

3. Second Level Frequency Analysis (RCFA or IFCA)

In another embodiment, the system may perform CFA on either or both of the first or second word or word string that made up the query, and a selected third word or word string identified in the CFA (i.e., a returned result), which will add new information to the analysis performed for an application. For example, if the selected common association based on the frequency of all words and word strings within the common range of "before going to bed" (first) and "kids love" (second) is "ice cream" (third), this embodiment generates either an RCFA or ICFA between either "before going to bed" (first) and "ice cream" (third), or "kids love" (second) and "ice cream" (third), and selecting associations based on those two frequency analyses. For example, "ice cream" and "before going to bed" may have a high common frequency association with "stomach ache" which may be useful in the analysis for an application to be used according to the present invention. Moreover, any two or more words and/or word strings can be analyzed using the same techniques in as many combinations or as many generations as the user or the smart application defines. Specific applications will call for automated analysis identifying which CFA to perform on each generation of association frequency analysis based on each successive CFA result. More complex applications will identify two or more frequency analyses to be performed before the two or more independent results are used in combination.

V. Single State Knowledge Aquistion using CFA

Words and/or word strings in a language that represent the same idea can be identified as part of the same semantic family based on the pattern of word strings that frequently appear around them in language. These patterns become apparent by looking at the frequency with which specific words and word strings are found immediately prior to a particular word or word string (in English, to the left of the particular word or word string) as well as following the particular word or word string (in English, to the right of the particular word or word string). Thus, the Knowledge Acquisition List generation aspect of the present invention uses two specific CFAs designed to leverage the fact that words and word strings representing ideas that are alike (or share some other semantic relationship) will have commonality in the type and order of the words and word strings frequently leading into and away from them.

Using RCFA or ICFA in this embodiment to create Knowledge Acquisition Lists, the system can generate a comprehensive word and word string database of highly related ideas based on frequently shared word strings to both the right and the left of the related ideas. The most highly related words and word strings (i.e., those sharing the same frequent left and right context word strings) are usually semantically equivalent, although other related information may rank high as well. Other related ideas include opposites (e.g., if the query is "hard" the return "soft" may rank high); related ideas by broad class (e.g., if the query is "dark blue" the return "orange" may rank high); examples (e.g., if the query is "massive fraud" the return "skewing documents and misrepresenting data" may rank high); and other related knowledge.

If, for example, the system is asked to identify words and/or word strings that have the same or almost the same meaning as another word or word string (i.e., the words and word strings are semantically similar (or synonymous)), the system can perform a first CFA to find the words and word strings frequently to the left and right of the query, and then perform a second CFA to identify all other words and word strings in that language that most closely share the same left and right context word strings. Typically the more similar the formations of left and right context word strings shared by two different words and/or word strings, the more similar in meaning they are. While opposites will share high frequency common associations, they will diverge strongly on certain important context associations that create an "opposites Signature" pattern that the system can identify to either filter out the word and word string opposites of the query, or provide a list of opposites for use in other applications.

The character of the association between any idea represented by a word or word string and any other idea represented by a word or word string will be defined by the relationship between their respective sets of Signatures identified by the system. The system uses the association databases to detect frequently recurring specific word formations within user-defined ranges tailored to detect word patterns surrounding an idea that defines the relationship between the idea and other ideas. Thus, Right and Left Signatures (or Cradles when using RCFA) of a word or word string consist of all the contexts represented by various surrounding word strings in which that word or word string occurs. Taking the most frequent right and left context word strings and finding what other word strings occur frequently between those very same Signatures identifies synonymous or near synonymous or other highly related phrases (word strings) and/or words.

Other word strings that have a semantic relationship also share common left and right context word strings. Members of the same general class like places, colors, names, numbers, dates, sports, etc, have many common context word strings that the system can use to identify them. Other relationships like words and word strings representing examples of the query word or word string, or word strings representing other related facts to a query will share certain common context word strings that will be identified by the CFA aspect of the present invention, and those certain common context word strings define that particular relationship.

The character of each of the relationships is defined by the shared context word strings along with the context word strings that are not shared. The user gives the system examples of words and/or word strings that define a relationship, and the method and system for word string Cradle and Signature sorting is used. Other methods of the present invention that help identify semantic equivalents on a Knowledge Acquisition List include (1) the method to determine the direct mutual relationship two word strings have on each other's Knowledge Acquisition Lists, (2) the method to determine the different Knowledge Acquisition Lists that two words and/or word strings both appear on, and (3) a method that generates synonymous expressions of a query plus Left Signature and query plus Right Signature and tests them for overlap.

A general explanation of how, using the association databases and a smart application 302 (see FIG. 3), the system detects semantically equivalent word strings and other related knowledge through CFA will be described. The system can also run ICFA and RCFA on the presented words and word strings and combine the results using a user-defined weighting process. The Knowledge Acquisition List filtering and sorting methods of the present invention are then described.

A. Knowledge Acquisition List Generation Using ICFA

One embodiment using a specific word formation around a word or word string to perform ICFA will identify words and/or word strings that are equivalents or near equivalents in semantic value (i.e., meaning) as well as other related words and word strings to any queried word or word string. This embodiment involves: Step 1, receiving a query consisting of a word or word string (the query phrase) to be analyzed, and (using the FAD aspect of the present invention) returning a user-defined number of words and/or word strings (the returned phrases) of a user-defined minimum and maximum size that occur with the highest frequency where the returned phrase is located directly to the left of the query phrase in all available documents. The larger the recurring user-defined word string, typically, the more precise (specific) the ultimate results will be. Step 2, produce an FAD analysis on each of a user-defined number of the top ranked results from Step 1 using a range of one word or a word string to the right of each word or word string analyzed (the system will rank by frequency of occurrence the recurring words and word strings to the right of each of the words or word strings returned in Step 1 and analyzed in Step 2). The frequencies of all identical words and word strings produced in Step 2 are then added. Step 3, producing an FAD analysis on the query and returning a user-defined number of words and/or word strings (the returned phrases) of a user-defined minimum and maximum size that occur with the highest frequency directly to the right side of the query (again, word strings of at least two or more words is typically desirable for accuracy). Step 4, produce an FAD analysis on each of a user-defined number of the top ranked words and word strings returned from Step 3 using a range of one word or a word string directly to the left of each of the words and word strings being analyzed. Again, the results will be ranked by the frequency of occurrence of the words and word strings leading into each word and word string returned in Step 3 and analyzed in Step 4. The frequencies of all common word and word string results in Step 4 are then added. Step 5, identify all words and/or word strings that are produced by both Steps 2 and 4. In one embodiment, the frequency number of each of the words and word strings returned in Step 2 are multiplied by the frequency numbers of the words and/or word strings produced in Step 4. The highest ranking words and/or word strings (based on the products of their frequencies from Step 2 and Step 4 results) will typically be the words and word strings most semantically equivalent to the query. The list produced by this process is referred to as a Knowledge Acquisition List.

As an alternative embodiment, in Step 5, the returns from Step 2 and Step 4 can be ranked based on the total number of different word string returns from Step 1 and Step 3 that they share with the query.

The combined process of Step 1 and Step 3 is an embodiment of ICFA where a single word or word string is used to independently identify groups of two different words and/or word strings related to the query. The combination of Step 2, Step 4 and Step 5 are another embodiment of ICFA where two words and/or word strings are used to identify common associated third words and/or word strings.

The following examples illustrate these embodiments using a hypothetical database to create associations among words and word strings from the system's Document Database, and then create associations using ICFA. Assume the word "detained" is entered by the user to determine all of the word and word string equivalents known to the system for that word (along with other related words and word strings).

In Step 1, taking only the top three results to simplify the illustration (although the number of results analyzed by the present invention would typically be much larger and is user-defined), the system first determines the most frequent three-word word strings directly to the left of "detained". The length of the word strings directly to the left of the analyzed word ("detained") can be one size or a range of sizes and is user-defined (in this example three-word word strings). The result of this analysis—the list of word strings of a user-defined length to the left of the presented word—is called the "Left Signature List." Assume that the system in the above example returns the following:

1. "the suspect was _____"
2. "was arrested and _____"
3. "continued to be _____"

In Step 2, the system operates on the returned Left Signature List. The system locates words and/or word strings that most frequently follow the above three returned three-word word strings—i.e., those words and/or word strings to the right of the returned members of the Left Signature List. The length of the word strings that the system returns in this operation is user-defined or can be unrestricted. The results of this analysis—each list of words and/or word strings to the right of each Left Signature List entry—is called a "Left Anchor List." Assume that the system in the above example returns the following Left Anchor Lists:

| Left Signature List | Left Anchor List |
|---|---|
| 1. "the suspect was _" | a. "arrested" (240 freq.) |
| | b. "held" (120) |
| | c. "released" (90) |

| Left Signature List | Left Anchor List |
|---|---|
| 2. "was arrested and _" | a. "held" (250) |
| | b. "convicted" (150) |
| | c. "released" (100) |
| 3. "continued to be _" | a. "healthy" (200) |
| | b. "confident" (150) |
| | c. "optimistic" (120) |

Also in Step 2, the frequencies of identical returns across the Left Anchor Lists can be added. The only common returns in the Left Anchor Lists are:

| a. "held" | 120 + 250 = 370 |
|---|---|
| b. "released" | 90 + 100 = 190 |

In Step 3, the system determines the three most frequently occurring two-word word strings directly to the right of the selected query "detained" in the documents in the database. Again, the number of frequently occurring word strings analyzed is user-defined (here, as in Step 1, the system returns the top three occurring word strings). And, the length of the word strings directly to the right of the analyzed word ("detained") is user-defined, in this example it is two-word word strings (note: any length word string or range of lengths may be used in Step 1 and Step 3). The result of this analysis—the list of word strings of a user-defined length to the right of the presented word—is called the "Right Signature List." Assume that the system in the above example returns the following Right Signature List:

1. "_____ for questioning"
2. "_____ on charges"
3. "_____ during the"

In Step 4, the system operates on the returned Right Signature List. The system locates words and/or word strings that most frequently occur before the above three returned two-word word strings—i.e., those words and/or word strings to the left of the returned two-word word strings. The length of the word strings that the system returns in this operation can be user-defined or can be unrestricted. The results of this analysis—each list of words and/or word strings to the left of each Right Signature List entry—is called a "Right Anchor List." Assume that the system in the above example returns the following Right Anchor Lists:

| Right Signature List | Right Anchor List |
|---|---|
| 1. "_ for questioning" | a. "held" (300) |
| | b. "wanted" (150) |
| | c. "brought in" (100) |
| 2. "_ on charges" | a. "held" (350) |
| | b. "arrested" (200) |
| | c. "brought in" (150) |
| 3. "_ during the" | a. "beautiful" (500) |
| | b. "happy" (400) |
| | c. "people" (250) |

Similar to Step 2, the frequencies of common returns in the Right Anchor Lists produced by different Right Signature List returns can be added. The only common returns in the Right Anchor Lists are:

| a. "held" | 300 + 350 = 650 |
|---|---|
| b. "brought in" | 100 + 150 = 250 |

In Step 5, an ICFA is conducted and the system returns a ranking. In the present example, a weighted frequency is produced by multiplying the frequencies of the common returns of Steps 2 and 4 (i.e., returns on both a Left Anchor List and a Right Anchor List), producing a Knowledge Acquisition List as follows:

| 1. "held" | 650 × 370 = 240,500 |
|---|---|
| 2. "arrested" | 200 × 240 = 48,000 |

An alternative embodiment for ranking gives no consideration to the specific weighted frequency. Instead, all results produced on at least one Left Anchor List and on at least one Right Anchor List are ranked according to the total number of Anchor Lists on which they appear. In the above example, the rankings using this embodiment would be:

| Rank | Knowledge Acquisition Item | # of Anchor Lists |
|---|---|---|
| 1 | "held" | 4 |
| 2 | "arrested" | 2 |

Although both "released" and "brought in" were each produced twice in the analysis, neither was produced on both a Left Anchor List and a Right Anchor List ("released" was produced twice on Left Anchor Lists and "brought in" was produced twice on Right Anchor Lists). Other user-defined weighting schemes combining the number of Anchor Lists and total frequency may be utilized. For example, one embodiment can rank returns based on the total number of different Anchor List appearances and any returns found on an equal number of different Anchor Lists can be sub-ranked based on total frequency.

An alternative embodiment for ranking can call for multiplying the number of Left Anchor Lists the result appears on by the number of Right Anchor Lists the result appears on. In the above example, the rankings would be as follows:

| Rank | Knowledge Acquisition Item | Anchor List Product |
|---|---|---|
| 1 | "held" | 4 |
| 2 | "arrested" | 1 |

The above illustration is based on a relatively small number of documents in the Document Database. The Document Database typically will be larger and can include documents remotely accessible to the system via networks such as the Internet. In one embodiment of the invention, the user not only defines the number of results to be included on a Signature List, but also can stop the analysis when the designated numbers of results have all been found with a user-defined minimum frequency. This acts as a cut-off and will save processing power when using a large database.

Other examples of user-defined parameters for ICFA to produce a Knowledge Acquisition List for a query word or word string can consider frequently recurring words and/or word strings to the left and right sides of the query in various lengths. Thus, instead of having a fixed user-defined length for the word strings returned in the Left and Right Signature Lists, an embodiment might have a variable user-defined length to the word strings returned in these Signature Lists, with a minimum and maximum length to the word strings. More frequently occurring word strings of different sizes used in the analysis on both the left and right sides of the query provides more "contextual angles" to identify related words and word strings. In addition, this embodiment may include a minimum number of occurrences for a returned word or word string to qualify for the Signature List.

In one embodiment of a variable word string analysis using this aspect of the present invention, the query from the previous example ("detained") can be analyzed as follows:

In Step 1, from an available database generate a Left Signature List of a user-defined number (of a user-defined minimum and maximum length) of the most frequent word strings to the left of the query. This is the same process in Step 1 of the previous example except here word strings of various lengths are used rather than fixed-length word strings. If the user-defined parameters are (1) return the eight most frequent word strings, (2) with the word strings having a minimum length of two words and a maximum length of four words, and (3) with a minimum occurrence of at least 500 occurrences in the corpus, the results in the previous example might look (again, using a hypothetical corpus) as follows:

| Left Signature List | Frequency |
|---|---|
| 1. "people were" | 1,000 |
| 2. "arrested and" | 950 |
| 3. "were reportedly" | 800 |
| 4. "passengers were" | 775 |
| 5. "was being" | 700 |
| 6. "the people were"" | 650 |
| 7. "was arrested and" | 575 |
| 8. "they were reportedly" | 500 |

In Step 2, generate the Left Anchor Lists from the results of the Left Signature List by locating the most common words and word strings directly to the right of the returns from Step 1, as in the previous example.

In Step 3, generate a Right Signature List using the same defined parameters described in Step 1 of this example, with the following results:

| Right Signature List | Frequency |
|---|---|
| 1. "for questioning" | 1,750 |
| 2. "on charges" | 1,520 |
| 3. "during the" | 1,350 |
| 4. "because of" | 1,000 |
| 5. "due to" | 750 |
| 6. "in connection" | 600 |
| 7. "on charges of" | 575 |
| 8. "for questioning after" | 500 |

In Step 4, generate the Right Anchor Lists from the results of the Right Signature List by locating the most frequent recurring words and word strings to the left of the returns from Step 3, as in the previous example.

In Step 5, rank all results produced on at least one Left Anchor List and on at least one Right Anchor List according to the total number of lists on which the result appears. Alternatively, rankings can be determined by multiplying the total number of Left Anchor Lists a result appears on by the total number of Right Anchor Lists it appears on. In addition, total frequency can be used to weight the rankings. A variety of user-defined weighting schemes can be used as previously described.

It should be noted that while the above example query was a word ("detained") the system could produce semantic equivalents for word strings of any size where the word string represents a semantically identifiable idea. For instance, if the system were queried with "car race", it would produce potential semantic equivalents for "car race". Performing the same steps described in the embodiments above, which utilize an ICFA to determine near semantic equivalents, the system might produce "stock car race", "auto race", "drag race", "NASCAR race", "Indianapolis 500", "race", among other semantically related words and word strings. The system accepts queries and produces associated ideas using exactly the same process, without regard to the size of the query word string or the returns. Knowledge Acquisition Lists will also include other related terms like, for example, "contest", "sporting event", "Dale Earnhardt, Jr." or "boat race".

B. Knowledge Acquisition List Generation Using RCFA

Another embodiment of the present invention for creating Knowledge Acquisition Lists including semantic equivalent associations is based on the use of Related Common Frequency Analysis (RCFA) rather than the Independent Common Frequency Analysis (ICFA) as shown above. The same basic techniques and principles applied using ICFA for semantic acquisition can be applied using RCFA. The RCFA technique of the present invention for generating a Knowledge Acquisition List including semantic equivalents and other relationships involves the following steps:

Step 1: Receive a word or word string query for which semantically equivalent words and word strings (along with other related words and word strings) will be found, and search a Document Database, Recurrence Database or FAD to identify user-defined sized word string portions of documents containing that word or word string. In an example, the word string "initial public offering" is entered as a query to identify its semantic equivalents using RCFA. The system then searches and identifies portions of documents with the "initial public offering" word string. The user may define and limit the number of portions returned.

Step 2: For each occurrence of the query word string found in Step 1, analyze the returned portions by recording the frequency of occurrence of (i) the words and/or word strings of user-defined size to the left of the query, in combination with (ii) the words and/or word strings of a user-defined size to the right of the query. This step creates a combined Left and Right Signature that "cradles" the query called the "Left/Right Signature Cradle" or "Cradle". This step is an embodiment of RCFA where a word or word string query is used to generate two related word strings.

In our example, the size of the user-defined left word string can be set at two or three-words, and the user-defined right word string can be set at two or three-words. With a user-defined number of Cradles to be returned (for example, one-hundred) occurring a user-defined minimum number of times (for example, five), the calculations have a cut-off point. This process could result in the following partial set of hypothetical returns for the query "initial public offering":

1. " announced a successful _____ of common stock"
2. "shares at an _____ price of
3. "announced the _____ of its"
4. "it considers an _____ of common stock"
5. "completed an _____ raising a"
6. "announced its _____ of shares"
7. "announced the proposed _____ for its common"
8. "announced an _____ of stock"
9. "completed its _____ of shares"
10. "in representing _____ underwriters for"

Step 3: Search the Document Database for the most frequent words and word strings (with an option to set a user-defined maximum size) that appear between the left and right word strings of each of the Left/Right Signature Cradles produced in Step 2. Identifying these other frequently occurring words and/or word strings that appear in between the word strings of the Left/Right Signature Cradles produces potential semantic equivalents (and other related words or word strings). A user-defined minimum number or percentage of Left/Right Signature Cradles can optionally be required for a return to qualify. This step is an embodiment of RCFA where two words and/or word strings are used to identify related third words and/or word strings.

Step 4: The resulting words and/or word strings that appear in between the word strings of the Left/Right Signature Cradle (i.e., the other words and word strings that "fill" the various Cradles) can be ranked based on total number of different Left/Right Signature Cradle's filled, total frequency, or some other method or combination of methods.

In one preferred embodiment, the returns are first ranked by total number of different Left/Right Signature Cradles filled. Returns with the same number of different Left/Right Signature Cradles filled would then be ranked by total frequency of all filled Left/Right Signature Cradles. Another embodiment of a ranking criterion could also give weight to the frequency of the Left/Right Signature Cradle that produced the return, or extra weight could be given based on the size of the word strings in the Left/Right Signature Cradle.

In the above example, top results in Step 3 might be the words and/or word strings "IPO", "ipo" (the results may be case sensitive), "Initial Offering", "offering", "Public Offering" and "stock offering", all of which "fill" the unresolved portion (vacated by the query) of some of the Left/Right Signature Cradles.

When using ICFA or RCFA to determine semantic equivalents, different numbers of varying sized word strings for Left Signatures, Right Signatures, or Left/Right Signature Cradles can be used together in one analysis using ICFA or RCFA as shown above. The more various sized word strings used as Left Signatures, Right Signatures, and Left/Right Signature Cradles as part of an analysis, the more angles on the concept the system will have to identify the query word or word string's semantic value.

One embodiment can call for the most frequent word strings in a range of sizes, for example, the most frequent 1000 word strings between three to five words long to the left and right of the query to form the Left/Right Signature Cradles. As another example of an embodiment, the system can define the Left/Right Signature Cradles as the most frequent three-word word strings to the left and right of the query, along with a user-defined number of most frequent four-word word strings to the left and right of the query, plus a user-defined number of the most frequent five-word word strings to the left and right of the query. The number of words in a word string for Left/Right Signature Cradles are user-defined and can include any combination of ranges of word string sizes leading into and out of the concept (represented by a word or word string) being analyzed. The resulting words and word strings produced by filling the Cradles can be ranked by total number of different Cradles filled, giving user-defined weights to results produced by the different sized Cradles or the frequency count of the Cradles filled. Any specific embodiment using ICFA for semantic equivalents or to identify any other relationship can be done using RCFA, and visa versa.

Appendix A presents examples of association results using RCFA for a variety of queries. The first 15 examples show partial results for the queries (i.e., the top 20-25 returns per query), while the final example (for the query "it is important to note") shows the top 1000 returns. The user-defined settings for these results was: (1) find the first 1000 occurrences of the query; (2) record all Cradles of two and three-word word strings to the left and two and three-word word strings to the right; (3) rank Cradles by the frequency with which they are found; (4) find all words and word strings that fill the Left/Right Signatures Cradles; (5) return results based on total number of different Cradles filled; (6) rank results with the same number of Cradles filled by total frequency of all Cradles filled (weight can also be given to higher frequency Cradles that are filled). The corpus used to produce the results is comprised of approximately 2.4 billion words. Note that the "Relative Score" listed in Appendix A represent a user-defined metric, as described above, that reflects one measure of confidence that a particular return is semantically related. The lower the score, the less confidence. The lowest scores, for example, scores of 1 or 2, represent returns that have the lowest confidence. With a larger corpus, some of these low scoring returns may be raised to a higher level of confidence if they appear more frequently based on the user-defined measuring criteria.

Another embodiment of the present invention associates two or more words and/or word strings with third words and word strings that appear on all (and also qualify based on possible user-defined ranking requirements) of their Knowledge Acquisition Lists. This embodiment of the present invention, referred to as Common List Member Analysis, can be used to enhance the results of applications that benefit from semantic associations such as search, text mining and AI applications. For example, when two or more Knowledge Acquisition Lists are examined and common word and word string results are identified, the common terms can be used to enhance a search function operating on unstructured text. Hence, if the terms "Bonds" and "San Francisco" were entered as two separate keywords for a particular search query into a search engine known in the art, the present invention could supplement additional keywords to the search by identifying words and word strings that appear with a user-defined minimum ranking on both original keyword's Knowledge Acquisition Lists (with user-defined weighting). Hence, "baseball" and "the Giants" may be added to retrieve and rank content relating to Barry Bonds rather than financial bonds.

In addition, terms common to Knowledge Acquisition Lists (i.e., Lists derived either from the keywords themselves or from the terms contained on the Lists of the keywords) may be used to rank results by relevance or create categories to organize results (by looking at terms that form category clusters based on common appearances on Lists). In the above example, if text in the database included information on financial bond trading in San Francisco, Knowledge Acquisition Lists for "Bonds" and "San Francisco" might both include high ranking returns like "bond trading" and "debentures" that could be used by the system as additional keywords or factors to enable enhanced search, the ranking of returned documents, or the categorization of results. In such a case, categories such as "baseball" and "finance" might both have been recognized by the system, giving the user a choice of which category to pursue. Also, as described below, Knowledge Acquisition Lists can be filtered for synonyms of the query (or keyword), which can be used to enhance and expand a particular search's results beyond documents that contain the keyword(s) to include documents that contain the synonyms of the keyword(s) as well.

C. Knowledge Acquisition List Sorting and Filtering

The use of ICFA and RCFA to produce a Knowledge Acquisition List will include some results on the list that fit the Left/Right Signature Cradle (or appear on the Left and Right Anchor Lists) but are not semantic equivalents. This is particularly true if the user-defined number of Signatures or Cradles in common with the query needed to qualify as a return is not high. For example, many words and/or word strings that have an opposite meaning to the query word or word string will fit many of the same Left/Right Signature Cradle as the query, as will other related but non-semantically equivalent words and word strings.

For example, assume an RCFA is performed on the query "in favor of and Cradles such as "the court ruled _____ the plaintiff" and "the senator voted _____ the amendment" are produced. It can be easily seen how both the query's synonyms like "for" as well as opposites like "against" will fill these Cradles and appear on the Knowledge Acquisition List.

Although these other non-semantic equivalent word strings will be useful for many applications, if an application requires that only semantic equivalents be included on the list for a query, filtering techniques of the present invention can be employed and will produce a Knowledge Acquisition List with only semantic equivalents. These filtering techniques described below include (1) Direct Mutual Relationships—which considers not only the relationship of the rank of a return on the query's ICFA or RCFA Knowledge Acquisition List, but also the rank of the query on each return's own CFA Knowledge Acquisition List; (2) Semantic Triangulation—a method and system that considers the number of Knowledge Acquisition Lists (as well as the rankings on those lists) that both the query and one of the returns of the query appear on. This filtering technique can help identify a return as a near semantic equivalent of a query, even if the return ranks low on the query's Knowledge Acquisition List. This is accomplished by identifying the low ranking returns rank and/or frequency (based on user-defined settings) on a user-defined number of Knowledge Acquisition Lists generated for other returns of the query that all share a close semantic relationship with the query (i.e., that appear on a number of different lists with the query); and (3) Query+Signature Overlap—in this method, the overlap technique within a single language is employed in an embodiment of the present invention to identify semantic equivalents. The overlap technique accomplishes this in the same way it connects contiguous concepts (represented by word strings) in chains of logic. The returns found on Knowledge Acquisition Lists of (i) a query word or word string with its Left Signature and (ii) a query word or word string with its Right Signature, are tested for overlap. The synonymous expressions for the word or word string being analyzed can be identified as the overlapping words in the overlapping word strings.

Moreover, another technique of the present invention provides further methods for using word string patterns to automatically sort word and word string returns from Knowledge Acquisition Lists into different lists that can be labeled by the user to accurately reflect their semantic character relative to the query term (e.g., an opposite of the query (e.g., query: "hot", return: "cold"); a member of a common class with the query (e.g., query: "blue", return: "purple")).

This technique, described below, is referred to as the Signature Pattern Sorting technique of the present invention. Words and word strings can also be sorted by their semantic relationship to one another by utilizing the Direct Mutual Relationship and Semantic Triangulation techniques. As the user provides training examples to the system of terms embodying the relationship (e.g., "hot" and "cold" for opposites), the method and system can identify patterns that characterize the relationship based on appearances and rankings of words and word strings on Knowledge Acquisition Lists. The present invention can use that generalized pattern in the future to associate words and word strings that share that generalized pattern as terms characterizing the identified relationship.

1. Association Utilizing Direct Mutual Relationships and Semantic Triangulation The Direct Mutual Relationship technique can be used to filter the results of a Knowledge Acquisition List by generating a separate Knowledge Acquisition List using RCFA or ICFA, as described above, for each return on the query's Knowledge Acquisition List. By creating independent Knowledge Acquisition Lists for all returns on the query's list, the system can identify whether the original query ranks above a user-defined threshold on each of the Knowledge Acquisition Lists of its own returns. The higher the mutual ranking of the query and a return on each other's Knowledge Acquisition List, the more likely the return is a semantic equivalent of the query.

The Semantic Triangulation method of the present invention also makes use of independently generated Knowledge Acquisitions Lists for each of the query's returns to establish which returns are near-semantic equivalents of the query. The Semantic Triangulation aspect of the present invention examines the independently generated Knowledge Acquisition Lists of the returns to identify those words and word strings that appear above a user-defined threshold ranking on a user-defined number of the different Knowledge Acquisition Lists that the query also appears on as a return. For any return on a query's Knowledge Acquisition List that is also a return on a user-defined number or percentage of other Knowledge Acquisition Lists which contain the query as a return (based on their rankings on the shared lists as well), no matter how low ranked that return is on the query's List, a Knowledge Acquisition List will be generated and a Direct Mutual Relationship analysis can be performed to further refine the semantic relationship between the return and the query.

As just described, the Direct Mutual Relationship and Semantic Triangulation methods can be used together to rank returns by semantic closeness to the query. Special weighting can be given to the Direct Mutual Relationship, the rank of the list member on the original query's list and the rank of the query on each of its return's lists. These results can be used to determine what will remain on the original query's Knowledge Acquisition List, based on user-defined criteria for applications that call for semantic equivalents only.

For example, if "IPO" is entered into the system for semantic equivalent analysis, the system employing RCFA or ICFA might produce a Knowledge Acquisition List with various results such as "initial public offering", "stock sale", "initial offering", and "stock market", among others. Although "stock market" is a related concept to the query "IPO", it is not a semantic equivalent. Using the above-described filtering techniques, separate Knowledge Acquisition Lists will be generated for "initial public offering", "stock sale", "initial offering", and "stock market".

After generating these lists, the Direct Mutual Relationship aspect of the present invention might determine that "IPO" (the original query) appears materially lower on the Knowledge Acquisition List generated for "stock market" than on the other return's lists, and the Semantic Triangulation method might determine that "stock market" consistently appears lower than the query and the other returns on the independent lists generated for "initial public offering", "stock sale" and "initial offering". For these reasons, user-defined parameters might remove "stock market" from the Knowledge Acquisition List for "IPO" for applications like translation, voice recognition, search, and other applications that prefer only close semantic equivalents.

The results of the two above analyses can be employed based on user-defined settings. For efficient processing, in one embodiment, only a user-defined number of top ranking phrases of a query's Knowledge Acquisition List are independently tested by generating its own CFA to perform the above analysis. If, however, a phrase appears with a low rank on a query's Knowledge Acquisition List (or does not even appear at all), but the word or phrase appears on a user-defined number of lists of the query's established semantic equivalents (even if it is ranked on them low as well), the phrase can be tested by generating an independent Knowledge Acquisition List to test for the "mutual" consideration (where does the query rank on the other phrase's list).

When the user furnishes the system with a plurality of words and/or word strings that are synonyms and then furnishes it with a training set of pairs of words and/or word strings that are related but not synonymous, the pattern of Knowledge Acquisition List appearances and rankings that is unique to the synonyms or non-synonyms can be used to identify words and word strings in the future that are synonyms of one another.

Similarly, the system can also use the examples of terms furnished by the user that are non-synonymous that have a specific relationship to one another (e.g., opposites, class members) as training examples, and look to identify any general pattern for this relationship between the terms on each other's Knowledge Acquisition Lists as well as look for patterns of these terms relative to one another on other Knowledge Acquisition Lists. The system can then use these patterns to identify the general relationship between two terms that share those patterns.

Both the Direct Mutual Relationship and the Semantic Triangulation techniques can be used to identify patterns based on appearances and rankings on Knowledge Acquisition Lists that identify other semantic relationships. For instance, after the user furnishes the system with training examples of words and word strings that are members of a common class of one another (e.g., "New York" and "Los Angeles" are U.S. cities), the system may identify a pattern of Knowledge Acquisition List appearances and rankings that can be generalized and used to identify other words and word strings that represent U.S. cities.

Additionally, a Knowledge Acquisition List appearance and ranking pattern common to different groups of class members can further identify a more general pattern that will indicate that two words and/or word strings represent common class members. For example, if the system analyzes Knowledge Acquisition Lists using training words and word strings furnished by the user representing U.S. cities, colors, names, and numbers, and finds a pattern of list appearances and rankings that characterize the general relationship of class members, the system can use the pattern in the future to generally identify the relationship between two terms as class members.

2. Association Utilizing Queries and Signature Overlaps

This method employs the requirement of an overlap of words as a filtering technique to leave only semantic equivalents on a Knowledge Acquisition List. This method can either refine an existing Knowledge Acquisition List or be used to create an independent list of only semantic equivalents of a query. This method takes a query word or word string and identifies a user-defined number of Cradles (or independent Left Signatures and Right Signatures) of a user-defined sized range of word strings. Next, the query plus a user-defined number of Left Signatures, each taken together as a longer unit word string (Query+Left Signature), are analyzed using RCFA (or ICFA) to produce Knowledge Acquisition Lists for the Query+Left Signature word strings. Next the query plus a user-defined number of Right Signatures are each taken as a unit to produce a number of Knowledge Acquisition Lists for the chosen Query+Right Signature word strings. Next, a user-defined number of top ranked members of the Knowledge Acquisition Lists for the Query +Left Signature word strings are tested for overlapping words and word strings between the right side of each of them and the left side of a user-defined number of members of the Query+Right Signature Knowledge Acquisition Lists. The overlapping word or words in each overlapping word string identified in this last step are typically semantic equivalents of the query.

For example, in the earlier example using the query "initial public offering", the identified Left Signature lists are added to the query and a Knowledge Acquisition List is generated for each of these larger strings. Therefore, an analysis of a Left Signature+Query such as "for an initial public offering" will be used as a query itself to generate semantic equivalents, as will other Left Signatures+Query such as "announced the initial public offering" and "the proposed initial public offering".

Next, Right Signature+Query word strings like "initial public offering price of and "initial public offering of stock" are used as queries to generate Knowledge Acquisition Lists (and potential synonyms) for these phrases.

Next the members of the Left Signature+Query lists are tested on their right sides for overlap with the left side of the user-defined qualifying members of the Right Signature+Query lists. The words and word strings that overlap are semantic equivalent words and word strings of the original query (e.g., initial public offering). One example of such a result is if the Left Signature+Query word string, "announced the initial public offering" generated a list that included "went public with the IPO", and the Right Signature+Query word string "initial public offering of stock" had a qualifying list member of "IPO of equity", then the "IPO" is the overlapping word or word string and, therefore, is presumed to be the synonym of the term "initial public offering".

The Query+Signature Overlap filtering technique can be combined with the other filtering methods. In one embodiment, Mutual Direct Relationship and/or Semantic Triangulation can be employed as a first step before employing the Query+Signature Overlap filtering method.

3. Association Utilizing Word Synonym Flooding

In addition to the method and system of the present invention just described to identify semantically similar words and word strings, the present invention can also incorporate a single-state or language Flooding method to further help identify semantic equivalent word strings of a query word string or to modify the results of a CFA. This embodiment uses a word-for-word or word-for-phrase thesaurus to identify synonyms of words. In addition to individual words, the thesaurus can be populated with idioms and co-locations associated with their semantic equivalents.

A query word string is broken down into individual words (and/or idioms and co-locations) and a list of semantic equivalents for each word (and/or each idiom and co-location) would be identified using the thesaurus (and/or word-for-word (or word-for-phrase) semantic equivalents using CFA). A corpus of text is then searched for word strings with a minimum number of synonyms for each of the query word string words (counting only one synonym for each word toward the minimum) in a user-defined maximum sized word string. An original word from the query word string can be used instead of one of its synonyms to satisfy the search criteria. This method is conceptually similar to the Target Language Flooding method of the present invention for building word string translations between two languages, except in this embodiment a thesaurus is used instead of a cross-language dictionary. If, for example, a technical dictionary is used that defines technical jargon in terms of common words, then the method produces translation among two variant forms of the language (e.g., technical and lay). For instance, if the thesaurus included an entry for "non-metastasized" equating to "localized" and an entry for "oncological mass" equating to "cancer," the phrase "non-metastasized oncological mass" would equate with the phrases "localized oncological mass," "non-matastasized cancer," and "localized cancer," among possibly others based on user-defined search parameters and text being used to perform the Flooding.

4. Word String Cradle or Signature Pattern Sorting

The present invention can also be trained to recognize the patterns of Signature and Cradle word strings to the left and right of any word or word string that identify relationships between a Knowledge Acquisition List result and a query (e.g., opposites, class members, a concept and an example, other related knowledge). The user can give the system a group of examples that characterize the relationship and the system learns the word string Signature and/or Cradle patterns that provide the relationship character.

For example, to train the system to recognize opposites, the user might supply the following three queries with three members from each query's original Knowledge Acquisition List that were opposites of the query, as follows:

| Query | Opposites |
|---|---|
| 1. "good" | "bad", "very bad", "awful" |
| 2. "world class scholar" | "stupid", "dumb", "moron" |
| 3. "cold" | "hot", "very hot", "boiling" |

The user can also give additional examples of synonyms of the query and its opposites for further training. The system will then look for the Left and/or Right Signatures (or Cradles) that are unique to the opposites of the query.

This embodiment of the present invention, like the generation of Knowledge Acquisition Lists, uses CFA to establish both the common Left Signatures and common Right Signatures (or common Cradles, as the case may be) between two different groups of words and/or word strings. Importantly, this embodiment may also examines the Left Signature word strings of a query and compares them with the Right Signature word strings of a term entered by the user and identified as an opposite of the query, seeking to identify exact matches between them. This embodiment also examines the Right Signature word strings of a query and compares them with the Left Signature word strings of the opposite terms entered by the user seeking to identify exact matches between them. Often, these patterns between terms of identical ideas occurring on opposite sides (or contexts) of the query and its opposites will be indicative of a particular relationship. When the user provides the system with examples that characterize the relationship between them, the system can examine and identify which Left Signatures of one of the examples of the query or its synonyms is exactly the same as the Right Signature of examples of the words and word strings representing the opposite idea of the query, and visa versa. Finding the word strings that are the Right Signature of a query and the Left Signature of the query's opposite, or identifying word strings that are Left Signatures of the query and are also Right Signatures of the query's opposites can help provide the basis to identify those word string patterns that characterize that relationship. When the system identifies terms on a CFA Knowledge Acquisition List of related knowledge it has not encountered before but has this "opposite Signature" relative to the query, the system can identify the relationship of the return to the query as opposites.

These Signature and Cradle patterns that are unique to opposites can form the pattern that allows the system to be trained to identify opposites in the future. Different opposites will identify patterns that will generalize to certain other opposites the system has yet to encounter. New opposite relationships the system encounters performing RCFA or ICFA for related knowledge (including semantic equivalents) may not be captured by the training conducted with previous opposite Cradles or Signatures. When such a case occurs, and the user identifies to the system a result on a Knowledge Acquisition List that is a semantic opposite of the query word string, the system can use the query word string and the semantic opposite word string return for further training to identify the relationship of Signatures (or Cradles) to this type of opposite.

The same type of training technique described for opposites can be used to train the system to recognize other relationships. The system uses examples to find Signature (or Cradle) word string context patterns that are unique to the relationship and therefore define it. For example, the system can be trained to recognize class members of a query or examples of a query by providing the system with the different word string examples that characterize the semantic relationships. The system will then identify the pattern of Cradles (or Signatures) that are unique to each group of words and/or word strings which can be used to identify such relationships in the future.

The method and system identifies identical matches of the Right Signature of query to the Left Signature of a return, and Left Signature of query to Right Signature of a return to establish Signature word string patterns to identify the relationship, as well as identifies Cradles that are exclusive only to the opposites but not to true semantic equivalents (or other relationships). This process compares Left Signatures to Left Signatures and Right Signatures to Right Signatures using standard CFA techniques except instead of looking for only common Cradles to the query, the system looks for Cradles shared by the query's opposites but not by the query. By identifying Cradles unique to a query's opposite, this word string pattern can be used to help identify terms that are opposite to other terms.

For example, a unique pattern of the query's Signatures or Cradles that is not shared by the opposite of the query will often include Signatures or Cradles that contain the query's opposites as part of the Cradle or Signature word string, as illustrated below. For instance, three hypothetical Cradles for "hot" found in a corpus of documents might be:

"it's not _____ it's cold"
"I'm not _____ I'm cold"
"you promised it would be _____ but it's cold"

The opposite term "cold" is part of the word strings that make up the unique Signatures to the query word "hot" that the word "cold" will not share. This along with other word string Signatures or Cradles that are unique to "hot" and not to "cold" will identify "cold" as an opposite of "hot" even though "cold" may rank high on the Knowledge Acquisition List using CFA for the term "hot" before this embodiment or other embodiments of the present invention for Knowledge Acquisition List filtering and sorting are used.

The results show a pattern, formed by the Signatures (or Cradles), that identifies a unique type of relationship. The system can then use this pattern to identify other word and/or word string pairs that also share the "relationship identifying" pattern formed by the comparison of their Signatures (or Cradles). Thus, in an embodiment of the invention, the system is queried with a word or word string to identify words and/or word strings with the opposite meaning, the system will (1) identify the most frequent words and/or word strings surrounding that query, (2) identify the list of words and/or word strings that have some Signatures (or Cradles) in common with the query, but not of the type or with the number or percentage of commonality that would identify them as a synonym, (3) then compare the Signatures (or Cradles) these related (but not synonymous) words and/or word strings share with the query (both left to right and right to left, and left to left and right to right, as described above) and (4) compare the results from Step 3 with the Signatures of previously identified opposite word and/or word string pairs. If any of the comparisons generated in Step 3 have a pattern that is similar enough (user-defined) to the pattern formed by Signature comparisons between known opposites (based on the Signatures or Cradles identified in Step 3 that are indicators of an opposite), the system will identify the word or word string from Step 2 that contrasted with the query to form that pattern and identify it as the opposite of the query.

These same principles apply for the system to identify any relationship between a Knowledge Acquisition List return and a query including not only synonyms and opposites, but also members of a common class (e.g., "red" and "blue" are colors; "New York" and "Paris" are places) and any other semantic relationship. By locating the common Left to Left and Right to Right Signatures as well as common Left to Right and Right to Left Signatures between two words and/or word strings, patterns will emerge that characterize these relationships for automatic identification of the relationship by the system for future pairs of terms that share that relationship defined by those related Signatures. The system can also automatically "cluster" groups of words and/or word strings by their common Signatures and Cradles that are unique to that group as well as identify their relationships to other groups.

It should also be noted that the user-defined parameters for the system to produce word string equivalents (or any other relationship) can include word strings in close proximity to the query and not just directly adjacent to the query on the left or right side. Adjusting the user-defined parameters may be particularly desirable in applications where expression of semantic meaning is typically less efficient or less structurally conventional (e.g., conversations fixed in an Internet "chat room" medium and other types of conversations).

VI. Single-State Knowledge Lists for Use in Cross-State Knowledge Acquisition and Reconstruction (Translation)

Additional embodiments of the present invention utilize the system and method for generating a list of semantic equivalents to aid in the present invention's use for the translation of languages. It can be used to perform translation as an alternative to, or in conjunction with, any of the methods of the present invention that identify word string translations to be added to the cross-language database.

The methods and systems of the present invention can be used to produce semantic equivalents to be used as an aid to any corpus-based machine translation system (e.g., EBMT), including the machine translation aspect of the present invention. Any number of embodiments using semantic equivalents of word strings in the Source Language and in the Target Language can be used to produce, test and verify accurate translation. Moreover, other embodiments can use translations of Signatures or Cradles to help complete accurate translation.

For instance, if a word string translation is needed to complete a translation and it cannot be found in the cross-language association database and cannot be built using available Parallel Text, the system can generate semantic equivalents for the unknown translation in the Source Language and see if any of the semantically equivalent word strings have known translations in the Target Language in the database, or can be learned based on available cross-language text.

Alternatively, a word string translation in the Target Language may be in the cross-language association database, but it may not overlap with the contiguous word string translations on both sides as required by the dual-anchor overlap technique. In such a case, the translation would not be approved by the dual-anchor overlap requirement, but the Target Language word string translation can be used to produce semantically equivalent word strings in the Target Language which can then be tested for overlap with its neighbors to be approved as a complete translation.

Another example of how the system and method for generating a list of semantic equivalents can be utilized in a translation database is as follows:

First, generate two specific Signatures of a user-defined size to the left and right of the portion of the Source document that is yet to be resolved. For example, assume that the system is translating the sentence "I went to the ball park to watch the baseball game". Moreover, assume that cross-language overlapping translations for "I went to the", "went to the ball park", "to watch the", and "watch the baseball game" are known to the system. The system does not have an overlapping Target Language word string translation for a phrase that overlaps with "went to the ball park" and "to watch the", for example, "ball park to watch" (this is known as an unresolved phrase or portion) which is needed to provide the overlapping connection to approve the translated sentence with contiguous overlapping word strings in both languages. If the user-defined parameters are defined as the three-word word string immediately to the left of the unresolved phrase, and the three-word word string immediately to the right of the unresolved phrase, the present invention returns two three-word word strings: a "Specific Left Signature Word String" ("went to the") and a "Specific Right Signature Word String" ("the baseball game").

Second, using any of the previously described embodiments for creating semantic equivalent associations, generate Signature Lists (using in this example ICFA) for the unresolved phrase from a Document Database in the Source Language. The lists created using the above-described semantic equivalent system and method on the unresolved phrase are called the Left Signature List and the Right Signature List.

Third, translate both the Specific Left Signature Word String and all the entries on the Left Signature List to the Target Language. The translations can be obtained using any method of the present invention or any device known in the art. Results using translation systems known in the art can be improved by using the present invention's multilingual leverage embodiment, previously described. The result of this process is the "Left Target Signature List." Conduct a similar translation process on the Specific Right Signature Word String and all the entries on the Right Signature List to create a "Right Target Signature List."

Fourth, using Steps 2 and 4 above of the semantic equivalent process, generate Target Language Anchor Lists from the Left and Right Target Signature Lists using a Target Language Document Database. The resulting lists from this process are, respectively, the Left Target Anchor Lists and the Right Target Anchor Lists.

Finally, compare the returns of the Left Target Anchor Lists with the returns of the Right Target Anchor Lists. The results that appear on at least one of the Left Target Anchor Lists and one of the Right Target Anchor Lists are potential translations of the query and are ranked according to the total number of Anchor Lists on which they appear. Extra weighting for the ranking can be given for appearances on the Anchor Lists derived from the Specific Context Word Strings for greater precision. Rankings can also be determined by multiplying the number of Left Anchor Lists by the number of Right Anchor Lists that a result appears on. Additionally, some weight for the total frequency of returns and/or any other user-defined criteria can be included as a factor in ranking results.

Of course, like any application using ICFA, the above embodiment can be similarly accomplished using RCFA with Specific Context Cradles for the query and other high frequency general Cradles as described above. In such a case, Specific Cradles to the exact context as well as General Cradles are generated in the Source Language, and then translated to Target Language Cradles. Then, the Target Language Cradles are used on a Target Language corpus to fill the Cradles with other Target Language word strings.

Another embodiment using semantic equivalents to build a database of potential translations for a query, given an unresolved phrase, is as follows:

First, using only Specific Left and Right Signature Word Strings of the unresolved phrase of the query, generate Anchor Lists, as described above. Then, using Left and Right Signature Lists (without the Specific Left and Right Signature Word Strings), generate the Left and Right Anchor Lists, as described above. The results that appear on (a) at least one of the Left Anchor Lists and/or the Anchor List derived from the Specific Left Signature Word String and (b) at least one of the Right Anchor Lists and/or the Anchor List derived from the Specific Right Signature Word String are then ranked according to the total number of Anchor Lists on which they appear. Extra weighting for the ranking can be given for appearances on the Anchor Lists derived from the Specific Context Word Strings. Alternatively, multiplication of the number of Right Anchor and Left Anchor Lists a return appears on can be used for ranking or any other user-defined method.

Next, the unresolved portion of the translation query and its list of semantic equivalents generated by the ranking described above are then translated into the Target Language. The translations can be obtained using either the present invention's Parallel Text database builder (using available Parallel Text), any of the other methods of the present invention for building word string translations, or other translation devices known in the art. Results using translation systems known in the art can be improved by using the present invention's multilingual leverage embodiment previously described. If a user-defined number of translation results are identical, the result can be designated as a potential translation. To further the analysis, in another embodiment, for each of the translation results, the system generates a list of semantic equivalents using a database of text in the Target Language. The original Target Language translations that appear on the largest number of the lists (but at least two of the lists) with a threshold minimum ranking on those lists (absolute and/or relative) are designated as potential translations of the unresolved portion of the query.

All embodiments using semantic equivalent analysis to aid in the translation of unresolved word string translations can also produce additional Signatures or Cradles by using the Specific Context Word Strings and performing CFAs to produce semantic equivalents of the Specific Left Signature Word String (or Cradle) and semantic equivalents of the Specific Right Signature Word String (or Cradle). These semantic equivalents of the specific Signatures or Cradles can be used as additional Signatures or Cradles to build semantic equivalents in the Source Language, or be translated directly to the Target Language to build Target Language semantic equivalents using translated Signatures or Cradles.

As another embodiment to translate documents from one language to another using ICFA or RCFA, sentences and other segments of documents to be translated are parsed word-for-word and a Knowledge Acquisition List is generated for every word to be translated as well as corresponding Left and Right Signature word strings. Using the words in the Source Language, and a cross-language dictionary between both languages, possible translations for each word can be assembled in the Target Language. These Target Language words are used to generate Knowledge Acquisition Lists for each word in the Target Language. A derivation of the dual-anchor overlap technique looks for overlapping word strings found in each Knowledge Acquisition List of neighboring or close proximity words in the Source Language and the same is done in the Target Language. Using the cross-language dictionary, the words in the overlapped word strings on Knowledge Acquisition Lists in the two languages are tested against each other to see if they are translations for one another. If a user-defined threshold of words translate accurately in the overlapped word strings on the Knowledge Acquisition Lists, those strings can be approved as translation. Word string translations can be further verified using the dual-anchor overlap technique to connect the translation to contiguous word strings. The same technique can be used with parsed units larger than one word (e.g., two words) and the present invention for translation or an existing translation engine known in the art would act as a translation bridge between languages instead of a cross-language dictionary.

Additionally, the techniques of the present invention that identify a specific quality of semantic relationship that a word or word string has to other words or word strings can be used in translation applications by utilizing a method of the present invention that allows interchangeable semantic terms to be tokenized when searching for Source Language word strings and/or Target Language word strings to identify translations. For example, assume you are trying to translate a word string in Language X that means "tell Bob to come downstairs" into English using one of the methods of the present invention. If the Language X and/or English text does not have that word string, but has the word strings "tell Jim to come downstairs" and "tell Mary to come downstairs", it is desirable to use these word strings to help identify the translation by using a "name token" instead of the word "Bob" and then substituting the translation for "Bob" for the name token in the final output translation.

It is known in the art to use class tokens in translation for known equivalence classes like names, dates, numbers, and days, which are usually interchangeable with one another in a translation, so one translation of the form will serve as a translation for all class members. These techniques known in the art look to populate the equivalence class ahead of time with known members so they can be identified when they're encountered. While this method works well for known class members that fit only one class, if a word fits two or more classes, or a word or word string that is a certain class member that is unfamiliar (e.g., name) is encountered by the system, the state of the art cannot use the class token when searching Target text for translation candidates.

The present invention provides a method for using class tokens for words and word strings that are not known class members to the system. This method analyzes any word string that is not represented in the cross-language database or corpus and looks to see if any of the words or sub-strings within the larger unknown word string (or an extension of it created by adding the contiguous words before and/or after the unknown word string) is a Signature (or Cradle) that identifies a word or word string in the larger unknown string as a member of a class that can be tokenized.

For example, if the word string to be translated means "tell Jerome to come downstairs" and the system does not have this word string translation in the database and cannot find it in the available documents, the system may identify that the Cradle "tell _____ to come downstairs" is a possible "name class" indicator and that the word "Jerome" appears in enough other word strings in the corpus to meet a user-defined number or percentage of name Cradles to be classified as a name token. The system can use this information to use the word strings from the corpus that have the Cradle "tell _____ to come downstairs" with any other name filling the Cradle to build the translation for "tell Jerome to come downstairs" once the name Jerome is tokenized.

Moreover, any time a word or word string has two meanings and only one meaning is part of a certain class, the specific Cradle (or independent Left and Right Signatures) will determine which meaning is used. For instance, if the sentence is "give me the blue paint before you go", the system can tokenize "blue" as a color based on the Cradle "give me the _____ paint" and other known Signatures for "blue" that establish it as a color. If, however, the word string is "I feel blue since the breakup", the system will not tokenize "blue" as a color because the Cradle does not fit the color class but can replace it with a word like "sad" that is a member of the "emotions" class along with "blue" based on the above methods.

VII. Single-State Knowledge Reconstruction

Just as the dual-anchor overlap technique pieces together appropriate neighboring word string translations across languages, the same overlap technique can be used to restate any longer idea in a number of different ways in a single language by parsing the longer idea into overlapping sub-units, generating semantic equivalents for the sub-units, and substituting synonymous sub-units for original text when a synonymous sub-unit overlaps with its neighbors (neighbors can be original text or synonyms of original text). This is an effective application for text mining and search and retrieval as well as voice recognition, natural language interfaces and more complex artificial intelligence applications.

For example, take the statement "when I get home from school I must do my homework before I go out to play with my friends". The semantically equivalent phrases for the following parsed sub-units may be known to the system by conducting RCFA or ICFA knowledge acquisition analysis along with semantic equivalent filtering techniques:

1. "when I get home from school I must"
   a. "when I come home from school I must"
   b. "when I arrive home from school I better"
   c. "as soon as I come home from school I have to"

2. "I must do my homework before I go out"
   a. "I have to do my homework before I go out"
   b. "I better do my schoolwork before I head out"
   c. "I must get my homework done before I leave the house"

3. "go out to play with my friends"
   a. "head out to play with my friends"
   b. "leave the house to hang out with my posse"
   c. "go out to hang with my buddies"

The above semantically equivalent lists of word strings, plus the overlap technique, can provide a variety of alternative ways of expressing the entire original statement. For example, an alternative statement might be:

when I arrive home from school I better
   I better do my schoolwork before I head out
      head out to play with my friends After eliminating the redundancy, the system presents "when I arrive home from school I better do my schoolwork before I head out to play with my friends" as a synonymous expression to the original query.

VIII. Scope of CFA Applications

A. In General

At its core, the association database building technique involves (i) taking a unit of data organized in a linear or ordered fashion, (ii) breaking the data down to all possible contiguous subsets of the whole, and (iii) building relationships between all subsets of data, based on the frequency of recurring subsets' (generally close) proximity to one another in all units of data available for study. At the core of CFA, the system identifies frequently recurring proximity relationships between groups of recurring data segments to illuminate certain associations shared by two or more recurring data segments. Therefore, the same techniques used in the database creation and Common Frequency Analysis can be employed to recognize patterns for many other types of data mining, text mining, target recognition, and any other application that requires the recognition of patterns between associated ideas. Moreover, these tasks are not limited to finding word string patterns in text.

For language translation, the embodiments of ideas are represented in documents; for music, the embodiments might be digital representations of a music score and sound frequencies denoting the same composition, and the like. Using the two mediums of video and audio, an association between a video clip of a baseball player swinging and missing to strike out, and the word string "strike out" might be associated using similar techniques. The consistent general visual representation of a baseball player swinging and missing and then going back to the dugout, and the word string "strike out" (or a sound frequency that is known to mean "strike out"), over a significant sample size, will have a very high cross-idea frequency. The mechanism to generalize the understanding of swinging and missing when encoded as visual data once developed will allow the system to operate in this situation.

As another example, a common goal of visualization software involves the analysis of visual images by a system to determine automatically whether or not a person is in an image. While it is a very difficult task for current state of the art visualization or image recognition technologies, the present invention can use CFA to learn the Signature of "people" by finding proximate features (e.g., within a given radius) in the section of the image that corresponds to a person. This embodiment calls for providing the system with a corpus of images on which to train to find the distinguishing factors between pixel arrays that make up people versus pixel arrays that make up things other than people. One method has the system use pictures taken with both light sensitive lenses and infrared sensors that will identify objects emitting heat.

The system will then train to recognize the pattern of light sensitive pixels that define the relationship between objects emitting heat and those that don't. Of this heat-emitting group, the system can then further refine the training of pixel pattern to distinguish between the heat emitting non-human elements (other animals, fire, etc.) and people.

As a general matter, the present invention defines any given "subject idea" based on the sequence of ideas that appear around that subject idea in all its contexts. In a sense, the invention defines each subject idea by the universe of ideas surrounding it, including the ideas found leading up to the subject idea and the ideas found following the subject idea, regardless of the forms in which the ideas are expressed. When an idea is expressed in written language, there is the dimension of "time" (as expressed by flow, order, or sequence) to surround and define it. The Left Signatures in the English language represent the different ideas occurring just prior in "time" to any query and the Right Signatures in the English language represent the different ideas that are found following a query idea in "time."

Representations of ideas in certain mediums other than text add additional dimension to the "space" surrounding a subject idea. These additional dimensions supply other defining contexts for a subject idea, in addition to the context that multiple units of time provide for an idea. For example, spoken language adds context (signatures) in the form of tone, intonation, and cadence, among others, for each idea in a sequence of ideas (in addition to the still very important identification of ideas just before and after the subject idea). Visual representations of an idea add the surrounding physical (or perceived) dimension to provide additional context to an idea that is not moving through time, as well as from the sequence of ideas that come before and after it, if it is moving through time. Of course, audio-visual representations of ideas, and other simultaneous multi-sense representations add a number of dimensions of surrounding contexts that help define each isolated idea in time, in addition to the important context provided by the sequence of surrounding ideas over multiple units of time.

B. Data Compression

Once knowledgebases of ideas are generated within a single state using CFA (or across states using cross-state knowledge acquisition), the different words and word strings that articulate the same idea within each language and across different languages can be commonly identified by assigning each idea a number or some other unique efficient identifying label or token. This naturally provides a very powerful data compression method and system. If expressions in existing states are assigned specific associations with data points in another state and catalogued in a database, conversions between those two states will be possible.

For example, each "idea" represented in a form, state, or language can be assigned a number (or a frequency on the electromagnetic spectrum). When a combination of ideas are to be transferred from one location to another, they can be parsed into overlapping ideas, and those representations of parsed ideas can be converted to their assigned token (e.g., number, electromagnetic frequency, etc). By using these tokens the amount of data needed to be transferred from one location to another using the electromagnetic spectrum or other forms of bandwidth (along with sending encoder machines and receiving decoder machines) is compressed.

Transmission of an idea will require transmitting the pair (idea, unique number) the first time, and just the number all subsequent times. For multi-processor realizations of the technology in this invention, the same efficient internal transmission between processors may be implemented as transmission of ideas at a distance (e.g., by unique number). The ideas once transmitted are decoded by substituting their unique identifier with the idea description—regardless of how the unique identifier is encoded: a number, an electromagnetic frequency, or any other identifier.

IX. Single-State CFA for Smart Applications

The present invention, in another embodiment, can be instructed by the user to automatically carry out certain CFAs based on the identification of certain combinations of patterns of two or more different word strings that occur together in a question, request or statement. The user would instruct the system that the presence of the pattern of two or more different word strings (after various alternative parsings into two or more word strings of various sizes identify known word string combinations in certain proximities or order) are part of a complex category bin that triggers certain CFAs. These CFAs may require the system to access previously learned information from previous CFAs now stored in a knowledgebase, or may require the learning of new information from a Document Database (or the web or other available corpus) to be used and stored in the knowledgebase for future use. With each result of a CFA, the system will retrieve information from the knowledgebase or, based on previous training and triggers set by the user (or triggers that are self-learned by the system), carry out the next CFA (or a series of CFAs that are triggered by the previous CFA) until the system has given an answer to a question or performed a task.

The invention can use the methods of the present invention to generate Knowledge Acquisition Lists and use the filtering techniques to identify semantically equivalent words and word strings for all parsed words and word strings in a request, question, or statement. In one embodiment, the method and system can be trained to recognize different types of questions. For example, if the system were asked a question such as "Where can I see kangaroos in America?", the system may have been trained to recognize what might be categorized by the user as the "Where Does One Find _____" category bin, previously trained and labeled by the user. The user can train the system to recognize various alternative forms of the question using the semantic equivalent generator (and the overlap technique) described above on one or more examples of this type of question. Once the system has been trained and can recognize the various specific examples of such questions, triggers can by set by the user when this type of question is identified that will initiate the prescribed next CFAs to be performed to provide an answer to the question.

For example, the system will learn via semantic equivalent analysis and filtering that "where can I go to see _____", "where can you tell me to go to see _____", and "where can I find _____" are all members of the "Where Does One Find _____" question category bin.

Likewise, the system will also assemble category or idea bins using semantic equivalent generation through RCFA or ICFA for "see kangaroos" (e.g., "watch kangaroos") and "in America" (e.g., "in the US"). The system can therefore recognize the presence of combinations of members of different classes that trigger the next set of words and/or word strings to be used to conduct a CFA. The user can therefore train the system to recognize these patterns of bin members in certain sequences so that they trigger the strategy of CFAs needed to identify the answer to this type of "Where Does One Find _____" question.

Moreover, the "Where Does One Find" part may not be in the beginning of the sentence, for example "If I want to see kangaroos while I'm in America, where do you suggest I go." The "where do you suggest I go" is the last idea in this sequence. The user will therefore train the system to recognize this form and sequence of concepts as members of the "Where Does One Find _____" question category bin for CFA analysis to perform artificial intelligence applications.

In one embodiment, the user can set a trigger for the system so that when it is confronted by a sequence of ideas from category bins that pose a "Where Does One Find _____" question, the system would provide an answer that fits the idea category bin of "Places" for it to be a good answer. To figure out the correct place will be the goal of the CFAs that will be triggered by the recognition of the group of word strings in the "Where Does One Find _____" question.

The user may train the system, when confronted by a "Where Does One Find _____" type of question to look for a member of the "Place" category bin that is most associated with (i.e., frequently directly next to (or near) the left or right of) the object the query requests to see, in this example, "kangaroos." What "places" are most associated with the "object" might merely entail frequency counts directly next to or near the left or right of the object in text, or may involve training the system to recognize specific word string Signatures or Cradles around the object that indicate you can find the object in a place. If this were the only information in the question, the highest related member of the "Places" bin to "kangaroos" might be "Australia." In the example, however, the question also contains a member of what a user might train the system to recognize as a "Place Restriction" category bin, "in America." The user can train the present invention to trigger a CFA between the thing that the questioner wants to see ("kangaroos") and the Place Restriction ("in America"). The highest associations between these two data segments might be "the zoo", "the San Diego Zoo" or "on TV." Note that "on TV" may not fit the conventional "Place" category bin. However, the query "where can I see" could fit into the "How Can One View _____" category bin, (as well as the "Where Does One Find _____" bin). This would include "on TV," and therefore the smart application would allow answers from the "Place" bin as well as, for example, the "Ways to View Things" bin established by the user or learned by the system.

Other more complicated questions may require the results of a CFA to trigger another CFA as part of a multi-step trigger scheme to address certain types of questions or requests. As above, the user can train the system to employ these trigger steps based on patterns of different word strings fitting general categories and the "thought process" or strategy the user has trained the system to employ.

The system is trained by the user to employ certain triggers for certain CFAs as just described. As the user trains the system and a critical mass of triggers to solve problems is reached, the system will begin to learn how to recognize how to trigger appropriate next step CFAs when confronted with a new pattern of word strings based on the similarity between the unfamiliar multiple word string patterns (using CFA semantic equivalent analysis plus overlap to judge similarity) with known multiple word string patterns that trigger certain CFAs. Next, the system will identify the similarities among that group of triggers and use them to set triggers for the new word string pattern. Moreover, the user may set triggers for strategies for the system to set automatic triggers to solve new problems.

As will be understood by those skilled in the art, the skilled practitioner may make many changes in the apparatus and methods described above without departing from the spirit and scope of the invention.

What is claimed is:

1. A computer device including a processor, a memory coupled to the processor, and a program stored in the memory, wherein the computer is configured to execute the program and perform the steps of:
   a. providing a collection of documents, wherein said collection includes at least one document;
   b. receiving from a user a word or word string query to be analyzed;
   c. searching said collection of documents for the query to be analyzed and returning documents containing the query to be analyzed;
   d. determining a user-defined amount of words or word strings or both to the left of said query to be analyzed in said returned documents based on their frequency and creating a Left Signature List comprising said words or word strings or both to the left of said query to be analyzed in said returned documents;
   e. searching said collection of documents for each word and word string on said Left Signature List and returning documents containing said words and word strings on said Left Signature List;
   f. determining a user-defined amount of words or word strings or both to the right of said words or word strings or both on said Left Signature List in said returned documents and creating Left Anchor Lists comprising said words or word strings or both to the right of said words or word strings or both on said Left Signature List based on their frequency in said returned documents;
   g. determining a user-defined number of words or word strings or both to the right of said query to be analyzed in said returned documents and creating a Right Signature List comprising said words or word strings or both to the right of said query to be analyzed in said returned documents based on their frequency;
   h. searching said collection of documents for words or word strings or both on said Right Signature List and returning documents containing said words and word strings on said Right Signature List;
   i. determining a user-defined number of words or word strings or both to the left of said words or word strings or both on said Right Signature List in said returned documents and creating Right Anchor Lists comprising said words or word strings or both to the left of said words or words strings or both on said Right Signature List based on their frequency in said returned documents; and
   j. ranking results based on the frequency of each word or word string occurring on said Left Anchor Lists and the frequency of said word or word string occurring on said Right Anchor Lists.

2. The computer device of claim 1, wherein ranking a result is modified by designating said result as a new query, and repeating steps a. through j. to determine and return the results of each of the new queries, and modifying said ranking of the result of said query based on the rank of the query on the results of the new query.

3. The computer device of claim 1, wherein a result is modified by designating each of said results as a new query, and repeating steps a. through j. to determine and return the results of each of the new queries, and modifying said result of said query based on the number of lists of the new queries where both the query and the result appear together.

4. The computer device of claim 1, wherein ranking a result is modified by designating said result as a new query, repeating steps a. through h. and modifying said ranking of said result of said query based on the words and word strings on the Left Signature List and/or words and word strings on the Right Signature List of the new query that do not appear on the Left Signature List and/or the Right Signature List of the query.

5. A computer device including a processor, a memory coupled to the processor, and a program stored in the memory, wherein the computer is configured to execute the program and perform the steps of:
   a. providing a collection of documents, wherein said collection includes at least one document;
   b. receiving from a user a word or word string query to be analyzed;
   c. searching said collection of documents for the query to be analyzed and returning documents containing the query to be analyzed;
   d. determining a user-defined amount of words or word strings or both to the left of said query to be analyzed in said returned documents based on their frequency and creating a Left Signature List comprising said words or word strings or both to the left of said query to be analyzed in said returned documents;
   e. searching said collection of documents for each word and word string on said Left Signature List and returning documents containing said words and word strings on said Left Signature List;
   f. determining a user-defined amount of words or word strings or both to the right of said words or word strings or both on said Left Signature List in said returned documents and creating Left Anchor Lists comprising said words or word strings or both to the right of said words or word strings or both on said Left Signature List based on their frequency in said returned documents;
   g. determining a user-defined number of words or word strings or both to the right of said query to be analyzed in said returned documents and creating a Right Signature List comprising said words or word strings or both to the right of said query to be analyzed in said returned documents based on their frequency;
   h. searching said collection of documents for words or word strings or both on said Right Signature List and returning documents containing said words and word strings on said Right Signature List;
   i. determining a user-defined number of words or word strings or both to the left of said words or word strings or both on said Right Signature List in said returned documents and creating Right Anchor Lists comprising said words or word strings or both to the left of said words or words strings or both on said Right Signature List based on their frequency in said returned documents; and
   j. ranking the results by multiplying the total frequency of each word or word string occurring on said Left Anchor Lists by the total frequency of said word or word string occurring on said Right Anchor Lists.

6. The computer device of claim 5, wherein ranking a result is modified by designating said result as a new query, and repeating steps a. through j. to determine and return the results of each of the new queries, and modifying said ranking of the result of said query based on the rank of the query on the results of the new query.

7. The computer device of claim 5, wherein a result is modified by designating each of said results as a new query, and repeating steps a. through j. to determine and return the results of each of the new queries, and modifying said result of said query based on the number of lists of the new queries where both the query and the result appear together.

8. The computer device of claim 5, wherein ranking a result is modified by designating said result as a new query, repeating steps a. through h. and modifying said ranking of said result of said query based on the words and word strings on the Left Signature List and/or words and word strings on the Right Signature List of the new query that do not appear on the Left Signature List and/or the Right Signature List of the query.

9. A non-transitory computer readable storage medium having stored thereon a program executable by a computer processor for performing the steps of:
   a. providing a collection of documents, wherein said collection includes at least one document;
   b. receiving from a user a word or word string query to be analyzed;
   c. searching said collection of documents for the query to be analyzed and returning documents containing the query to be analyzed;
   d. determining a user-defined amount of words or word strings or both to the left of said query to be analyzed in said returned documents based on their frequency and creating a Left Signature List comprising said words or word strings or both to the left of said query to be analyzed in said returned documents;
   e. searching said collection of documents for each word and word string on said Left Signature List and returning documents containing said words and word strings on said Left Signature List;
   f. determining a user-defined amount of words or word strings or both to the right of said words or word strings or both on said Left Signature List in said returned documents and creating Left Anchor Lists comprising said words or word strings or both to the right of said words or word strings or both on said Left Signature List based on their frequency in said returned documents;
   g. determining a user-defined number of words or word strings or both to the right of said query to be analyzed in said returned documents and creating a Right Signature List comprising said words or word strings or both to the right of said query to be analyzed in said returned documents based on their frequency;
   h. searching said collection of documents for words or word strings or both on said Right Signature List and returning documents containing said words and word strings on said Right Signature List;
   i. determining a user-defined number of words or word strings or both to the left of said words or word strings or both on said Right Signature List in said returned documents and creating Right Anchor Lists comprising said words or word strings or both to the left of said words or words strings or both on said Right Signature List based on their frequency in said returned documents; and
   j. ranking results based on the frequency of each word or word string occurring on said Left Anchor Lists and the frequency of said word or word string occurring on said Right Anchor Lists.

10. The medium of claim 9, wherein ranking a result is modified by designating said result as a new query, and repeating steps a. through j. to determine and return the results of each of the new queries, and modifying said ranking of the result of said query based on the rank of the query on the results of the new query.

11. The medium of claim 9, wherein a result is modified by designating each of said results as a new query, and repeating steps a. through j. to determine and return the results of each of the new queries, and modifying said result of said query based on the number of lists of the new queries where both the query and the result appear together.

12. The medium of claim 9, wherein ranking a result is modified by designating said result as a new query, repeating steps a. through h. and modifying said ranking of said result of said query based on the words and word strings on the Left Signature List and/or words and word strings on the Right Signature List of the new query that do not appear on the Left Signature List and/or the Right Signature List of the query.

13. A non-transitory computer readable storage medium having stored thereon a program executable by a computer processor for performing the steps of:
   a. providing a collection of documents, wherein said collection includes at least one document;
   b. receiving from a user a word or word string query to be analyzed;
   c. searching said collection of documents for the query to be analyzed and returning documents containing the query to be analyzed;
   d. determining a user-defined amount of words or word strings or both to the left of said query to be analyzed in said returned documents based on their frequency and creating a Left Signature List comprising said words or word strings or both to the left of said query to be analyzed in said returned documents;
   e. searching said collection of documents for each word and word string on said Left Signature List and returning documents containing said words and word strings on said Left Signature List;
   f. determining a user-defined amount of words or word strings or both to the right of said words or word strings or both on said Left Signature List in said returned documents and creating Left Anchor Lists comprising said words or word strings or both to the right of said words or word strings or both on said Left Signature List based on their frequency in said returned documents;
   g. determining a user-defined number of words or word strings or both to the right of said query to be analyzed in said returned documents and creating a Right Signature List comprising said words or word strings or both to the right of said query to be analyzed in said returned documents based on their frequency;
   h. searching said collection of documents for each word and word string on said Right Signature List and returning documents containing said words and word strings on said Right Signature List;
   i. determining a user-defined number of words or word strings or both to the left of said words or word strings or both on said Right Signature List in said returned documents and creating Right Anchor Lists comprising said words or word strings or both to the left of said words or word strings or both on said Right Signature List based on their frequency in said returned documents; and
   j. ranking the results by multiplying the total frequency of each word or word string occurring on said Left Anchor Lists by the total frequency of said word or word string occurring on said Right Anchor Lists.

14. The medium of claim 13, wherein ranking a result is modified by designating said result as a new query, and repeating steps a. through j. to determine and return the results of each of the new queries, and modifying said ranking of the result of said query based on the rank of the query on the results of the new query.

15. The medium of claim 13, wherein a result is modified by designating each of said results as a new query, and repeating steps a. through j. to determine and return the results of each of the new queries, and modifying said result of said query based on the number of lists of the new queries where both the query and the result appear together.

16. The medium of claim 13, wherein ranking a result is modified by designating said result as a new query, repeating steps a. through h. and modifying said ranking of said result of said query based on the words and word strings on the Left Signature List and/or words and word strings on the Right Signature List of the new query that do not appear on the Left Signature List and/or the Right Signature List of the query.

17. A computer device including a processor, a memory coupled to the processor, and a program stored in the memory, wherein the computer is configured to execute the program and perform the steps of:
   a. providing a collection of documents, wherein said collection includes at least one document;
   b. receiving from a user a word or word string query to be analyzed;
   c. searching said collection of documents for the query to be analyzed and returning documents containing the query to be analyzed;
   d. determining a user-defined number of words or word strings of user-defined size or both to the left and right of the query in said returned documents containing the query to be analyzed;
   e. returning a list with an entry or plurality of entries, wherein said entry or said plurality of entries contain said determined words or word strings or both to the left and right of the query in said returned documents;
   f. searching said collection of documents for said entry or plurality of entries in said returned list of entry or plurality of entries and returning second documents containing said entry or plurality of entries;
   g. returning a list of words or word strings of user defined size or both that occur between said determined words or word strings or both in said entry or plurality of entries in said returned second documents and ranking said returned list of words or word strings by frequency of occurrence.

18. The device of claim 17, wherein ranking a result is modified by designating said result as a new query, and repeating steps a. through g. to determine and return the results of the new query, and modifying said ranking of the result of said query based on the rank of the query on the results of the new query.

19. The device of claim 17, wherein ranking a result is modified by designating each of said results as a new query, and repeating steps a. through g. to determine and return the results of the new queries, and modifying said ranking of the result of said query based on the number of lists of the new queries where both the query and the result appear together.

20. The device of claim 17, wherein ranking a result is modified by designating said result as a new query, and repeating steps a. through e. to determine and return words or word strings or both to the left of the new query and to the right of the new query, and modifying said ranking of the result of said query based on the words or word strings or both to the left of the query and/or words or word strings or both to the right of the query that do not appear to the left and/or to the right of the new query.

21. The device of claim 17, wherein ranking a result is modified by designating said result as a new query, and repeating steps a. through e. to determine and return words or word strings or both to the left of the new query and to the right of the new query, and modifying said ranking of the result of said query based on the words or word strings or both to the left of the new query and/or words or word strings or both to the right of the new query that do not appear to the left and/or to the right of the query.

22. A computer device including a processor, a memory coupled to the processor, and a program stored in the memory, wherein the computer is configured to execute the program and perform the steps of:
   a. providing a collection of documents, wherein said collection includes at least one document;
   b. receiving from a user a word or word string query to be analyzed;
   c. searching said collection of documents for the query to be analyzed and returning documents containing the query to be analyzed;
   d. determining a user-defined number of words or word strings of user-defined size or both to the left and right of the query in said returned documents containing the query to be analyzed;
   e. returning a list with an entry or plurality of entries, wherein said entry or said plurality of entries contain said determined words or word strings or both to the left and right of the query in said returned documents;
   f. searching said collection of documents for said entry or plurality of entries in said returned list of entry or plurality of entries and returning second documents containing said entry or plurality of entries;
   g. returning a list of words or word strings of user defined size or both that occur between said determined words or word strings or both in said entry or plurality of entries in said returned second documents and ranking said returned list of words or word strings based on the number of unique entries on the returned list that appear to the left and right of the result in the collection of documents.

23. The device of claim 22, wherein ranking a result is modified by designating said result as a new query, and repeating steps a. through g. to determine and return the results of the new query, and modifying said ranking of the result of said query based on the rank of the query on the results of the new query.

24. The device of claim 22, wherein ranking a result is modified by designating each of said results as a new query, and repeating steps a. through g. to determine and return the results of the new queries, and modifying said ranking of the result of said query based on the number of lists of the new queries where both the query and the result appear together.

25. The device of claim 22, wherein ranking a result is modified by designating said result as a new query, and repeating steps a. through e. to determine and return words or word strings or both to the left of the new query and to the right of the new query, and modifying said ranking of the result of said query based on the words or word strings or both to the left of the query and/or words or word strings or both to the right of the query that do not appear to the left and/or to the right of the new query.

26. The device of claim 22, wherein ranking a result is modified by designating said result as a new query, and repeating steps a. through e. to determine and return words or word strings or both to the left of the new query and to the right of the new query, and modifying said ranking of the result of said query based on the words or word strings or both to the left of the new query and/or words or word strings or both to the right of the new query that do not appear to the left and/or to the right of the query.

27. A non-transitory computer readable storage medium having stored thereon a program executable by a computer processor for performing the steps of:
   a. providing a collection of documents, wherein said collection includes at least one document;
   b. receiving from a user a word or word string query to be analyzed;
   c. searching said collection of documents for the query to be analyzed and returning documents containing the query to be analyzed;
   d. determining a user-defined number of words or word strings of user-defined size or both to the left and right of the query in said returned documents containing the query to be analyzed;
   e. returning a list with an entry or plurality of entries, wherein said entry or said plurality of entries contain said determined words or word strings or both to the left and right of the query in said returned documents;
   f. searching said collection of documents for said entry or plurality of entries in said returned list of entry or plurality of entries and returning second documents containing said entry or plurality of entries;
   g. returning a list of words or word strings of user defined size or both that occur between said determined words or word strings or both in said entry or plurality of entries in said returned second documents and ranking said returned list of words or word strings by frequency of occurrence.

28. The medium of claim 27, wherein ranking a result is modified by designating said result as a new query, and repeating steps a. through g. to determine and return the results of the new query, and modifying said ranking of the result of said query based on the rank of the query on the results of the new query.

29. The medium of claim 27, wherein ranking a result is modified by designating each of said results as a new query, and repeating steps a. through g. to determine and return the results of the new queries, and modifying said ranking of the result of said query based on the number of lists of the new queries where both the query and the result appear together.

30. The medium of claim 27, wherein ranking a result is modified by designating said result as a new query, and repeating steps a. through e. to determine and return words or word strings or both to the left of the new query and to the right of the new query, and modifying said ranking of the result of said query based on the words or word strings or both to the left of the query and/or words or word strings or both to the right of the query that do not appear to the left and/or to the right of the new query.

31. The medium of claim 27, wherein ranking a result is modified by designating said result as a new query, and repeating steps a. through e. to determine and return words or word strings or both to the left of the new query and to the right of the new query, and modifying said ranking of the result of said query based on the words or word strings or both to the left of the new query and/or words or word strings or both to the right of the new query that do not appear to the left and/or to the right of the query.

32. A non-transitory computer readable storage medium having stored thereon a program executable by a computer processor for performing the steps of:
   a. providing a collection of documents, wherein said collection includes at least one document;
   b. receiving from a user a word or word string query to be analyzed;
   c. searching said collection of documents for the query to be analyzed and returning documents containing the query to be analyzed;

d. determining a user-defined number of words or word strings of user-defined size or both to the left and right of the query in said returned documents containing the query to be analyzed;

e. returning a list with an entry or plurality of entries, wherein said entry or said plurality of entries contain said determined words or word strings or both to the left and right of the query in said returned documents;

f. searching said collection of documents for said entry or plurality of entries in said returned list of entry or plurality of entries and returning second documents containing said entry or plurality of entries;

g. returning a list of words or word strings of user defined size or both that occur between said determined words or word strings or both in said entry or plurality of entries in said returned second documents and ranking said returned list of words or word strings based on the number of unique entries on the returned list that appear to the left and right of the result in the collection of documents.

33. The medium of claim 32, wherein ranking a result is modified by designating said result as a new query, and repeating steps a. through g. to determine and return the results of the new query, and modifying said ranking of the result of said query based on the rank of the query on the results of the new query.

34. The medium of claim 32, wherein ranking a result is modified by designating each of said results as a new query, and repeating steps a. through g. to determine and return the results of the new queries, and modifying said ranking of the result of said query based on the number of lists of the new queries where both the query and the result appear together.

35. The medium of claim 32, wherein ranking a result is modified by designating said result as a new query, and repeating steps a. through e. to determine and return words or word strings or both to the left of the new query and to the right of the new query, and modifying said ranking of the result of said query based on the words or word strings or both to the left of the query and/or words or word strings or both to the right of the query that do not appear to the left and/or to the right of the new query.

36. The medium of claim 32, wherein ranking a result is modified by designating said result as a new query, and repeating steps a. through e. to determine and return words or word strings or both to the left of the new query and to the right of the new query, and modifying said ranking of the result of said query based on the words or word strings or both to the left of the new query and/or words or word strings or both to the right of the new query that do not appear to the left and/or to the right of the query.

* * * * *